United States Patent
Raichelgauz et al.

(10) Patent No.: US 11,488,290 B2
(45) Date of Patent: Nov. 1, 2022

(54) HYBRID REPRESENTATION OF A MEDIA UNIT

(71) Applicant: Cortica Ltd., Tel Aviv (IL)

(72) Inventors: Igal Raichelgauz, Tel Aviv (IL); Adam Harel, Tel Aviv (IL)

(73) Assignee: CORTICA LTD., Tel Aviv (IL)

( * ) Notice: Subject to any disclaimer, the term of this patent is extended or adjusted under 35 U.S.C. 154(b) by 0 days.

(21) Appl. No.: 16/542,321

(22) Filed: Aug. 16, 2019

(65) Prior Publication Data
US 2020/0311891 A1    Oct. 1, 2020

Related U.S. Application Data

(60) Provisional application No. 62/827,112, filed on Mar. 31, 2019.

(51) Int. Cl.
| | |
|---|---|
| *G06T 5/50* | (2006.01) |
| *G06K 9/62* | (2022.01) |
| *G06N 20/00* | (2019.01) |
| *G06T 7/246* | (2017.01) |
| *G06T 7/70* | (2017.01) |
| *G06T 3/40* | (2006.01) |
| *G06V 10/22* | (2022.01) |
| *G06V 10/50* | (2022.01) |
| *G06V 10/44* | (2022.01) |
| *G06V 20/40* | (2022.01) |

(52) U.S. Cl.
CPC .............. *G06T 5/50* (2013.01); *G06K 9/6201* (2013.01); *G06K 9/6228* (2013.01); *G06K 9/6262* (2013.01); *G06K 9/6288* (2013.01); *G06N 20/00* (2019.01); *G06T 3/40* (2013.01); *G06T 7/246* (2017.01); *G06T 7/70* (2017.01); *G06V 10/22* (2022.01); *G06V 10/457* (2022.01); *G06V 10/50* (2022.01); *G06V 20/40* (2022.01); *G06V 20/46* (2022.01); *G06K 9/6259* (2013.01); *G06T 2207/10016* (2013.01); *G06T 2207/20081* (2013.01); *G06T 2207/20221* (2013.01)

(58) Field of Classification Search
None
See application file for complete search history.

(56) References Cited

U.S. PATENT DOCUMENTS

| | | |
|---|---|---|
| 4,733,353 A | 3/1988 | Jaswa |
| 4,932,645 A | 6/1990 | Schorey et al. |
| 4,972,363 A | 11/1990 | Nguyen et al. |

(Continued)

FOREIGN PATENT DOCUMENTS

| | | |
|---|---|---|
| EP | 1085464 A3 | 1/2007 |
| WO | 0231764 A2 | 4/2002 |

(Continued)

OTHER PUBLICATIONS

Lai, Wei-Sheng, et al. "Deep laplacian pyramid networks for fast and accurate super-resolution." Proceedings of the IEEE conference on computer vision and pattern recognition. 2017 (Year: 2017).*

(Continued)

*Primary Examiner* — Sarah Le
(74) *Attorney, Agent, or Firm* — Reches Patents

(57) ABSTRACT

Systems, and method and computer readable media that store instructions for generating a hybrid representation of a media unit.

23 Claims, 33 Drawing Sheets

(56) References Cited

U.S. PATENT DOCUMENTS

| | | |
|---|---|---|
| 5,078,501 A | 1/1992 | Hekker et al. |
| 5,214,746 A | 5/1993 | Fogel et al. |
| 5,307,451 A | 4/1994 | Clark |
| 5,412,564 A | 5/1995 | Ecer |
| 5,436,653 A | 7/1995 | Ellis et al. |
| 5,568,181 A | 10/1996 | Greenwood et al. |
| 5,638,425 A | 6/1997 | Meador et al. |
| 5,745,678 A | 4/1998 | Herzberg et al. |
| 5,754,938 A | 5/1998 | Herz et al. |
| 5,763,069 A | 6/1998 | Jordan |
| 5,806,061 A | 9/1998 | Chaudhuri et al. |
| 5,835,087 A | 11/1998 | Herz et al. |
| 5,835,901 A | 11/1998 | Duvoisin et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,926,812 A | 7/1999 | Hilsenrath et al. |
| 5,978,754 A | 11/1999 | Kumano |
| 5,991,306 A | 11/1999 | Burns et al. |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,163,510 A | 12/2000 | Lee et al. |
| 6,243,375 B1 | 6/2001 | Speicher |
| 6,243,713 B1 | 6/2001 | Nelson et al. |
| 6,269,307 B1 | 7/2001 | Shinmura |
| 6,275,599 B1 | 8/2001 | Adler et al. |
| 6,314,419 B1 | 11/2001 | Faisal |
| 6,329,986 B1 | 12/2001 | Cheng |
| 6,381,656 B1 | 4/2002 | Shankman |
| 6,411,229 B2 | 6/2002 | Kobayashi |
| 6,422,617 B1 | 7/2002 | Fukumoto et al. |
| 6,507,672 B1 | 1/2003 | Watkins et al. |
| 6,523,046 B2 | 2/2003 | Liu et al. |
| 6,524,861 B1 | 2/2003 | Anderson |
| 6,546,405 B2 | 4/2003 | Gupta et al. |
| 6,550,018 B1 | 4/2003 | Abonamah et al. |
| 6,557,042 B1 | 4/2003 | He et al. |
| 6,594,699 B1 | 7/2003 | Sahai et al. |
| 6,601,026 B2 | 7/2003 | Appelt et al. |
| 6,611,628 B1 | 8/2003 | Sekiguchi et al. |
| 6,618,711 B1 | 9/2003 | Ananth |
| 6,640,015 B1 | 10/2003 | Lafruit |
| 6,643,620 B1 | 11/2003 | Contolini et al. |
| 6,643,643 B1 | 11/2003 | Lee et al. |
| 6,665,657 B1 | 12/2003 | Dibachi |
| 6,681,032 B2 | 1/2004 | Bortolussi et al. |
| 6,704,725 B1 | 3/2004 | Lee |
| 6,732,149 B1 | 5/2004 | Kephart |
| 6,742,094 B2 | 5/2004 | Igari |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,877,134 B1 | 4/2005 | Fuller et al. |
| 6,901,207 B1 | 5/2005 | Watkins |
| 6,938,025 B1 | 8/2005 | Lulich et al. |
| 6,963,975 B1 | 11/2005 | Weare |
| 6,985,172 B1 | 1/2006 | Rigney et al. |
| 7,013,051 B2 | 3/2006 | Sekiguchi et al. |
| 7,020,654 B1 | 3/2006 | Najmi |
| 7,023,979 B1 | 4/2006 | Wu et al. |
| 7,043,473 B1 | 5/2006 | Rassool et al. |
| 7,158,681 B2 | 1/2007 | Persiantsev |
| 7,215,828 B2 | 5/2007 | Luo |
| 7,260,564 B1 | 8/2007 | Lynn et al. |
| 7,289,643 B2 | 10/2007 | Brunk et al. |
| 7,299,261 B1 | 11/2007 | Oliver et al. |
| 7,302,089 B1 | 11/2007 | Smits |
| 7,302,117 B2 | 11/2007 | Sekiguchi et al. |
| 7,313,805 B1 | 12/2007 | Rosin et al. |
| 7,340,358 B2 | 3/2008 | Yoneyama |
| 7,346,629 B2 | 3/2008 | Kapur et al. |
| 7,353,224 B2 | 4/2008 | Chen et al. |
| 7,376,672 B2 | 5/2008 | Weare |
| 7,383,179 B2 | 6/2008 | Alves et al. |
| 7,433,895 B2 | 10/2008 | Li et al. |
| 7,464,086 B2 | 12/2008 | Black et al. |
| 7,529,659 B2 | 5/2009 | Wold |
| 7,657,100 B2 | 2/2010 | Gokturk et al. |
| 7,660,468 B2 | 2/2010 | Gokturk et al. |
| 7,801,893 B2 | 9/2010 | Gulli |
| 7,805,446 B2 | 9/2010 | Potok et al. |
| 7,860,895 B1 | 12/2010 | Scofield et al. |
| 7,872,669 B2 | 1/2011 | Darrell et al. |
| 7,921,288 B1 | 4/2011 | Hildebrand |
| 7,933,407 B2 | 4/2011 | Keidar et al. |
| 8,023,739 B2 | 9/2011 | Hohimer et al. |
| 8,266,185 B2 | 9/2012 | Raichelgauz et al. |
| 8,275,764 B2 | 9/2012 | Jeon |
| 8,285,718 B1 | 10/2012 | Ong et al. |
| 8,311,950 B1 | 11/2012 | Kunal |
| 8,312,031 B2 | 11/2012 | Raichelgauz et al. |
| 8,315,442 B2 | 11/2012 | Gokturk et al. |
| 8,345,982 B2 | 1/2013 | Gokturk et al. |
| 8,386,400 B2 | 2/2013 | Raichelgauz et al. |
| 8,396,876 B2 | 3/2013 | Kennedy et al. |
| 8,418,206 B2 | 4/2013 | Bryant et al. |
| RE44,225 E | 5/2013 | Aviv |
| 8,442,321 B1 | 5/2013 | Chang et al. |
| 8,457,827 B1 | 6/2013 | Ferguson et al. |
| 8,495,489 B1 | 7/2013 | Everingham |
| 8,527,978 B1 | 9/2013 | Sallam |
| 8,634,980 B1 | 1/2014 | Urmson |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| 8,781,152 B2 | 7/2014 | Momeyer |
| 8,782,077 B1 | 7/2014 | Rowley |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,861 B2 | 10/2014 | Shimizu et al. |
| 8,880,640 B2 | 11/2014 | Graham |
| 8,886,648 B1 | 11/2014 | Procopio et al. |
| 8,954,887 B1 | 2/2015 | Tseng et al. |
| 8,990,199 B1 | 3/2015 | Ramesh et al. |
| 9,009,086 B2 | 4/2015 | Raichelgauz et al. |
| 9,104,747 B2 | 8/2015 | Raichelgauz et al. |
| 9,165,406 B1 | 10/2015 | Gray et al. |
| 9,252,961 B2 | 2/2016 | Bosworth |
| 9,298,763 B1 | 3/2016 | Zack |
| 9,311,308 B2 | 4/2016 | Sankarasubramaniam et al. |
| 9,323,754 B2 | 4/2016 | Ramanathan et al. |
| 9,325,751 B2 | 4/2016 | Bosworth |
| 9,440,647 B1 | 9/2016 | Sucan |
| 9,466,068 B2 | 10/2016 | Raichelgauz et al. |
| 9,542,694 B2 | 1/2017 | Bosworth |
| 9,646,006 B2 | 5/2017 | Raichelgauz et al. |
| 9,679,062 B2 | 6/2017 | Schillings et al. |
| 9,734,533 B1 | 8/2017 | Givot |
| 9,807,442 B2 | 10/2017 | Bhatia et al. |
| 9,875,445 B2 | 1/2018 | Amer et al. |
| 9,911,334 B2 | 3/2018 | Townsend |
| 9,984,369 B2 | 5/2018 | Li et al. |
| 9,996,845 B2 | 6/2018 | Zhang |
| 10,133,947 B2 | 11/2018 | Yang |
| 10,347,122 B2 | 7/2019 | Takenaka |
| 10,491,885 B1 | 11/2019 | Hicks |
| 2001/0019633 A1 | 9/2001 | Tenze et al. |
| 2001/0034219 A1 | 10/2001 | Hewitt et al. |
| 2001/0038876 A1 | 11/2001 | Anderson |

(56) References Cited

U.S. PATENT DOCUMENTS

| | | |
|---|---|---|
| 2002/0004743 A1 | 1/2002 | Kutaragi et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0042914 A1 | 4/2002 | Walker et al. |
| 2002/0072935 A1 | 6/2002 | Rowse et al. |
| 2002/0087530 A1 | 7/2002 | Smith et al. |
| 2002/0087828 A1 | 7/2002 | Arimilli et al. |
| 2002/0091947 A1 | 7/2002 | Nakamura |
| 2002/0103813 A1 | 8/2002 | Frigon |
| 2002/0107827 A1 | 8/2002 | Benitez-Jimenez et al. |
| 2002/0113812 A1 | 8/2002 | Walker et al. |
| 2002/0126002 A1 | 9/2002 | Patchell |
| 2002/0126872 A1 | 9/2002 | Brunk et al. |
| 2002/0129140 A1 | 9/2002 | Peled et al. |
| 2002/0147637 A1 | 10/2002 | Kraft et al. |
| 2002/0152087 A1 | 10/2002 | Gonzalez |
| 2002/0157116 A1 | 10/2002 | Jasinschi |
| 2002/0163532 A1 | 11/2002 | Thomas et al. |
| 2002/0174095 A1 | 11/2002 | Lulich et al. |
| 2002/0184505 A1 | 12/2002 | Mihcak |
| 2003/0004966 A1 | 1/2003 | Bolle et al. |
| 2003/0005432 A1 | 1/2003 | Ellis et al. |
| 2003/0037010 A1 | 2/2003 | Schmelzer |
| 2003/0041047 A1 | 2/2003 | Chang |
| 2003/0089216 A1 | 5/2003 | Birmingham et al. |
| 2003/0093790 A1 | 5/2003 | Logan et al. |
| 2003/0101150 A1 | 5/2003 | Agnihotri et al. |
| 2003/0105739 A1 | 6/2003 | Essafi et al. |
| 2003/0110236 A1 | 6/2003 | Yang et al. |
| 2003/0115191 A1 | 6/2003 | Copperman et al. |
| 2003/0126147 A1 | 7/2003 | Essafi et al. |
| 2003/0140257 A1 | 7/2003 | Peterka et al. |
| 2003/0165269 A1 | 9/2003 | Fedorovskaya et al. |
| 2003/0174859 A1 | 9/2003 | Kim |
| 2003/0184598 A1 | 10/2003 | Graham |
| 2003/0191776 A1 | 10/2003 | Obrador |
| 2003/0200217 A1 | 10/2003 | Ackerman |
| 2003/0217335 A1 | 11/2003 | Chung |
| 2003/0229531 A1 | 12/2003 | Heckerman et al. |
| 2004/0047461 A1 | 3/2004 | Weisman |
| 2004/0059736 A1 | 3/2004 | Willse |
| 2004/0091111 A1 | 5/2004 | Levy |
| 2004/0095376 A1 | 5/2004 | Graham et al. |
| 2004/0098671 A1 | 5/2004 | Graham et al. |
| 2004/0111432 A1 | 6/2004 | Adams et al. |
| 2004/0117638 A1 | 6/2004 | Monroe |
| 2004/0119848 A1 | 6/2004 | Buehler |
| 2004/0128511 A1 | 7/2004 | Sun et al. |
| 2004/0153426 A1 | 8/2004 | Nugent |
| 2004/0162820 A1 | 8/2004 | James et al. |
| 2004/0230572 A1 | 11/2004 | Omoigui |
| 2004/0267774 A1 | 12/2004 | Lin |
| 2005/0010553 A1 | 1/2005 | Liu |
| 2005/0021394 A1 | 1/2005 | Miedema et al. |
| 2005/0080788 A1 | 4/2005 | Murata |
| 2005/0114198 A1 | 5/2005 | Koningstein et al. |
| 2005/0131884 A1 | 6/2005 | Gross et al. |
| 2005/0163375 A1 | 7/2005 | Grady |
| 2005/0172130 A1 | 8/2005 | Roberts |
| 2005/0177372 A1 | 8/2005 | Wang et al. |
| 2005/0193015 A1 | 9/2005 | Logston |
| 2005/0226511 A1 | 10/2005 | Short |
| 2005/0238198 A1 | 10/2005 | Brown et al. |
| 2005/0238238 A1 | 10/2005 | Xu et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0015580 A1 | 1/2006 | Gabriel et al. |
| 2006/0020958 A1 | 1/2006 | Allamanche et al. |
| 2006/0033163 A1 | 2/2006 | Chen |
| 2006/0050993 A1 | 3/2006 | Stentiford |
| 2006/0069668 A1 | 3/2006 | Braddy et al. |
| 2006/0080311 A1 | 4/2006 | Potok et al. |
| 2006/0100987 A1 | 5/2006 | Leurs |
| 2006/0112035 A1 | 5/2006 | Cecchi et al. |
| 2006/0120626 A1 | 6/2006 | Perlmutter |
| 2006/0129822 A1 | 6/2006 | Snijder et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri et al. |
| 2006/0248558 A1 | 11/2006 | Barton et al. |
| 2006/0251292 A1 | 11/2006 | Gokturk |
| 2006/0251338 A1 | 11/2006 | Gokturk |
| 2006/0251339 A1 | 11/2006 | Gokturk |
| 2006/0253423 A1 | 11/2006 | McLane et al. |
| 2006/0288002 A1 | 12/2006 | Epstein |
| 2007/0022374 A1 | 1/2007 | Huang et al. |
| 2007/0033170 A1 | 2/2007 | Sull et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0074147 A1 | 3/2007 | Wold |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0136782 A1 | 6/2007 | Ramaswamy et al. |
| 2007/0156720 A1 | 7/2007 | Maren |
| 2007/0196013 A1 | 8/2007 | Li |
| 2007/0244902 A1 | 10/2007 | Seide et al. |
| 2007/0253594 A1 | 11/2007 | Lu et al. |
| 2007/0298152 A1 | 12/2007 | Baets |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0109433 A1 | 5/2008 | Rose |
| 2008/0152231 A1 | 6/2008 | Gokturk |
| 2008/0159622 A1 | 7/2008 | Agnihotri et al. |
| 2008/0165861 A1 | 7/2008 | Wen et al. |
| 2008/0166020 A1 | 7/2008 | Kosaka |
| 2008/0201299 A1 | 8/2008 | Lehikoinen et al. |
| 2008/0201314 A1 | 8/2008 | Smith et al. |
| 2008/0201326 A1 | 8/2008 | Cotter |
| 2008/0201361 A1 | 8/2008 | Castro et al. |
| 2008/0228995 A1 | 9/2008 | Tan et al. |
| 2008/0237359 A1 | 10/2008 | Silverbrook et al. |
| 2008/0247543 A1 | 10/2008 | Mick et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0270569 A1 | 10/2008 | McBride |
| 2008/0294278 A1 | 11/2008 | Borgeson |
| 2008/0307454 A1 | 12/2008 | Ahanger et al. |
| 2008/0313140 A1 | 12/2008 | Pereira et al. |
| 2009/0022472 A1 | 1/2009 | Bronstein |
| 2009/0024641 A1 | 1/2009 | Quigley et al. |
| 2009/0034791 A1 | 2/2009 | Doretto |
| 2009/0037088 A1 | 2/2009 | Taguchi |
| 2009/0043637 A1 | 2/2009 | Eder |
| 2009/0043818 A1 | 2/2009 | Raichelgauz |
| 2009/0080759 A1 | 3/2009 | Bhaskar |
| 2009/0089251 A1 | 4/2009 | Johnston |
| 2009/0096634 A1 | 4/2009 | Emam et al. |
| 2009/0102835 A1* | 4/2009 | Mikhailov ............... G06T 7/12 |
| | | 345/419 |
| 2009/0125544 A1 | 5/2009 | Brindley |
| 2009/0157575 A1 | 6/2009 | Schobben et al. |
| 2009/0165031 A1 | 6/2009 | Li et al. |
| 2009/0172030 A1 | 7/2009 | Schiff et al. |
| 2009/0208106 A1 | 8/2009 | Dunlop et al. |
| 2009/0208118 A1 | 8/2009 | Csurka |
| 2009/0216761 A1 | 8/2009 | Raichelgauz |
| 2009/0220138 A1 | 9/2009 | Zhang et al. |
| 2009/0245573 A1 | 10/2009 | Saptharishi et al. |

(56) References Cited

U.S. PATENT DOCUMENTS

| | | |
|---|---|---|
| 2009/0254572 A1 | 10/2009 | Redlich et al. |
| 2009/0278934 A1 | 11/2009 | Ecker |
| 2009/0282218 A1 | 11/2009 | Raichelgauz et al. |
| 2009/0297048 A1 | 12/2009 | Slotine et al. |
| 2010/0042646 A1 | 2/2010 | Raichelqauz |
| 2010/0082684 A1 | 4/2010 | Churchill |
| 2010/0104184 A1 | 4/2010 | Bronstein et al. |
| 2010/0111408 A1 | 5/2010 | Matsuhira |
| 2010/0125569 A1 | 5/2010 | Nair et al. |
| 2010/0162405 A1 | 6/2010 | Cook et al. |
| 2010/0191391 A1 | 7/2010 | Zeng |
| 2010/0198626 A1 | 8/2010 | Cho et al. |
| 2010/0212015 A1 | 8/2010 | Jin et al. |
| 2010/0284604 A1 | 11/2010 | Chrysanthakopoulos |
| 2010/0293057 A1 | 11/2010 | Haveliwala et al. |
| 2010/0306193 A1 | 12/2010 | Pereira |
| 2010/0312736 A1 | 12/2010 | Kello |
| 2010/0318493 A1 | 12/2010 | Wessling |
| 2010/0325138 A1 | 12/2010 | Lee et al. |
| 2010/0325581 A1 | 12/2010 | Finkelstein et al. |
| 2011/0029620 A1 | 2/2011 | Bonforte |
| 2011/0035373 A1 | 2/2011 | Berg |
| 2011/0038545 A1 | 2/2011 | Bober |
| 2011/0055585 A1 | 3/2011 | Lee |
| 2011/0164180 A1 | 7/2011 | Lee |
| 2011/0164810 A1 | 7/2011 | Zang et al. |
| 2011/0216209 A1 | 9/2011 | Fredlund et al. |
| 2011/0218946 A1 | 9/2011 | Stern et al. |
| 2011/0246566 A1 | 10/2011 | Kashef |
| 2011/0276680 A1 | 11/2011 | Rimon |
| 2011/0296315 A1 | 12/2011 | Lin et al. |
| 2012/0131454 A1 | 5/2012 | Shah |
| 2012/0133497 A1 | 5/2012 | Sasaki |
| 2012/0136853 A1 | 5/2012 | Kennedy et al. |
| 2012/0167133 A1 | 6/2012 | Carroll et al. |
| 2012/0179642 A1 | 7/2012 | Sweeney et al. |
| 2012/0179751 A1 | 7/2012 | Ahn |
| 2012/0185445 A1 | 7/2012 | Borden et al. |
| 2012/0207346 A1 | 8/2012 | Kohli et al. |
| 2012/0221470 A1 | 8/2012 | Lyon |
| 2012/0227074 A1 | 9/2012 | Hill et al. |
| 2012/0229028 A1 | 9/2012 | Ackermann |
| 2012/0239690 A1 | 9/2012 | Asikainen et al. |
| 2012/0239694 A1 | 9/2012 | Avner et al. |
| 2012/0265735 A1 | 10/2012 | McMillan et al. |
| 2012/0294514 A1 | 11/2012 | Saunders et al. |
| 2012/0299961 A1 | 11/2012 | Ramkumar et al. |
| 2012/0301105 A1 | 11/2012 | Rehg et al. |
| 2012/0331011 A1 | 12/2012 | Raichelgauz et al. |
| 2013/0043990 A1 | 2/2013 | Al-Jafar |
| 2013/0066856 A1 | 3/2013 | Ong et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0103814 A1 | 4/2013 | Carrasco |
| 2013/0151522 A1 | 6/2013 | Aggarwal et al. |
| 2013/0159298 A1 | 6/2013 | Mason et al. |
| 2013/0191323 A1 | 7/2013 | Raichelgauz |
| 2013/0211656 A1 | 8/2013 | An |
| 2013/0212493 A1 | 8/2013 | Krishnamurthy |
| 2013/0226820 A1 | 8/2013 | Sedota, Jr. |
| 2013/0226930 A1 | 8/2013 | Arngren |
| 2013/0227023 A1 | 8/2013 | Raichelgauz et al. |
| 2013/0283401 A1 | 10/2013 | Pabla et al. |
| 2013/0346412 A1 | 12/2013 | Raichelgauz et al. |
| 2014/0019264 A1 | 1/2014 | Wachman et al. |
| 2014/0025692 A1 | 1/2014 | Pappas |
| 2014/0040232 A1 | 2/2014 | Raichelgauz |
| 2014/0059443 A1 | 2/2014 | Tabe |
| 2014/0095425 A1 | 4/2014 | Sipple |
| 2014/0111647 A1 | 4/2014 | Atsmon |
| 2014/0125703 A1 | 5/2014 | Roveta et al. |
| 2014/0147829 A1 | 5/2014 | Jerauld |
| 2014/0149443 A1 | 5/2014 | Raichelgauz |
| 2014/0149918 A1 | 5/2014 | Asokan et al. |
| 2014/0152698 A1 | 6/2014 | Kim et al. |
| 2014/0156691 A1 | 6/2014 | Conwell |
| 2014/0169681 A1 | 6/2014 | Drake |
| 2014/0176604 A1 | 6/2014 | Venkitaraman et al. |
| 2014/0188786 A1 | 7/2014 | Raichelgauz |
| 2014/0189536 A1 | 7/2014 | Lange |
| 2014/0193077 A1 | 7/2014 | Shiiyama et al. |
| 2014/0198986 A1 | 7/2014 | Marchesotti |
| 2014/0201330 A1 | 7/2014 | Lozano Lopez |
| 2014/0250032 A1 | 9/2014 | Huang et al. |
| 2014/0282655 A1 | 9/2014 | Roberts |
| 2014/0300722 A1 | 10/2014 | Garcia |
| 2014/0330830 A1 | 11/2014 | Raichelgauz et al. |
| 2014/0341471 A1 | 11/2014 | Ono |
| 2014/0341476 A1 | 11/2014 | Kulick et al. |
| 2014/0363044 A1 | 12/2014 | Williams et al. |
| 2014/0379477 A1 | 12/2014 | Sheinfeld |
| 2015/0009129 A1 | 1/2015 | Song |
| 2015/0033150 A1 | 1/2015 | Lee |
| 2015/0052089 A1 | 2/2015 | Kozloski et al. |
| 2015/0081725 A1 | 3/2015 | Ogawa |
| 2015/0100562 A1 | 4/2015 | Kohlmeier et al. |
| 2015/0117784 A1 | 4/2015 | Lin |
| 2015/0120627 A1 | 4/2015 | Hunzinger et al. |
| 2015/0127516 A1 | 5/2015 | Studnitzer et al. |
| 2015/0134318 A1 | 5/2015 | Cuthbert |
| 2015/0134688 A1 | 5/2015 | Jing |
| 2015/0154189 A1 | 6/2015 | Raichelgauz |
| 2015/0242689 A1 | 8/2015 | Mau |
| 2015/0248586 A1 | 9/2015 | Gaidon et al. |
| 2015/0254344 A1 | 9/2015 | Kulkarni et al. |
| 2015/0286742 A1 | 10/2015 | Zhang et al. |
| 2015/0286872 A1 | 10/2015 | Medioni et al. |
| 2015/0317836 A1 | 11/2015 | Beaurepaire |
| 2015/0324356 A1 | 11/2015 | Gutierrez et al. |
| 2015/0332588 A1 | 11/2015 | Bulan et al. |
| 2015/0363644 A1 | 12/2015 | Wnuk |
| 2016/0007083 A1 | 1/2016 | Gurha |
| 2016/0026707 A1 | 1/2016 | Ong et al. |
| 2016/0132194 A1 | 5/2016 | Grue et al. |
| 2016/0171785 A1 | 6/2016 | Banatwala |
| 2016/0210525 A1 | 7/2016 | Yang |
| 2016/0221592 A1 | 8/2016 | Puttagunta |
| 2016/0275766 A1 | 9/2016 | Venetianer et al. |
| 2016/0306798 A1 | 10/2016 | Guo et al. |
| 2016/0307048 A1 | 10/2016 | Krishnamoorthy |
| 2016/0342683 A1 | 11/2016 | Kwon |
| 2016/0342863 A1 | 11/2016 | Kwon |
| 2016/0357188 A1 | 12/2016 | Ansari |
| 2017/0017638 A1 | 1/2017 | Satyavarta et al. |
| 2017/0032257 A1 | 2/2017 | Sharifi |
| 2017/0041254 A1 | 2/2017 | Agara Venkatesha Rao |
| 2017/0066452 A1 | 3/2017 | Scofield |
| 2017/0072851 A1 | 3/2017 | Shenoy |
| 2017/0109602 A1 | 4/2017 | Kim |
| 2017/0150047 A1 | 5/2017 | Jung |
| 2017/0154241 A1 | 6/2017 | Shambik et al. |
| 2017/0255620 A1 | 9/2017 | Raichelgauz |
| 2017/0259819 A1 | 9/2017 | Takeda |
| 2017/0262437 A1 | 9/2017 | Raichelgauz |
| 2017/0277691 A1 | 9/2017 | Agarwal |
| 2017/0323568 A1 | 11/2017 | Inoue |
| 2018/0081368 A1 | 3/2018 | Watanabe |
| 2018/0101177 A1 | 4/2018 | Cohen |
| 2018/0108258 A1 | 4/2018 | Dilger |
| 2018/0157903 A1 | 6/2018 | Tu et al. |
| 2018/0157916 A1 | 6/2018 | Doumbouya |
| 2018/0158323 A1 | 6/2018 | Takenaka |
| 2018/0189613 A1 | 7/2018 | Wolf et al. |
| 2018/0204111 A1 | 7/2018 | Zadeh |
| 2018/0286239 A1 | 10/2018 | Kaloyeros |
| 2018/0300654 A1 | 10/2018 | Prasad |
| 2018/0373929 A1 | 12/2018 | Ye |
| 2019/0005726 A1 | 1/2019 | Nakano |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0061784 A1 | 2/2019 | Koehler |

(56) References Cited

U.S. PATENT DOCUMENTS

| | | |
|---|---|---|
| 2019/0065951 A1 | 2/2019 | Luo |
| 2019/0096135 A1 | 3/2019 | Mutto et al. |
| 2019/0171912 A1 | 6/2019 | Vallespi-Gonzalez et al. |
| 2019/0188501 A1 | 6/2019 | Ryu |
| 2019/0220011 A1 | 7/2019 | Della Penna |
| 2019/0236954 A1 | 8/2019 | Komura |
| 2019/0279046 A1 | 9/2019 | Han et al. |
| 2019/0304102 A1 | 10/2019 | Chen et al. |
| 2019/0317513 A1 | 10/2019 | Zhang |
| 2019/0320512 A1 | 10/2019 | Zhang |
| 2019/0364492 A1 | 11/2019 | Azizi |
| 2019/0384303 A1 | 12/2019 | Muller |
| 2019/0384312 A1 | 12/2019 | Herbach |
| 2019/0385460 A1 | 12/2019 | Magzimof |
| 2019/0389459 A1 | 12/2019 | Berntorp |
| 2019/0392710 A1 | 12/2019 | Kapoor |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |

FOREIGN PATENT DOCUMENTS

| | | | |
|---|---|---|---|
| WO | 2003067467 | A1 | 8/2003 |
| WO | 2005027457 | A1 | 3/2005 |
| WO | 2007049282 | A2 | 5/2007 |
| WO | 2014076002 | A1 | 5/2014 |
| WO | 2014137337 | A1 | 9/2014 |
| WO | 2016040376 | A1 | 3/2016 |
| WO | 2016070193 | A1 | 5/2016 |

OTHER PUBLICATIONS

Ren, Shaoqing, et al. "Faster r-cnn: Towards real-time object detection with region proposal networks." IEEE transactions on pattern analysis and machine intelligence 39.6 (2016): 1137-1149 (Year: 2016).*

Felzenszwalb, Pedro F., et al. "Objectdetection with discriminatively trained part-based models." IEEE transactions on pattern analysis and machine intelligence 32.9 (2009): 1627-1645. (Year: 2009).*

Lin, Tsung-Yi, et al. "Feature pyramid networks for object detection." Proceedings of the IEEE conference on computer vision and pattern recognition. 2017. (Year: 2017).*

Mihail Eric, "Fast Object Detection With Fast R-CNN", posted Oct. 2018,https://www.mihaileric.com/posts/fast-object-detection-with-fast-rcnn/ (Year: 2018).*

Tang, Shijian, and Ye Yuan. "Object detection based on convolutional neural network." International Conference-IEEE-2016. 2015. (Year: 2015).*

Jasinschi et al., A Probabilistic Layered Framework for Integrating Multimedia Content and Context Information, 2002, IEEE, p. 2057-2060. (Year: 2002).

Jones et al., "Contextual Dynamics of Group-Based Sharing Decisions", 2011, University of Bath, p. 1777-1786. (Year: 2011).

Iwamoto, "Image Signature Robust to Caption Superimpostion for Video Sequence Identification", IEEE, pp. 3185-3188 (Year: 2006).

Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year; 2016).

Chen, Yixin, James Ze Wang, and Robert Krovetz. "CLUE: cluster-based retrieval of images by unsupervised learning." IEEE transactions on Image Processing 14.8 (2005); 1187-1201. (Year: 2005).

Wusk et al (Non-Invasive detection of Respiration and Heart Rate with a Vehicle Seat Sensor; www.mdpi.com/journal/sensors; Published: May 8, 2018). (Year: 2018).

Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).

Zhou et al, "Ensembling neural networks: Many could be better than all", National Laboratory for Novel Software Technology, Nanjing University, Hankou Road 22, Nanjing 210093, PR China, Available online Mar. 12, 2002, pp. 239-263.

Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.

Zhu et al., "Technology-Assisted Dietary Assesment", Proc SPIE. Mar. 20, 2008, pp. 1-15.

Zou et al., "A Content-Based Image Authentication System with Lossless Data Hiding", ICME 2003, pp. 213-216.

Boari et al, "Adaptive Routing for Dynamic Applications in Massively Parallel Architectures", 1995 IEEE, Spring 1995, pp. 1-14.

Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al, "Feed-forward Echo State Networks", Proceedings of International Joint Conference on Neural Networks, Montreal, Canada, Jul. 31-Aug. 4, 2005, pp. 1-4.

Chinchor, Nancy A. et al.; Multimedia Analysis+Visual Analytics= Multimedia Analytics; IEEE Computer Society 2010; pp. 52-60. (Year: 2010).

Fathy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.

Freisleben et al, "Recognition of Fractal Images Using a Neural Network", Lecture Notes in Computer Science, 1993, vol. 6861, 1993, pp. 631-637.

Garcia, "Solving the Weighted Region Least Cost Path Problem Using Transputers", Naval Postgraduate School, Monterey, California, Dec. 1989.

Guo et al, AdOn: An Intelligent Overiay Video Advertising System (Year: 2009).

Hogue, "Tree Pattern Inference and Matching for Wrapper Induction on the World Wide Web", Master's Thesis, Massachusetts Institute of Technology, Jun. 2004, pp. 1-106.

Howlett et al, "A Multi-Computer Neural Network Architecture in a Virtual Sensor System Application", International journal of knowledge-based intelligent engineering systems, 4 (2). pp. 86-93, 133N 1327-2314.

Hua et al., "Robust Video Signature Based on Ordinal Measure", Image Processing, 2004,2004 International Conference on Image Processing (ICIP), vol. 1, IEEE, pp. 685-688, 2004.

International Search Report and Written Opinion for PCT/US2016/050471, ISA/RU, Moscow, RU, dated May 4, 2017.

International Search Report and Written Opinion for PCT/US2016/054634, ISA/RU, Moscow, RU, dated Mar. 16, 2017.

International Search Report and Written Opinion for PCT/US2017/015831, ISA/RU, Moscow, RU, dated Apr. 20, 2017.

Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.

Lau et al., "Semantic Web Service Adaptation Model for a Pervasive Learning Scenario", 2008 IEEE Conference on Innovative Technologies in Intelligent Systems and Industrial Applications, 2008, pp. 98-103.

Li et al ("Matching Commercial Clips from TV Streams Using a Unique, Robust and Compact Signature" 2005) (Year: 2005).

(56) References Cited

OTHER PUBLICATIONS

Lin et al., "Generating robust digital signature for image/video authentication", Multimedia and Security Workshop at ACM Multimedia '98, Bristol, U.K., Sep. 1998, pp. 245-251.
Lu et al, "Structural Digital Signature for Image Authentication: An Incidental Distortion Resistant Scheme", IEEE Transactions on Multimedia, vol. 5, No. 2, Jun. 2003, pp. 161-173.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
Ma Et El "Semantics modeling based image retrieval system using neural networks", 2005.
Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.
May et al, "The Transputer", Springer-Verlag Berlin Heidelberg 1989, vol. 41.
Mcnamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on CONTROL '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Odinaev et al, "Cliques in Neural Ensembles as Perception Carriers", Technion—Institute of Technology, 2006 International Joint Conference on neural Networks, Canada, 2006, pp. 285-292.
Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.
Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).
Queluz, "Content-Based Integrity Protection of Digital Images", SPIE Conf. on Security and Watermarking of Multimedia Contents, San Jose, Jan. 1999, pp. 85-93.
Rui, Yong et al. "Relevance feedback: a power tool for interactive content-based image retrieval." IEEE Transactions on circuits and systems for video technology 8.5 (1998): 644-655.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.
Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al, "A Robust Content based Digital Signature for Image Authentication", Proc. ICIP 1996, Lausane, Switzerland, Oct. 1996, pp. 227-230.
Srihari et al., "Intelligent Indexing and Semantic Retrieval of Multimodal Documents", Kluwer Academic Publishers, May 2000, vol. 2, Issue 2-3, pp. 245-275.
Srihari, Rohini K. "Automatic indexing and content-based retrieval of captioned images" Computer 0 (1995): 49-56.
Stolberg et al ("Hibrid-SOC: A Multi-Core SOC Architecture for Multimedia Signal Processing" 2003).
Stolberg et al, "Hibrid-SOC: A Mul ti-Core SOC Architecture for Mul timedia Signal Processing", 2003 IEEE, pp. 189-194.
Theodoropoulos et al, "Simulating Asynchronous Architectures on Transputer Networks", Proceedings of the Fourth Euromicro Workshop on Parallel and Distributed Processing, 1996 PDP '96, pp. 274-281.
Vallet et al ("Personalized Content Retrieval in Context Using Ontological Knowledge" Mar. 2007) (Year: 2007).
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onImage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.
Yanagawa et al, "Columbia University's Baseline Detectors for 374 LSCOM Semantic Visual Concepts", Columbia University ADVENT Technical Report # 222-2006-8, Mar. 20, 2007, pp. 1-17.
Yanagawa et al., "Columbia University's Baseline Detectors for 374 LSCOM Semantic Visual Concepts", Columbia University ADVENT Technical Report #222, 2007, pp. 2006-2008.
Akira et al., "Columbia University's Baseline Detectors for 374 LSCOM Semantic Visual Concepts", Columbia University ADVENT Technical Report #222-2006-8, Mar. 20, 2007, pp. 17.
Amparo et al., "Real Time Speaker Localization and Detection System for Camera Steering in Multiparticipant Videoconferencing Environments", IEEE International Conference on Acoustics, Speech and Signal Processing 2011,pp. 2592-2595.
Boari et al., "Adaptive Routing for Dynamic Applications in Massively Parallel Architectures", IEEE Parallel & Distributed Technology: Systems & Applications (vol. 3, Issue: 1, Spring 1995), pp. 61-74.
Boyer et al., "A Crossover Operator for Evolutionary Algorithms Based on Population Features", Journal of Artificial Intelligence Research vol. 24 (2005) pp. 1-48.
Brecheisen et al., ""Hierarchical Genre Classification for Large Music Collections"", IEEE International Conference on Multimedia and Expo (ICME) 2006, pp. 1385-1388.
Burgsteiner et al., "Movement prediction from real-world images using a liquid state machine",International Conference on Industrial, Engineering and Other Applications of Applied Intelligent Systems IEA/AIE 2005: Innovations in Applied Artificial Intelligence, pp. 121-130.
Cernansky et al., "Feed-forward echo state networks", IEEE International Joint Conference on Neural Networks, 2005, vol. 3, pp. 1479-1482.
Chang et al., "VideoQ: a fully automated video retrieval system using motion sketches", Fourth IEEE Workshop on Applications of Computer Vision. WACV'98 (Cat. No. 98EX201), Oct. 19-21, 1998, pp. 270-271.
Cho et al."Efficient Motion-Vector-Based Video Search Using Query by Clip", IEEE International Conference on Multimedia and Expo (ICME) (IEEE Cat. No. 04TH8763), Year: 2004, vol. 2, pp. 1027-1030.
Clement et al."Speaker diarization of heterogeneous web video files: A preliminary study", IEEE International Conference on Acoustics, Speech and Signal Processing (ICASSP),May 22-27, 2011 pp. 4432-4435.
Cococcioni et al., "Automatic diagnosis of defects of rolling element bearings based on computational intelligence techniques", Ninth International Conference on Intelligent Systems Design and Applications, Nov. 30-Dec. 2, 2009, pp. 970-975.
Emami et al., "Role of Spatiotemporal Oriented Energy Features for Robust Visual Tracking in Video Surveillance", IEEE Ninth International Conference on Advanced Video and Signal-Based Surveillance Sep. 18-21, 2012, pp. 349-354.

(56) References Cited

OTHER PUBLICATIONS

Fathy et al., "A parallel design and implementation for backpropagation neural network using MIMD architecture", 8th Mediterranean Electrotechnical Conference on Industrial Applications in Power Systems, Computer Science and Telecommunications (MELECON 96) ,May 16, 1996,1472-1476.

Foote et al.,"Content-based retrieval of music and audio", Multimedia Storage and Archiving Systems II, Published in SPIE Proceedings vol. 3229, Oct. 6, 1997, p. 1.

Freisleben et al., "Recognition of fractal images using a neural network",New Trends in Neural Computation, International Workshop on Artificial Neural Networks, IWANN '93 Sitges, Spain, Jun. 9-11, 1993: , pp. 632-637.

Ivan Garcia, "Solving The Weighted Region Least Cost Path Problem Using Transputers", Naval Postgraduate School Monterey, California ,1989 pp. 73.

Gomes et al., "Audio Watermarking and Fingerprinting: For Which Applications?", Journal of New Music Research 32(1) Mar. 2003 p. 1.

Gong et al., "A Knowledge-Based Mediator for Dynamic Integration of Heterogeneous Multimedia Information Sources", International Symposium on Intelligent Multimedia, Video and Speech Processing, Oct. 20-22, 2004, pp. 467-470.

Guo et al., "AdOn: An Intelligent Overlay Video Advertising System", https://doi.org/10.1145/1571941.1572049, Jul. 2009, pp. 628-629.

Howlett et al., "A Multi-Computer Neural Network Architecture in a Virtual Sensor System Application", International Journal of Knowledge-Based and Intelligent Engineering Systems, vol. 4, Published—Apr. 2000 pp. 86-93.

Hua et al., "Robust Video Signature Based on Ordinal Measure", International Conference on Image Processing ICIP '04. 2004, Oct. 24-27, 2004, pp. 5.

Iwamoto et al, "Image Signature Robust to Caption Superimposition for Video Sequence Identification", 2006 International Conference on Image Processing ,IEEE, Atlanta, GA, Oct. 8-11, 2006, pp. 3185-3188.

Herbert Jaeger, "The"echo state" approach to analysing and training recurrent neural networks", Bonn, Germany: German National Research Center for Information Technology GMD Technical Report, 148 ,2001, pp. 43.

Jianping Fan et al., "Concept-Oriented Indexing of Video Databases: Toward Semantic Sensitive Retrieval and Browsing", IEEE Transactions on Image Processing, vol. 13, No. 7, Jul. 2004, p. 1.

John L. Johnson., Pulse-coupled neural nets: translation, rotation, scale, distortion, and intensity signal invariance for images, vol. 33, No. 26, Applied Optics, Sep. 10, 1994, pp. 6239-6253.

Odinaev et al., "Cliques in Neural Ensembles as Perception Carriers", 2006 International Joint Conference on Neural Networks Sheraton Vancouver Wail Centre Hotel, Vancouver, BC, Canada Jul. 16-21, 2006, pp. 285-292.

Kabary et al., "SportSense: Using Motion Queries to Find Scenes in Sports Videos", DOI: 10.1145/2505515.2508211, Oct. 2013, pp. 2489-2491.

Keiji Yanai., "Generic Image Classification Using Visual Knowledge on the Web", DOI: 10.1145/957013.957047, Jan. 2003, pp. 167-176.

Lau et al., "Semantic Web Service Adaptation Model for a Pervasive Learning Scenario", Proceedings of the 2008 IEEE Conference on innovative Technologies in Intelligent Systems and Industrial Applications Multimedia University, Cyberjaya, Malaysia. Jul. 12-13, 2008, pp. 98-103.

Li et al., "Matching Commercial Clips from TV Streams Using a Unique, Robust and Compact Signature", DOI: 10.1109/DICTA. 2005.52, Jan. 2006, pp. 7.

Lin et al., "Generating Robust Digital Signature for Image/Video Authentication", Multimedia and Security Workshop at ACM Multimedia '98. Bristol. U.K., Sep. 1998, pp. 49-54.

Löytynoja et al., "Audio Encryption Using Fragile Watermarking", DOI: 10.1109/ICICS.2005.1689175, Jul. 2015, pp. 881-885.

Richard F. Lyon., "Computational Models of Neural Auditory Processing", DOI: 10.1109/ICASSP.1984.1172756, ICASSP '84. IEEE International Conference on Acoustics, Speech, and Signal Processing, Jan. 29, 2003, pp. 5.

Maass et al., "Computational Models for Generic Cortical Microcircuits", DOI: 10.1201/9780203494462.ch18, Jun. 10, 2003, pp. 1-26.

Mahdhaoui et al., "Emotional speech characterization based on multi-features fusion for face-to-face interaction", 2009 International conference on signals, circuits and systems ,DOI: 10.1109/ICSCS.2009.5412691, Dec. 2009, pp. 1-6.

May et al., "The Transputer", Neural Computers. Springer Study Edition, vol. 41. Springer, Berlin, Heidelberg, DOI: 10.1007/978-3-642-83740-1_48, Jan. 1989 pp. 477-486.

McNamara et al., "Diversity Decay in Opportunistic Content Sharing Systems", DOI: 10.1109/WoWMoM.2011.5986211 2011 IEEE International Symposium on a World of Wireless, Mobile and Multimedia Networks Aug. 15, 2011, pp. 1-3.

Mei et al., "Contextual in-image Advertising",MM'OS, Oct. 26-31, 2008. Vancouver, British Columbia, Canada. Copyright 2008 ACM 978-1-60558-303-7/08/10, DOI: 10.1145/1459359.1459418•Source: DBLP, Jan. 2008, pp. 439-448.

Mei et al., "VideoSense—Towards Effective Online Video Advertising", MM'07, Sep. 23-28, 2007, Augsburg, Bavaria, Germany. Copyright 2007 ACM 978-1-59593-701-8/07/0009 . . . $5.00, Jan. 2007, pp. 1075-1084.

Mladenovic et al., "Electronic Tour Guide for Android Mobile Platform with Multimedia Travel Book" 20th Telecommunications forum TELFOR 2012, DOI: 10.1109/TELFOR.2012.6419494, Nov. 20-22, 2012, pp. 1460-1463.

Morad et al., "Performance, Power Efficiency and Scalability of Asymmetric Cluster Chip Multiprocessors", IEEE Computer Architecture Letters, vol. 5, 2006, DOI 10.1109/L-CA.2006.6, Jul. 5, 2006, pp. 4.

Nagy et al., "A Transputer Based, Flexible, Real-Time Control System for Robotic Manipulators", UKACC International Conference on CONTROL '96, Conference Publication No. 427 © IEE 1996, Sep. 2-5, 1996, pp. 84-89.

Nam et al., "Audio-Visual Content-Based Violent Scene Characterization", Proceedings 1998 International Conference on Image Processing. ICIP98 (Cat. No. 98CB36269), DOI: 10.1109/ICIP. 1998.723496, pp. 353-357.

Natschläger et al., "The "Liquid Computer": A Novel Strategy for Real-Time Computing on Time Series", Jan. 2002, pp. 1-7.

Nouza et al., "Large-Scale Processing, Indexing and Search System for Czech Audio-Visual Cultural Heritage Archives", DOI: 10.1109/MMSP.2012.6343465, Sep. 2012, pp. 337-342.

Odinaev., "Cliques tu Neural Ensembles as Perception Carriers", 2006 International Joint Conference on Neural Networks Sheraton Vancouver Wail Centre Hotel, Vancouver, BC, Canada, DOI: 10.1109/IJCNN.2006.246693, Jul. 16-21, 2006, pp. 285-292.

Park et al., "Compact Video Signatures for Near-Duplicate Detection on Mobile Devices", DOI: 10.1109/ISCE.2014.6884293, Jun. 2014, pp. 1-2.

Maria Paula Queluz., "Content-based integrity protection of digital images", San Jose. California •Jan. 1999 SPIE vol. 3657 •0277-786X/99/$10.00, DOI: 10.1117/12.344706, Apr. 1999, pp. 85-93.

Raichelgauz et al., "Co-evoletiooary Learning in Liquid Architectures", DOI: 10.1007/11494669_30, Jun. 2005, pp. 241-248.

Ribert et al., "An Incremental Hierarchical Clustering", Vision Interface '99, Trois-Rivieres, Canada, May 19-21, pp. 586-591.

Lin et al., "Summarization of Large Scale Social Network Activity", DOI: 10.1109/ICASSP.2009.4960375, Apr. 2009, pp. 3481-3484.

Santos et al., "SCORM-MPEG: an ontology of interoperable metadata for Multimedia and e-Learning", DOI: 10.1109/SOFTCOM.2015. 7314122, Nov. 2, 2015, pp. 5.

Scheper et al.,"Nonlinear dynamics in neural computation", ESANN, 14th European Symposium on Artificial Neural Networks, Jan. 2006, pp. 491-502.

Schneider et al., "A Robust Content Based Digital Signature for Image Authentication", 3rd IEEE International Conference on Image Processing, Sep. 19, 2006, pp. 227-230.

(56) References Cited

OTHER PUBLICATIONS

Semizarov et al.,"Specificity of short interfering RNA determined through gene expression signatures", PNAS vol. 100 (11), May 27, 2003, pp. 6347-6352.
Sheng Hua et al., "Robust video signature based on ordinal measure", ICIP '04. 2004 International Conference on Image Processing, Oct. 2004, pp. 685-688.
Stolberg et al., "HiBRID-SoC: A multi-core SoC architecture for multimedia signal processing. VLSI Signal Processing", Journal of VLSI Signal Processing vol. 41(1), Aug. 2005, pp. 9-20.
Theodoropoulos et al., "Simulating asynchronous architectures on transputer networks", 4th Euromicro Workshop on Parallel and Distributed Processing, Braga, Portugal, 1996, pp. 274-281.
Vailaya et al., "Content-Based Hierarchical Classification of Vacation Images", International Conference on Multimedia Computing and Systems, vol. 1, DOI—10.1109/MMCS.1999.779255, Jul. 1999, pp. 518-523.
Verstraeten et al., "Isolated word recognition with the Liquid State Machine: A case study", Information Processing Letters, vol. 95(6), Sep. 2005, pp. 521-528.
Vallet et al., "Personalized Content Retrieval in Context Using Ontological Knowledge", in IEEE Transactions on Circuits and Systems for Video Technology, vol. 17, No. 3, Mar. 2007, pp. 336-346.
Wang et al., "Classifying objectionable websites based on image content" Interactive Distributed Multimedia Systems and Telecommunication Services, vol. 1483, 1998, pp. 113-124.
Wang et al., "A Signature for Content-Based Image Retrieval Using a Geometrical Transform", 6th ACM International Conference on Multimedia, Multimedia 1998, pp. 229-234.
Ware et al., "Locating and identifying components in a robot's workspace using a hybrid computer architecture", 10th International Symposium on Intelligent Control, 1995, pp. 139-144.
Li et al. "Exploring Visual and Motion Saliency for Automatic Video Object Extraction", in IEEE Transactions on Image Processing, vol. 22, No. 7, Jul. 2013, pp. 2600-2610.
Colin Whitby-Strevens, "The transputer", 12th annual international symposium on Computer architecture (ISCA), IEEE Computer Society Press, Jun. 1985, pp. 292-300.
Wilk et al., "The potential of social-aware multimedia prefetching on mobile devices", International Conference and Workshops on Networked Systems (NetSys 2015) Mar. 2015, p. 1.
Andrew William Hogue, "Tree pattern inference and matching for wrapper induction on the World Wide Web", May 13, 2014, pp. 106.
Liu et al. "Instant Mobile Video Search With Layered Audio-Video Indexing and Progressive Transmission", IEEE Transactions on Multimedia 16(8, Dec. 2014, pp. 2242-2255.
Raichelgauz et al., "Natural Signal Classification by Neural Cliques and Phase-Locked Attractors", International Conference of the IEEE Engineering in Medicine and Biology Society, 2006, pp. 6693-6697.
Lin et al., "Robust digital signature for multimedia authentication", IEEE Circuits and Systems Magazine, vol. 3, No. 4, 2003, pp. 23-26.
Zang et al., "A New Multimedia Message Customizing Framework for mobile Devices", IEEE International Conference on Multimedia and Expo, 2007, pp. 1043-1046.
Zhou et al., "Ensembling neural networks: Many could be better than all", Artificial Intelligence, vol. 137, 2002, pp. 239-263.
Zhou et al., "Medical diagnosis with C4.5 rule preceded by artificial neural network ensemble", IEEE Transactions on Information Technology in Biomedicine, vol. 7, No. 1, Mar. 2003, pp. 37-42.
Zhu et al., "Technology-Assisted Dietary Assessment", SPIE. 6814. 681411, 2008, p. 1.
Zou et al., "A content-based image authentication system with lossless data hiding", International Conference on Multimedia and Expo. ICME, 2003, pp. II(213)-II(216).
"Computer Vision Demonstration Website", Electronics and Computer Science, University of Southampton, 2005, USA.
Guo et al., AdOn: An Intelligent Overlay Video Advertising System (Year: 2009).
Jasinschi, Radu S., et al. "A probabilistic layered framework for integrating multimedia content and context information." 2002 IEEE International Conference on Acoustics, Speech, and Signal Processing. vol. 2. IEEE, 2002. (Year: 2002).
Gull et al., "A Clustering Technique to Rise Up the Marketing Tactics by Looking Out The Key Users Taking Facebook as a Case study", 2014, IEEE International Advance Computing Conference (IACC), 579-585 (Year: 2014).
Zhang et al., "Dynamic Estimation of Family Relations from Photos", 2011, Advances in Multimedia Modeling. MMM 2011, pp. 65-76 (Year: 2011).
Chen, "CLUE: Cluster-Based Retrieval of Images by Unsupervised Learning", IEEE, vol. 14 pp. 1187-1201 (Year: 2005).
Troung, "CASIS: A System for Concept-Aware Social Image Search", 2012 (Year: 2012).
Cody, W.F. et al. (Mar. 1995). "Querying multimedia data from multiple repositories by content: the Garlic project". In Working Conference on Visual Database Systems (pp. 17-35). Springer, Boston, MA. (Year: 1995).
Schneider, J.M. (Ot. 2015). "New approaches to interactive multimedia content retrieval from different sources". Diss. Universidad Carlos III de Madrid. 274 pages. (Year: 2015).
Yong, N .S. (2008). "Combining multi modal external resources for event-based news video retrieval and question answering". PhD Diss, National University Singapore. 140 pages. (Year: 2008.
Kennedy, L. et al. (2008). "Query-adaptive fusion for multimodal search". Proceedings of the IEEE, 96(4), 567-588. (Year: 2008).
Sang Hyun Joo, "Real time traversability analysis to enhance rough terrain navigation for an 6×6 autonomous vehicle", 2013 (Year: 2013).

* cited by examiner

Searching for overlaps between regions of interest (of the k'th iteration expansion operation results) and define regions of interest that are related to the overlaps 5031

Determine to drop one or more region of interest, and dropping according to the determination 5032

Searching for relationships between regions of interest (of the k'th iteration expansion operation results) and define regions of interest that are related to the relationship 5033

Searching for proximate regions of interest (of the k'th iteration expansion operation results) and define regions of interest that are related to the proximity 5034

Searching for relationships between regions of interest (of the k'th iteration expansion operation results) and define regions of interest that are related to the relationship 5035

Merging and/or dropping k'th iteration regions of interest based on shape information related to the k'th iteration regions of interest 5036

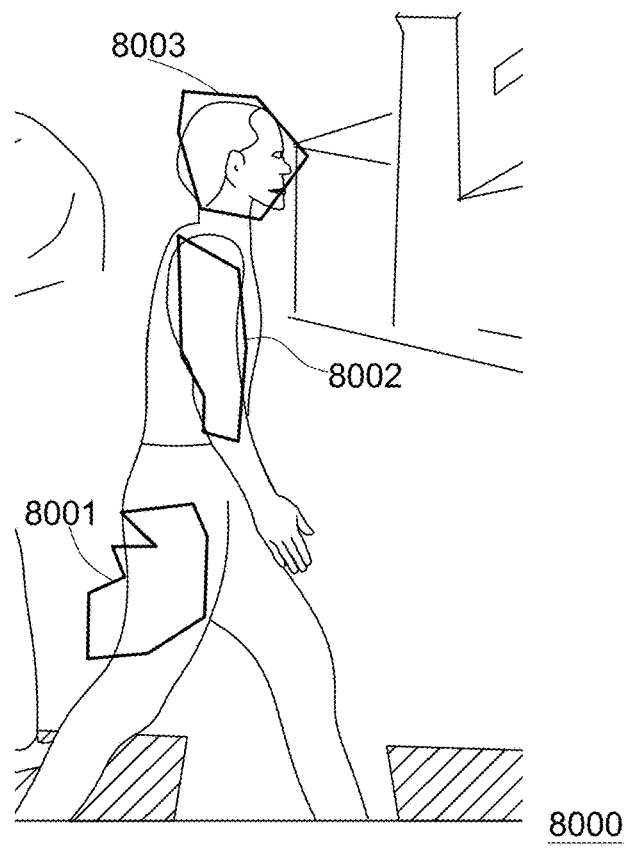
SIGNATURE 8010={ID1 8011,..., ID2 8012,..., ID3 8013,..., ID4 8014 ...}
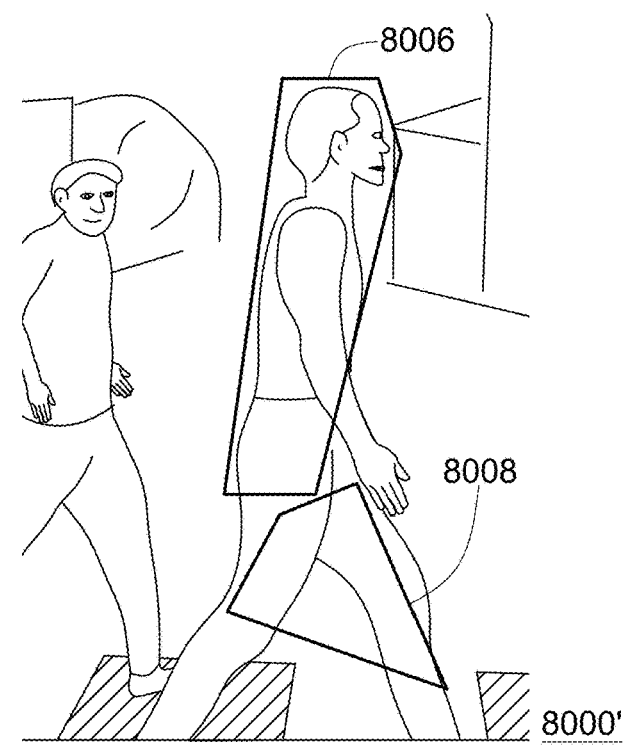
SIGNATURE 8010'={ID6 8016,..., ID8 8018,...}
FIG. 2A

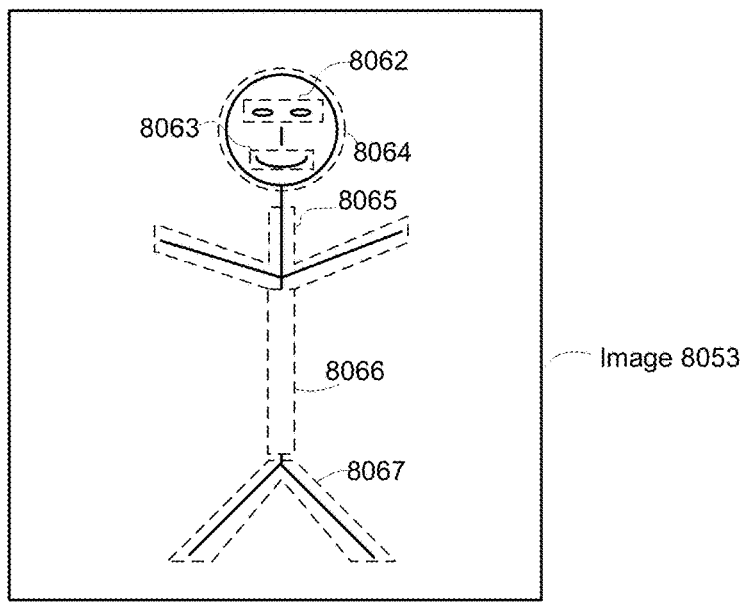
Signature 8053' = {ID62, ID63,..., ID64,.., ID65,..., ID66, ID67}
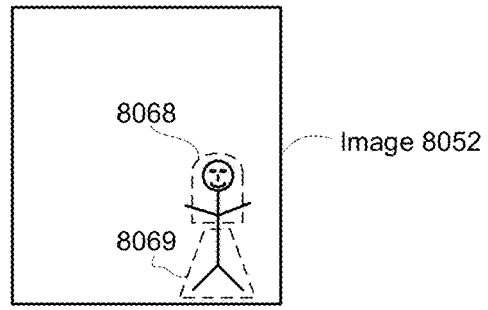
Signature 8052' = {...,ID68,.., ID69}
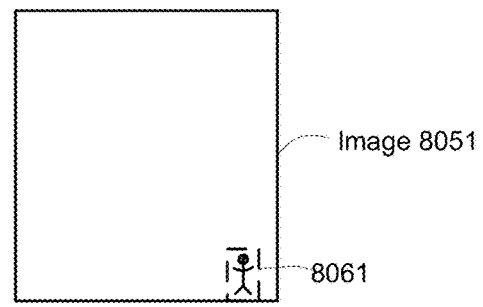
Signature 8051' = {...ID61...}
FIG. 2B

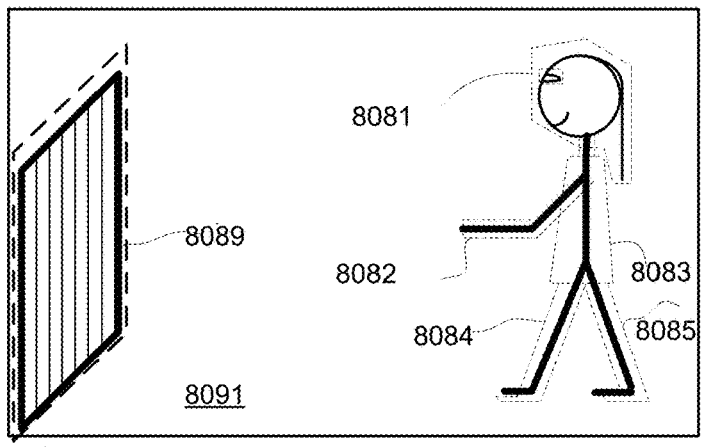
Signature 8091' = {ID81, ID82, ID83, ID84, ID85, ID89}
Location information 8091" = {L81, L82, L83, L84, L85, L89}
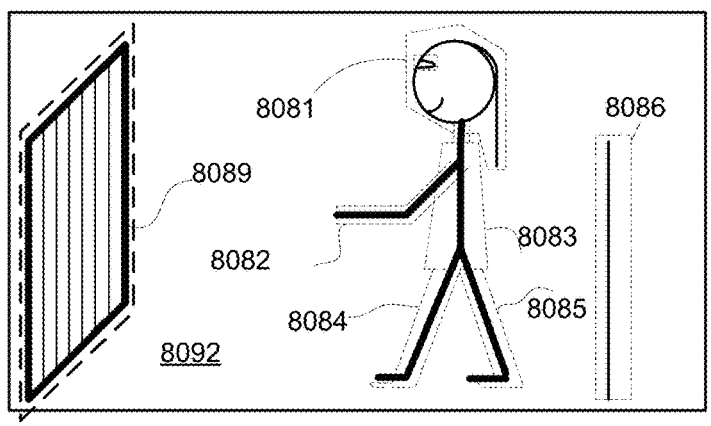
Signature 8092' = {ID81, ID82, ID83, ID84, ID85, ID86, ID89}
Location information 8092" = {L81, L82, L83, L84, L85, L86, L89}
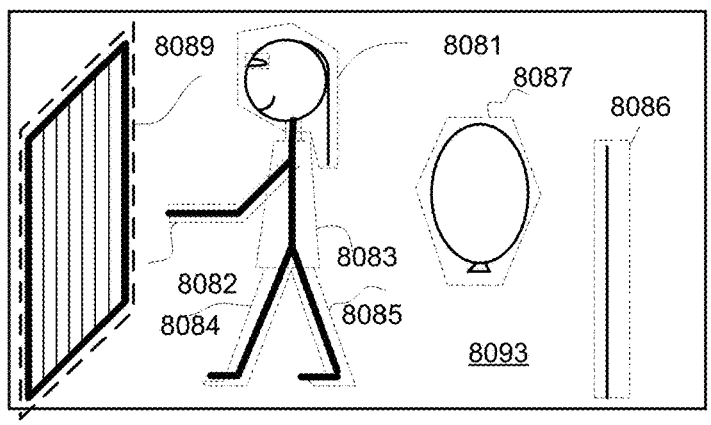
Signature 8093' = {ID81, ID82, ID83, ID84, ID85, ID86, ID87, ID89}
Location information 8093" = {L81, L82, L83, L84, L85, L86, L87, L89}
FIG. 2G

HYBRID REPRESENTATION OF A MEDIA UNIT

CROSS REFERENCE

This application claims priority from U.S. provisional patent 62/827,122 filing date Mar. 31, 2019 which is incorporated herein by reference.

BACKGROUND

Object detection has extensive usage in variety of applications, starting from security, sport events, automatic vehicles, and the like.

Vast amounts of media units are processed during object detection and their processing may require vast amounts of computational resources and memory resources.

Furthermore—many object detection process are sensitive to various acquisition parameters such as angle of acquisition, scale, and the like.

There is a growing need to provide robust and efficient object detection methods.

SUMMARY

There may be provided systems, methods and computer readable medium as illustrated in the specification.

BRIEF DESCRIPTION OF THE DRAWINGS

The embodiments of the disclosure will be understood and appreciated more fully from the following detailed description, taken in conjunction with the drawings in which:

FIG. 1D illustrates an example of a merge operation;
FIG. 1O illustrates an example of an image and image identifiers;
FIG. 2A illustrates an example of images of different scales;
FIG. 2B illustrates an example of images of different scales;
FIG. 2G illustrates an example of different images;
FIG. 2I illustrates an example of a method.

DESCRIPTION OF EXAMPLE EMBODIMENTS

Figure 1A:
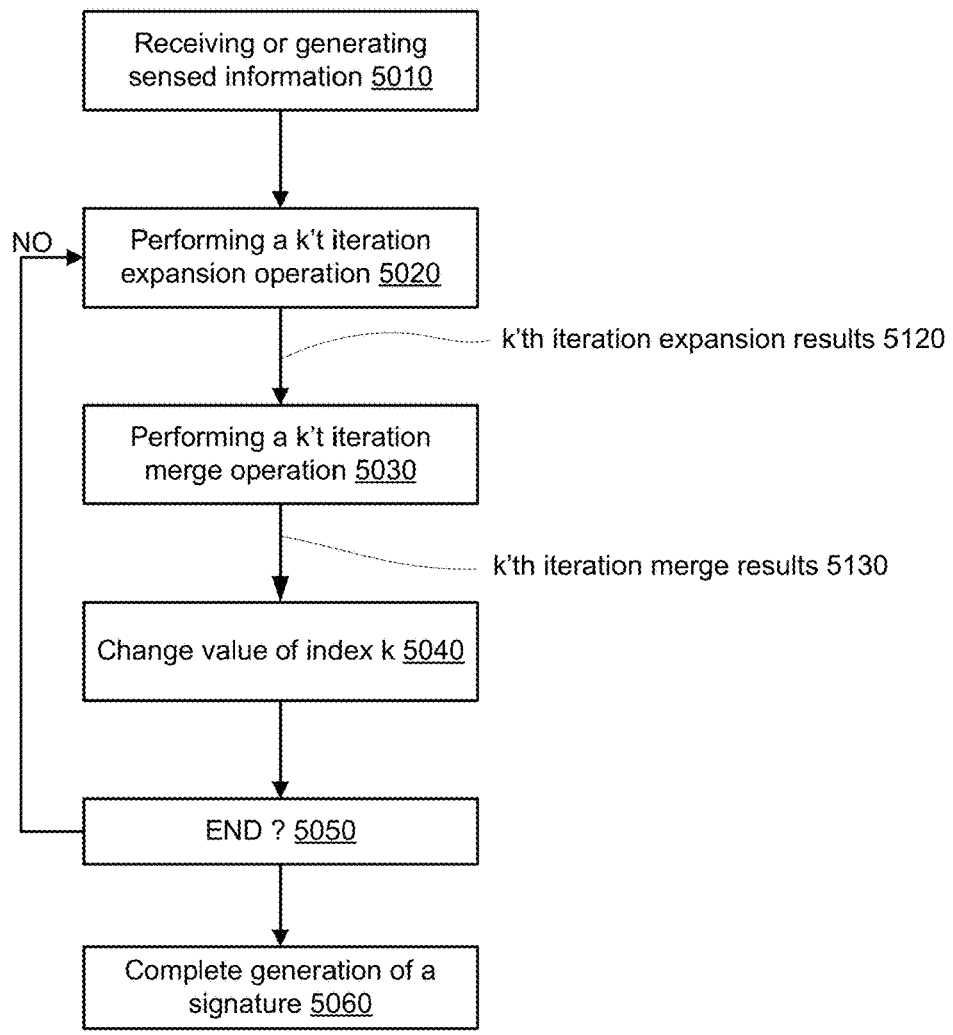
FIG. 1A illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to an image. An image is an example of a media unit. Any reference to an image may be applied mutatis mutandis to a media unit. A media unit may be an example of sensed information. Any reference to a media unit may be applied mutatis mutandis to a natural signal such as but not limited to signal generated by nature, signal representing human behavior, signal representing operations related to the stock market, a medical signal, and the like. Any reference to a media unit may be applied mutatis mutandis to sensed information. The sensed information may be sensed by any type of sensors—such as a visual light camera, or a sensor that may sense infrared, radar imagery, ultrasound, electro-optics, radiography, LIDAR (light detection and ranging), etc.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Low Power Generation of Signatures

The analysis of content of a media unit may be executed by generating a signature of the media unit and by comparing the signature to reference signatures. The reference signatures may be arranged in one or more concept structures or may be arranged in any other manner. The signatures may be used for object detection or for any other use.

The signature may be generated by creating a multidimensional representation of the media unit. The multidimensional representation of the media unit may have a very large number of dimensions. The high number of dimensions may guarantee that the multidimensional representation of different media units that include different objects is sparse—and that object identifiers of different objects are distant from each other—thus improving the robustness of the signatures.

The generation of the signature is executed in an iterative manner that includes multiple iterations, each iteration may include an expansion operations that is followed by a merge operation. The expansion operation of an iteration is performed by spanning elements of that iteration. By determining, per iteration, which spanning elements (of that iteration) are relevant—and reducing the power consumption of irrelevant spanning elements—a significant amount of power may be saved.

In many cases, most of the spanning elements of an iteration are irrelevant—thus after determining (by the spanning elements) their relevancy—the spanning elements that are deemed to be irrelevant may be shut down a/or enter an idle mode.

FIG. 1A illustrates a method 5000 for generating a signature of a media unit.

Method 5000 may start by step 5010 of receiving or generating sensed information.

The sensed information may be a media unit of multiple objects.

Step 5010 may be followed by processing the media unit by performing multiple iterations, wherein at least some of the multiple iterations comprises applying, by spanning elements of the iteration, dimension expansion process that are followed by a merge operation.

The processing may include:
Step 5020 of performing a k'th iteration expansion process (k may be a variable that is used to track the number of iterations).
Step 5030 of performing a k'th iteration merge process.
Step 5040 of changing the value of k.
Step 5050 of checking if all required iterations were done—if so proceeding to step 5060 of completing the generation of the signature. Else—jumping to step 5020.

The output of step 5020 is a k'th iteration expansion results 5120.

The output of step 5030 is a k'th iteration merge results 5130.

For each iteration (except the first iteration)—the merge result of the previous iteration is an input to the current iteration expansion process.

At least some of the K iterations involve selectively reducing the power consumption of some spanning elements (during step 5020) that are deemed to be irrelevant.

Figure 1B:
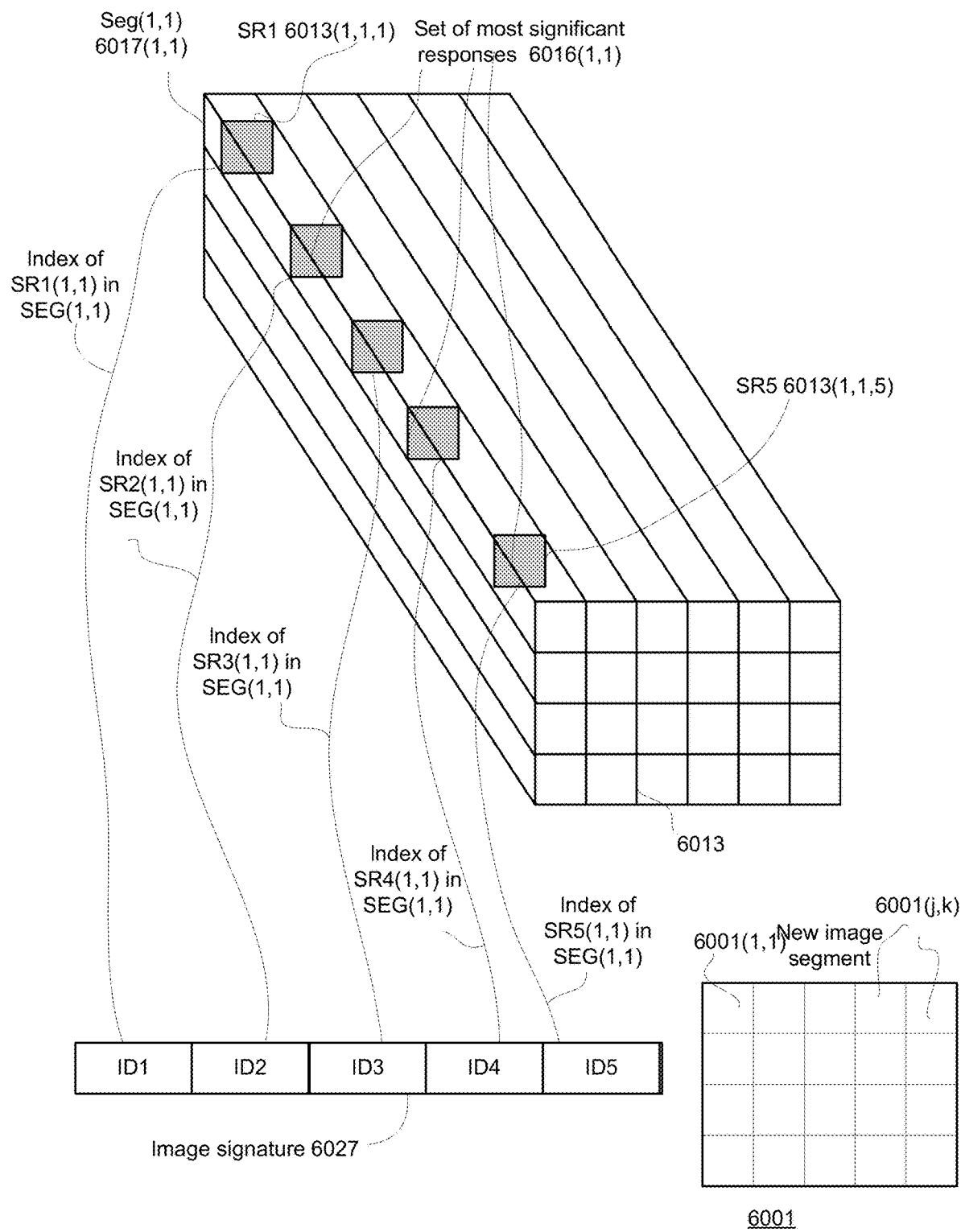
FIG. 1B illustrates an example of a signature.

FIG. 1B is an example of an image signature 6027 of a media unit that is an image 6000 and of an outcome 6013 of the last (K'th) iteration.

The image 6001 is virtually segments to segments 6000 $(i,k)$. The segments may be of the same shape and size but this is not necessarily so.

Outcome 6013 may be a tensor that includes a vector of values per each segment of the media unit. One or more objects may appear in a certain segment. For each object— an object identifier (of the signature) points to locations of significant values, within a certain vector associated with the certain segment.

For example—a top left segment (6001(1,1)) of the image may be represented in the outcome 6013 by a vector V(1,1) 6017(1,1) that has multiple values. The number of values per vector may exceed 100, 200, 500, 1000, and the like.

The significant values (for example—more than 10, 20, 30, 40 values, and/or more than 0.1%, 0.2%, 0.5%, 1%, 5% of all values of the vector and the like) may be selected. The significant values may have the values—but may be selected in any other manner.

FIG. 1B illustrates a set of significant responses 6015(1,1) of vector V(1,1) 6017(1,1). The set includes five significant values (such as first significant value SV1(1,1) 6013(1,1,1), second significant value SV2(1,1), third significant value SV3(1,1), fourth significant value SV4(1,1), and fifth significant value SV5(1,1) 6013(1,1,5).

The image signature 6027 includes five indexes for the retrieval of the five significant values—first till fifth identifiers ID1-ID5 are indexes for retrieving the first till fifth significant values.

Figure 1C:
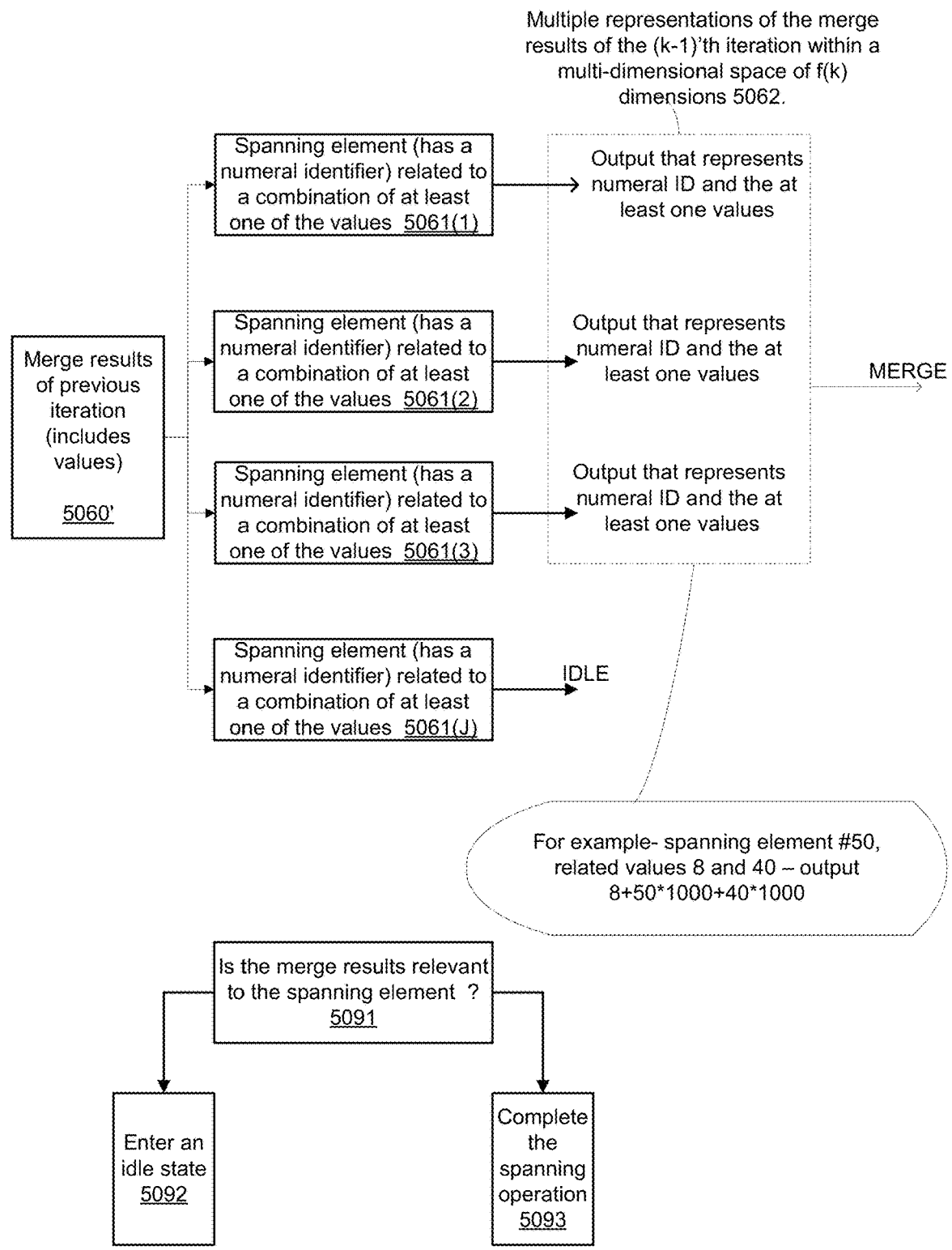
FIG. 1C illustrates an example of a dimension expansion process.

FIG. 1C illustrates a k'th iteration expansion process.

The k'th iteration expansion process start by receiving the merge results 5060' of a previous iteration.

The merge results of a previous iteration may include values are indicative of previous expansion processes—for example—may include values that are indicative of relevant spanning elements from a previous expansion operation, values indicative of relevant regions of interest in a multi-dimensional representation of the merge results of a previous iteration.

The merge results (of the previous iteration) are fed to spanning elements such as spanning elements 5061(1)-5061(J).

Each spanning element is associated with a unique set of values. The set may include one or more values. The spanning elements apply different functions that may be orthogonal to each other. Using non-orthogonal functions may increase the number of spanning elements—but this increment may be tolerable.

The spanning elements may apply functions that are decorrelated to each other—even if not orthogonal to each other.

The spanning elements may be associated with different combinations of object identifiers that may "cover" multiple possible media units. Candidates for combinations of object identifiers may be selected in various manners—for example based on their occurrence in various images (such as test images) randomly, pseudo randomly, according to some rules and the like. Out of these candidates the combinations may be selected to be decorrelated, to cover said multiple possible media units and/or in a manner that certain objects are mapped to the same spanning elements.

Each spanning element compares the values of the merge results to the unique set (associated with the spanning element) and if there is a match—then the spanning element is deemed to be relevant. If so—the spanning element completes the expansion operation.

If there is no match—the spanning element is deemed to be irrelevant and enters a low power mode. The low power mode may also be referred to as an idle mode, a standby mode, and the like. The low power mode is termed low power because the power consumption of an irrelevant spanning element is lower than the power consumption of a relevant spanning element.

In FIG. 1C various spanning elements are relevant (5061(1)-5061(3)) and one spanning element is irrelevant (5061 (J)).

Each relevant spanning element may perform a spanning operation that includes assigning an output value that is indicative of an identity of the relevant spanning elements of the iteration. The output value may also be indicative of identities of previous relevant spanning elements (from previous iterations).

For example—assuming that spanning element number fifty is relevant and is associated with a unique set of values of eight and four—then the output value may reflect the numbers fifty, four and eight—for example one thousand multiplied by (fifty+forty) plus forty. Any other mapping function may be applied.

FIG. 1C also illustrates the steps executed by each spanning element:
  Checking if the merge results are relevant to the spanning element (step 5091).
  If-so—completing the spanning operation (step 5093).
  If not—entering an idle state (step 5092).
  FIG. 1D is an example of various merge operations.

A merge operation may include finding regions of interest. The regions of interest are regions within a multidimensional representation of the sensed information. A region of interest may exhibit a more significant response (for example a stronger, higher intensity response).

The merge operation (executed during a k'th iteration merge operation) may include at least one of the following:
  Step 5031 of searching for overlaps between regions of interest (of the k'th iteration expansion operation results) and define regions of interest that are related to the overlaps.
  Step 5032 of determining to drop one or more region of interest, and dropping according to the determination.
  Step 5033 of searching for relationships between regions of interest (of the k'th iteration expansion operation results) and define regions of interest that are related to the relationship.
  Step 5034 of searching for proximate regions of interest (of the k'th iteration expansion operation results) and define regions of interest that are related to the proximity. Proximate may be a distance that is a certain fraction (for example less than 1%) of the multi-dimensional space, may be a certain fraction of at least one of the regions of interest that are tested for proximity.
  Step 5035 of searching for relationships between regions of interest (of the k'th iteration expansion operation results) and define regions of interest that are related to the relationship.
  Step 5036 of merging and/or dropping k'th iteration regions of interest based on shape information related to shape of the k'th iteration regions of interest.

The same merge operations may applied in different iterations.

Alternatively, different merge operations may be executed during different iterations.

Figure 1E:
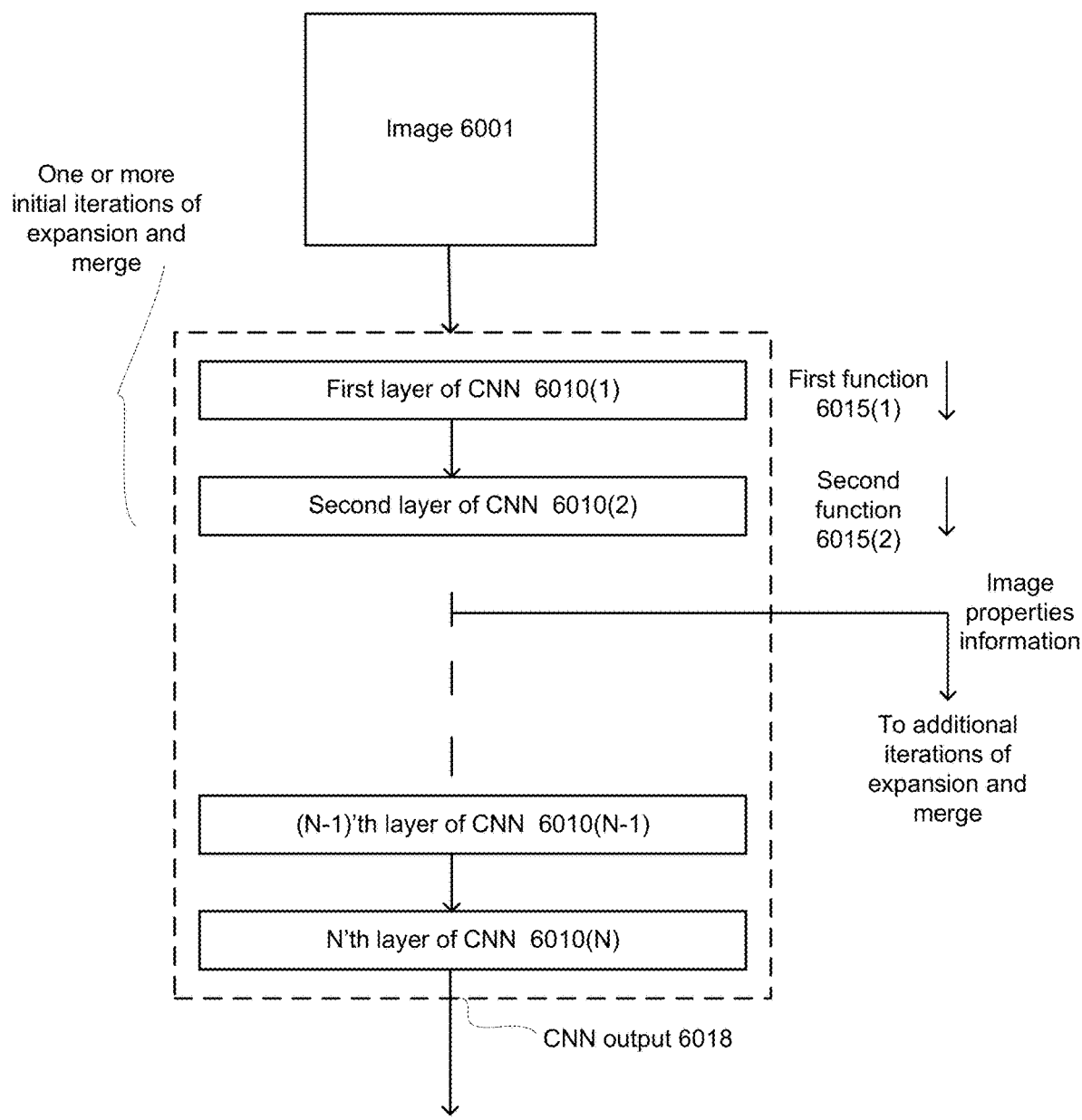
FIG. 1E illustrates an example of hybrid process.

FIG. 1E illustrates an example of a hybrid process and an input image 6001.

The hybrid process is hybrid in the sense that some expansion and merge operations are executed by a convolutional neural network (CNN) and some expansion and merge operations (denoted additional iterations of expansion and merge) are not executed by the CNN—but rather by a process that may include determining a relevancy of spanning elements and entering irrelevant spanning elements to a low power mode.

In FIG. 1E one or more initial iterations are executed by first and second CNN layers 6010(1) and 6010(2) that apply first and second functions 6015(1) and 6015(2).

The output of these layers provided information about image properties. The image properties may not amount to object detection. Image properties may include location of edges, properties of curves, and the like.

The CNN may include additional layers (for example third till N'th layer 6010(N)) that may provide a CNN output 6018 that may include object detection information. It should be noted that the additional layers may not be included.

It should be noted that executing the entire signature generation process by a hardware CNN of fixed connectivity may have a higher power consumption—as the CNN will not be able to reduce the power consumption of irrelevant nodes.

Figure 1F:
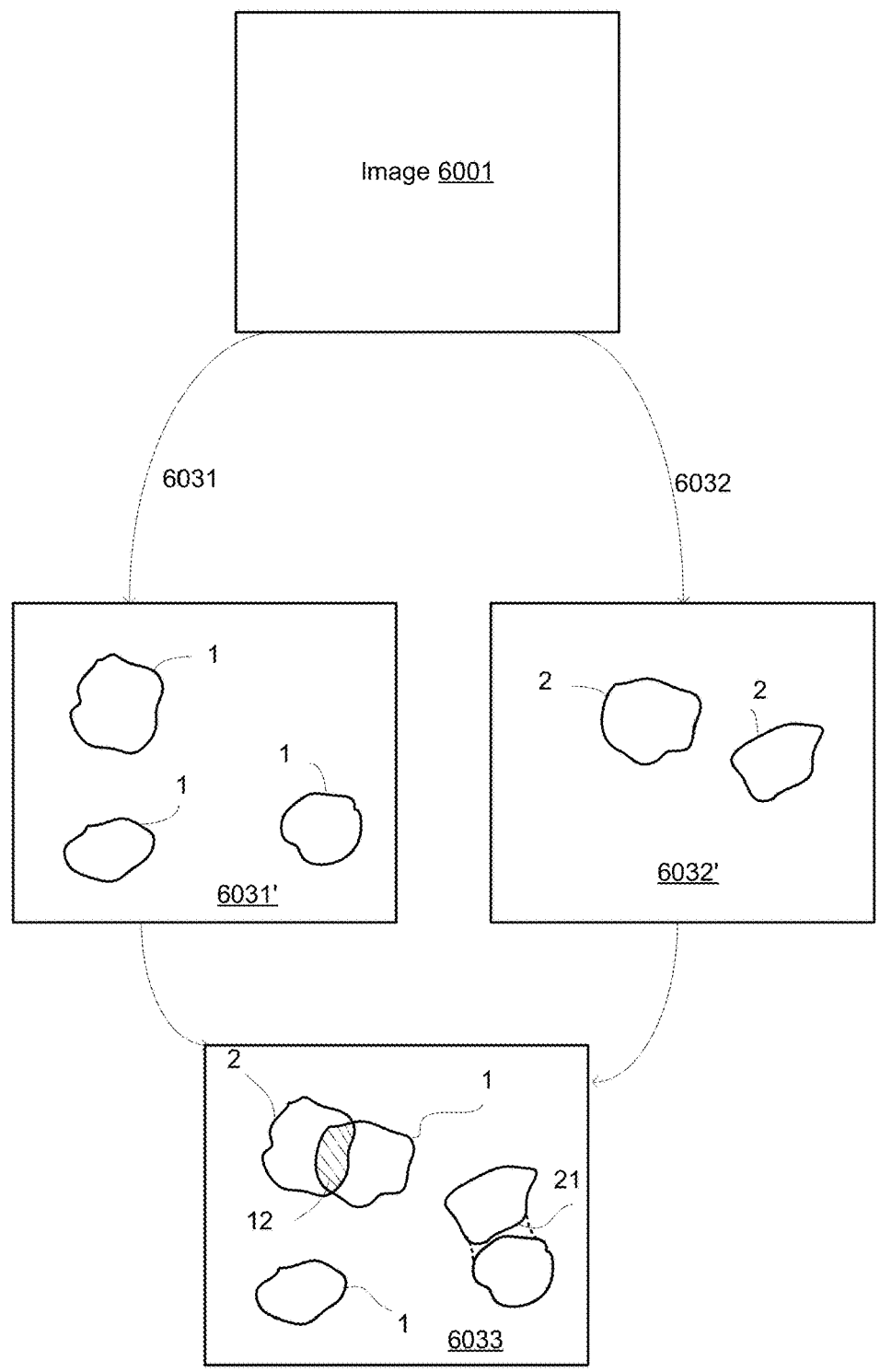
FIG. 1F illustrates an example of a first iteration of the dimension expansion process.

FIG. 1F illustrates an input image 6001, and a single iteration of an expansion operation and a merge operation.

In FIG. 1F the input image 6001 undergoes two expansion operations.

The first expansion operation involves filtering the input image by a first filtering operation 6031 to provide first regions of interest (denoted 1) in a first filtered image 6031'.

The first expansion operation also involves filtering the input image by a second filtering operation 6032 to provide first regions of interest (denoted 2) in a second filtered image 6032'.

The merge operation includes merging the two images by overlaying the first filtered image on the second filtered image to provide regions of interest 1, 2, 12 and 21. Region of interest 12 is an overlap area shared by a certain region of interest 1 and a certain region of interest 2. Region of interest 21 is a union of another region of interest 1 and another region of interest 2.

Figure 1G:
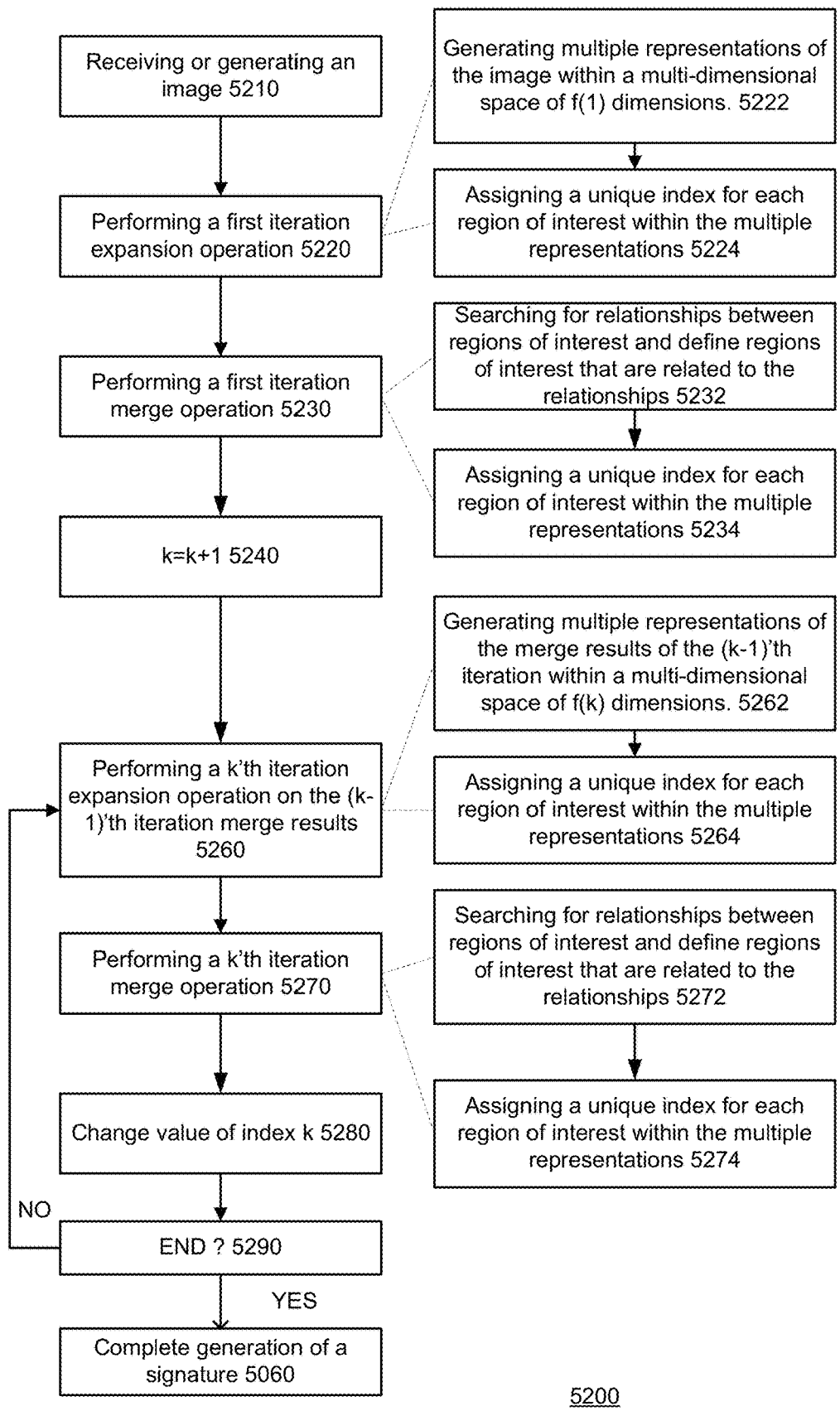
FIG. 1G illustrates an example of a method.

FIG. 1G illustrates method 5200 for generating a signature.

Method 5200 may include the following sequence of steps:

Step 5210 of receiving or generating an image.

Step 5220 of performing a first iteration expansion operation (which is an expansion operation that is executed during a first iteration)

Step 5230 of performing a first iteration merge operation.

Step 5240 of amending index k (k is an iteration counter). In FIG. 7 in incremented by one—this is only an example of how the number of iterations are tracked.

Step 5260 of performing a k'th iteration expansion operation on the (k−1)'th iteration merge results.

Step 5270 of performing a k'th iteration merge operation (on the k'th iteration expansion operation results.

Step 5280 of changing the value of index k.

Step 5290 of checking if all iteration ended (k reached its final value—for example K).

If no—there are still iterations to be executed—jumping from step 5290 to step 5260.

If yes—jumping to step 5060 of completing the generation of the signature. This may include, for example, selecting significant attributes, determining retrieval information (for example indexes) that point to the selected significant attributes.

Step 5220 may include:

Step 5222 of generating multiple representations of the image within a multi-dimensional space of f(1) dimensions. The expansion operation of step 5220 generates a first iteration multidimensional representation of the first image. The number of dimensions of this first iteration multidimensional representation is denoted f(1).

Step 5224 of assigning a unique index for each region of interest within the multiple representations. For example, referring to FIG. 6—indexes 1 and indexes 2 are assigned to regions of interests generated during the first iteration expansion operations 6031 and 6032.

Step 5230 may include:

Step 5232 of searching for relationships between regions of interest and define regions of interest that are related to the relationships. For example—union or intersection illustrated in FIG. 6.

Step 5234 of assigning a unique index for each region of interest within the multiple representations. For example—referring to FIG. 6—indexes 1, 2, 12 and 21.

Step 5260 may include:

Step 5262 of generating multiple representations of the merge results of the (k−1)'th iteration within a multi-dimensional space of f(k) dimensions. The expansion operation of step 5260 generates a k'th iteration multidimensional representation of the first image. The number of dimensions of this kth iteration multidimensional representation is denoted f(k).

Step 5264 of assigning a unique index for each region of interest within the multiple representations.

Step 5270 may include

Step 5272 of searching for relationships between regions of interest and define regions of interest that are related to the relationships.

Step 5274 of Assigning a unique index for each region of interest within the multiple representations.

Figure 1H:
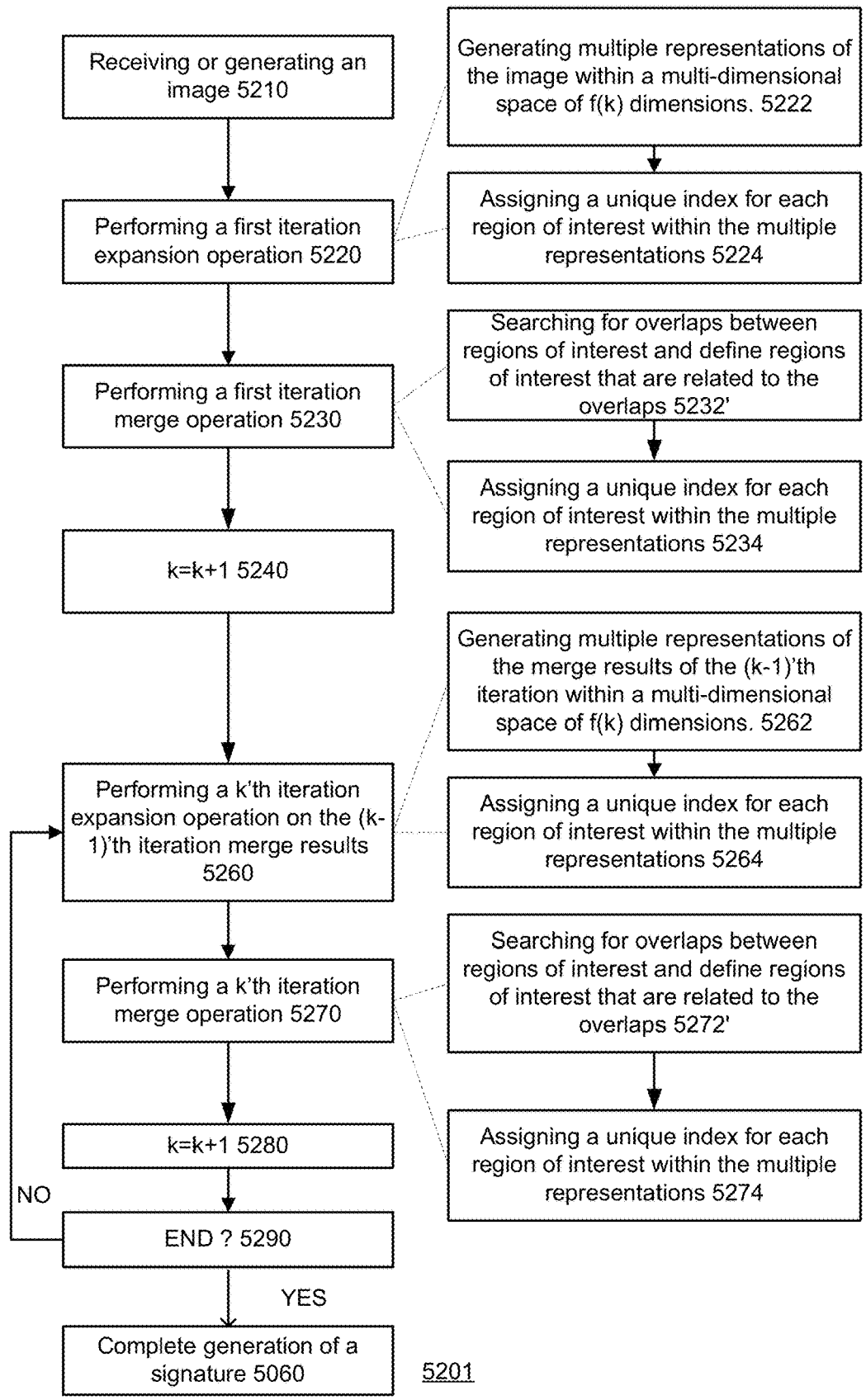
FIG. 1H illustrates an example of a method.

FIG. 1H illustrates a method 5201. In method 5201 the relationships between the regions of interest are overlaps.

Thus—step 5232 is replaced by step 5232' of searching for overlaps between regions of interest and define regions of interest that are related to the overlaps.

Step 5272 is replaced by step 5272' of searching for overlaps between regions of interest and define regions of interest that are related to the overlaps.

Figure 1I:
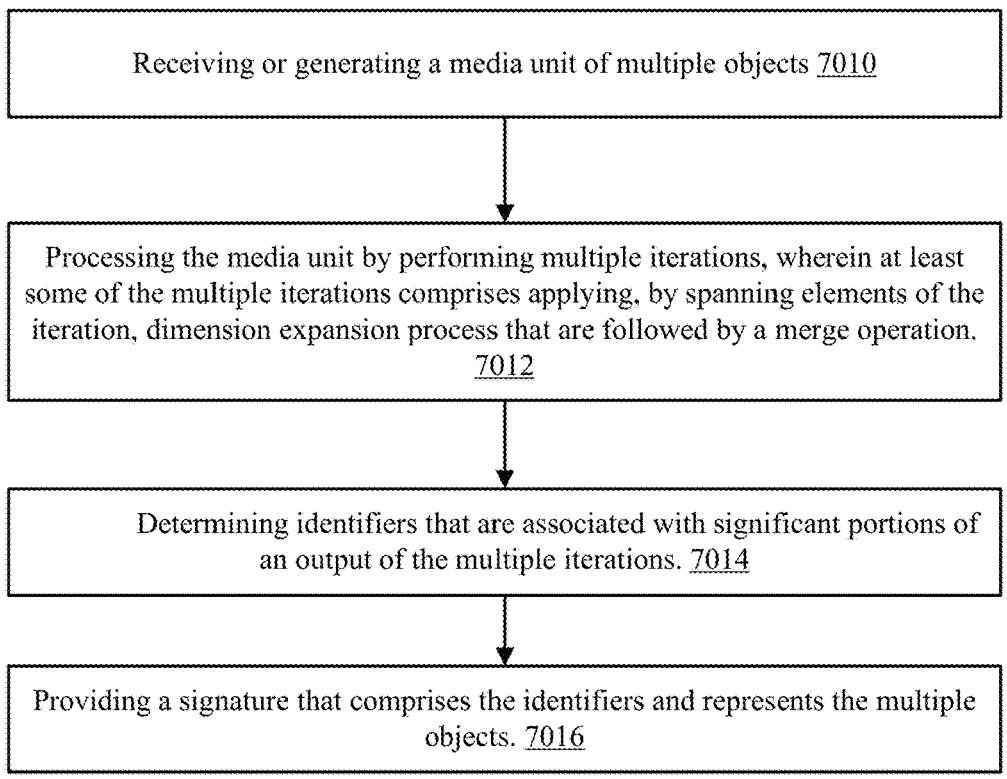
FIG. 1I illustrates an example of a method.

FIG. 1I illustrates a method 7000 for low-power calculation of a signature.

Method 7000 starts by step 7010 of receiving or generating a media unit of multiple objects.

Step 7010 may be followed by step 7012 of processing the media unit by performing multiple iterations, wherein at least some of the multiple iterations comprises applying, by spanning elements of the iteration, dimension expansion process that are followed by a merge operation.

The applying of the dimension expansion process of an iteration may include (a) determining a relevancy of the spanning elements of the iteration; and (b) completing the dimension expansion process by relevant spanning elements of the iteration and reducing a power consumption of irrelevant spanning elements until, at least, a completion of the applying of the dimension expansion process.

The identifiers may be retrieval information for retrieving the significant portions.

The at least some of the multiple iterations may be a majority of the multiple iterations.

The output of the multiple iteration may include multiple property attributes for each segment out of multiple segments of the media unit; and wherein the significant portions of an output of the multiple iterations may include more impactful property attributes.

The first iteration of the multiple iteration may include applying the dimension expansion process by applying different filters on the media unit.

The at least some of the multiple iteration exclude at least a first iteration of the multiple iterations. See, for example, FIG. 1E.

The determining the relevancy of the spanning elements of the iteration may be based on at least some identities of relevant spanning elements of at least one previous iteration.

The determining the relevancy of the spanning elements of the iteration may be based on at least some identities of relevant spanning elements of at least one previous iteration that preceded the iteration.

The determining the relevancy of the spanning elements of the iteration may be based on properties of the media unit.

The determining the relevancy of the spanning elements of the iteration may be performed by the spanning elements of the iteration.

Method 7000 may include a neural network processing operation that may be executed by one or more layers of a neural network and does not belong to the at least some of the multiple iterations. See, for example, FIG. 1E.

The at least one iteration may be executed without reducing power consumption of irrelevant neurons of the one or more layers.

The one or more layers may output information about properties of the media unit, wherein the information differs from a recognition of the multiple objects.

The applying, by spanning elements of an iteration that differs from the first iteration, the dimension expansion process may include assigning output values that may be indicative of an identity of the relevant spanning elements of the iteration. See, for example, FIG. 1C.

The applying, by spanning elements of an iteration that differs from the first iteration, the dimension expansion process may include assigning output values that may be indicative a history of dimension expansion processes until the iteration that differs from the first iteration.

The each spanning element may be associated with a subset of reference identifiers. The determining of the relevancy of each spanning elements of the iteration may be based a relationship between the subset of the reference identifiers of the spanning element and an output of a last merge operation before the iteration.

The output of a dimension expansion process of an iteration may be a multidimensional representation of the media unit that may include media unit regions of interest that may be associated with one or more expansion processes that generated the regions of interest.

The merge operation of the iteration may include selecting a subgroup of media unit regions of interest based on a spatial relationship between the subgroup of multidimensional regions of interest. See, for example, FIGS. 3 and 6.

Method 7000 may include applying a merge function on the subgroup of multidimensional regions of interest. See, for example, FIGS. 1C and 1F.

Method 7000 may include applying an intersection function on the subgroup of multidimensional regions of interest. See, for example, FIGS. 1C and 1F.

The merge operation of the iteration may be based on an actual size of one or more multidimensional regions of interest.

The merge operation of the iteration may be based on relationship between sizes of the multidimensional regions of interest. For example—larger multidimensional regions of interest may be maintained while smaller multidimensional regions of interest may be ignored of.

The merge operation of the iteration may be based on changes of the media unit regions of interest during at least the iteration and one or more previous iteration.

Step 7012 may be followed by step 7014 of determining identifiers that are associated with significant portions of an output of the multiple iterations.

Step 7014 may be followed by step 7016 of providing a signature that comprises the identifiers and represents the multiple objects.

Localization and Segmentation

Any of the mentioned above signature generation method provides a signature that does not explicitly includes accurate shape information. This adds to the robustness of the signature to shape related inaccuracies or to other shape related parameters.

The signature includes identifiers for identifying media regions of interest.

Each media region of interest may represent an object (for example a vehicle, a pedestrian, a road element, a human made structure, wearables, shoes, a natural element such as a tree, the sky, the sun, and the like) or a part of an object (for example—in the case of the pedestrian—a neck, a head, an arm, a leg, a thigh, a hip, a foot, an upper arm, a forearm, a wrist, and a hand). It should be noted that for object detection purposes a part of an object may be regarded as an object.

The exact shape of the object may be of interest.

Figure 1J:
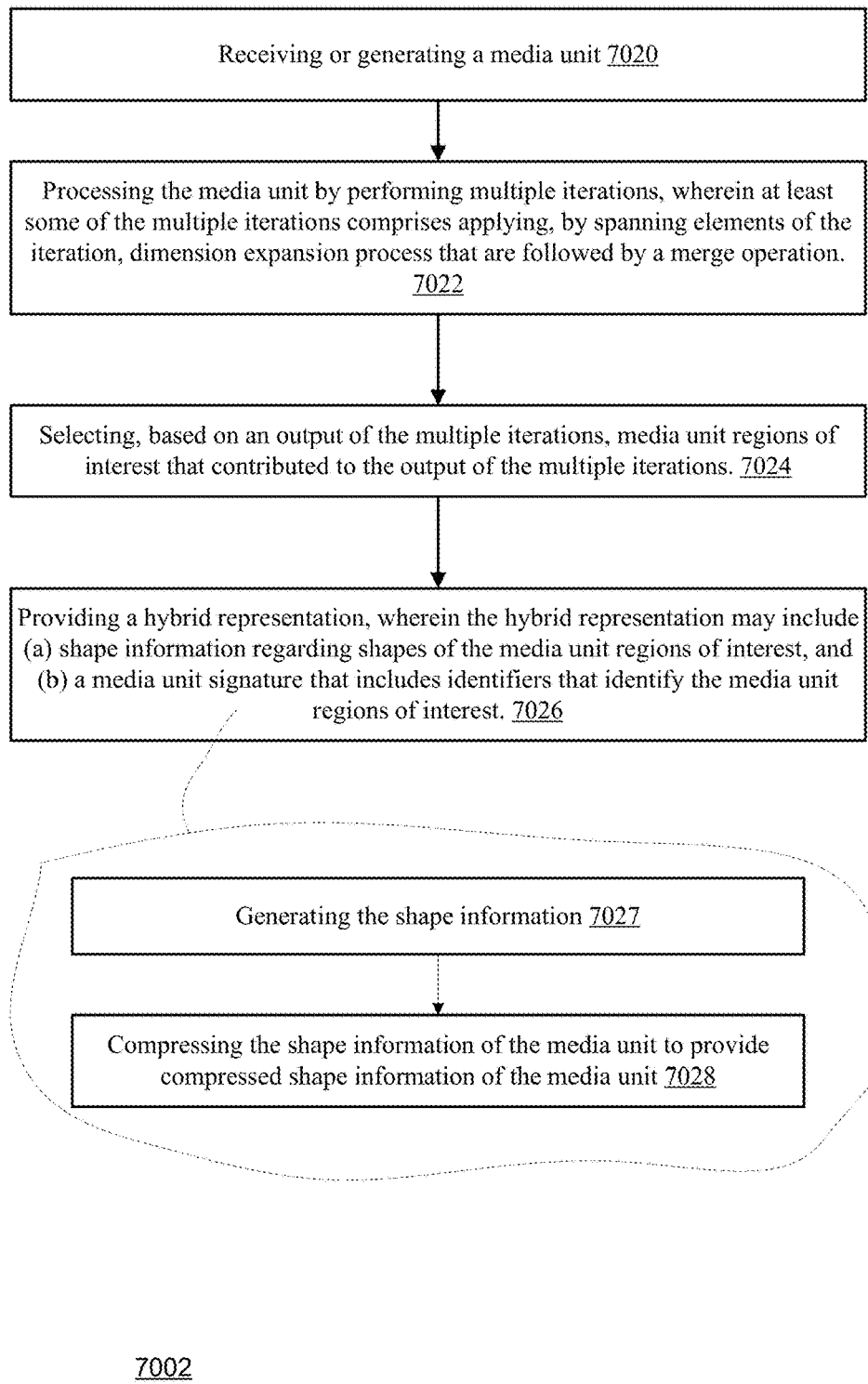
FIG. 1J illustrates an example of a method.

FIG. 1J illustrates method 7002 of generating a hybrid representation of a media unit.

Method 7002 may include a sequence of steps 7020, 7022, 7024 and 7026.

Step 7020 may include receiving or generating the media unit.

Step 7022 may include processing the media unit by performing multiple iterations, wherein at least some of the multiple iterations comprises applying, by spanning elements of the iteration, dimension expansion process that are followed by a merge operation.

Step 7024 may include selecting, based on an output of the multiple iterations, media unit regions of interest that contributed to the output of the multiple iterations.

Step 7026 may include providing a hybrid representation, wherein the hybrid representation may include (a) shape information regarding shapes of the media unit regions of interest, and (b) a media unit signature that includes identifiers that identify the media unit regions of interest.

Step 7024 may include selecting the media regions of interest per segment out of multiple segments of the media unit. See, for example, FIG. 2.

Step 7026 may include step 7027 of generating the shape information.

The shape information may include polygons that represent shapes that substantially bound the media unit regions of interest. These polygons may be of a high degree.

In order to save storage space, the method may include step 7028 of compressing the shape information of the media unit to provide compressed shape information of the media unit.

Figure 1K:
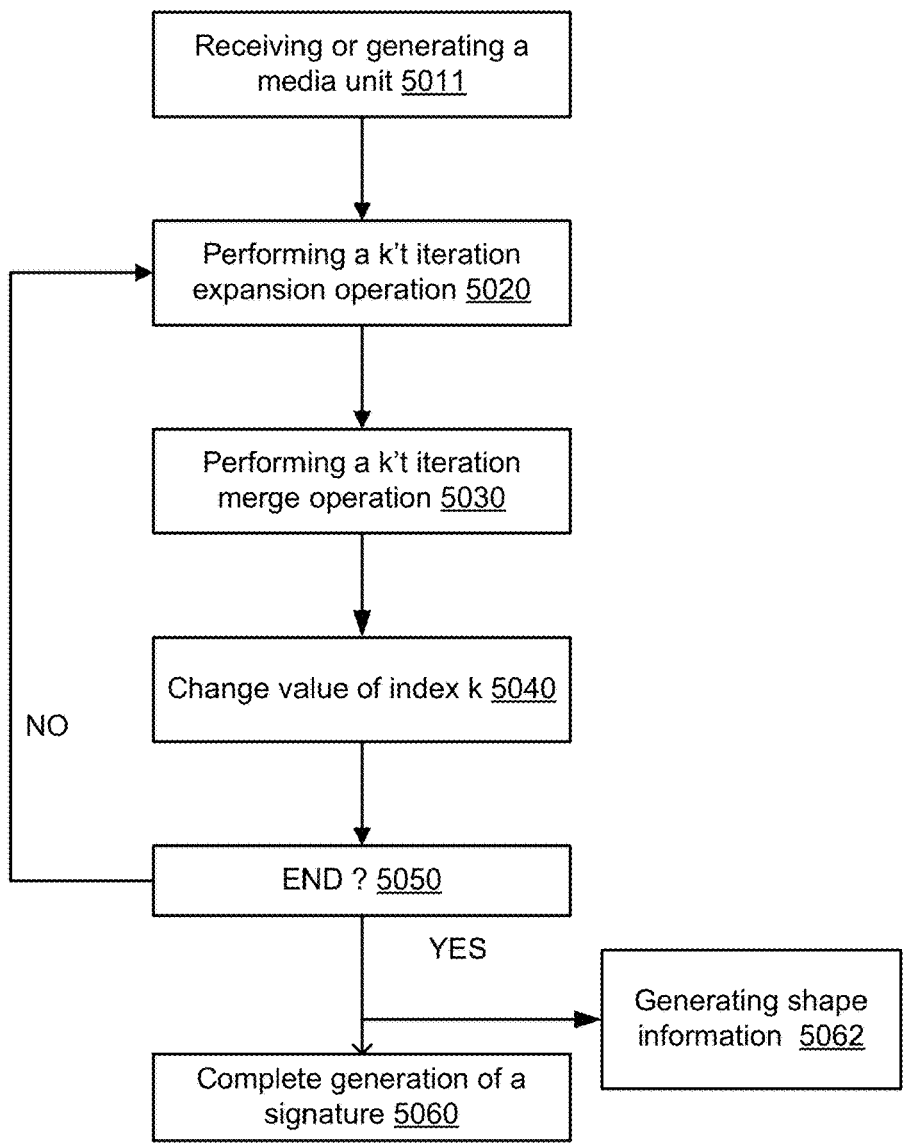
FIG. 1K illustrates an example of a method.

FIG. 1K illustrates method 5002 for generating a hybrid representation of a media unit.

Method 5002 may start by step 5011 of receiving or generating a media unit.

Step 5011 may be followed by processing the media unit by performing multiple iterations, wherein at least some of the multiple iterations comprises applying, by spanning elements of the iteration, dimension expansion process that are followed by a merge operation.

The processing may be followed by steps 5060 and 5062.

The processing may include steps 5020, 5030, 5040 and 5050.

Step 5020 may include performing a k'th iteration expansion process (k may be a variable that is used to track the number of iterations).

Step 5030 may include performing a k'th iteration merge process.

Step 5040 may include changing the value of k.

Step 5050 may include checking if all required iterations were done—if so proceeding to steps 5060 and 5062. Else—jumping to step 5020.

The output of step 5020 is a k'th iteration expansion result.

The output of step 5030 is a k'th iteration merge result.

For each iteration (except the first iteration)—the merge result of the previous iteration is an input to the current iteration expansion process.

Step 5060 may include completing the generation of the signature.

Step 5062 may include generating shape information regarding shapes of media unit regions of interest. The signature and the shape information provide a hybrid representation of the media unit.

The combination of steps 5060 and 5062 amounts to a providing a hybrid representation, wherein the hybrid representation may include (a) shape information regarding shapes of the media unit regions of interest, and (b) a media unit signature that includes identifiers that identify the media unit regions of interest.

Figure 1L:
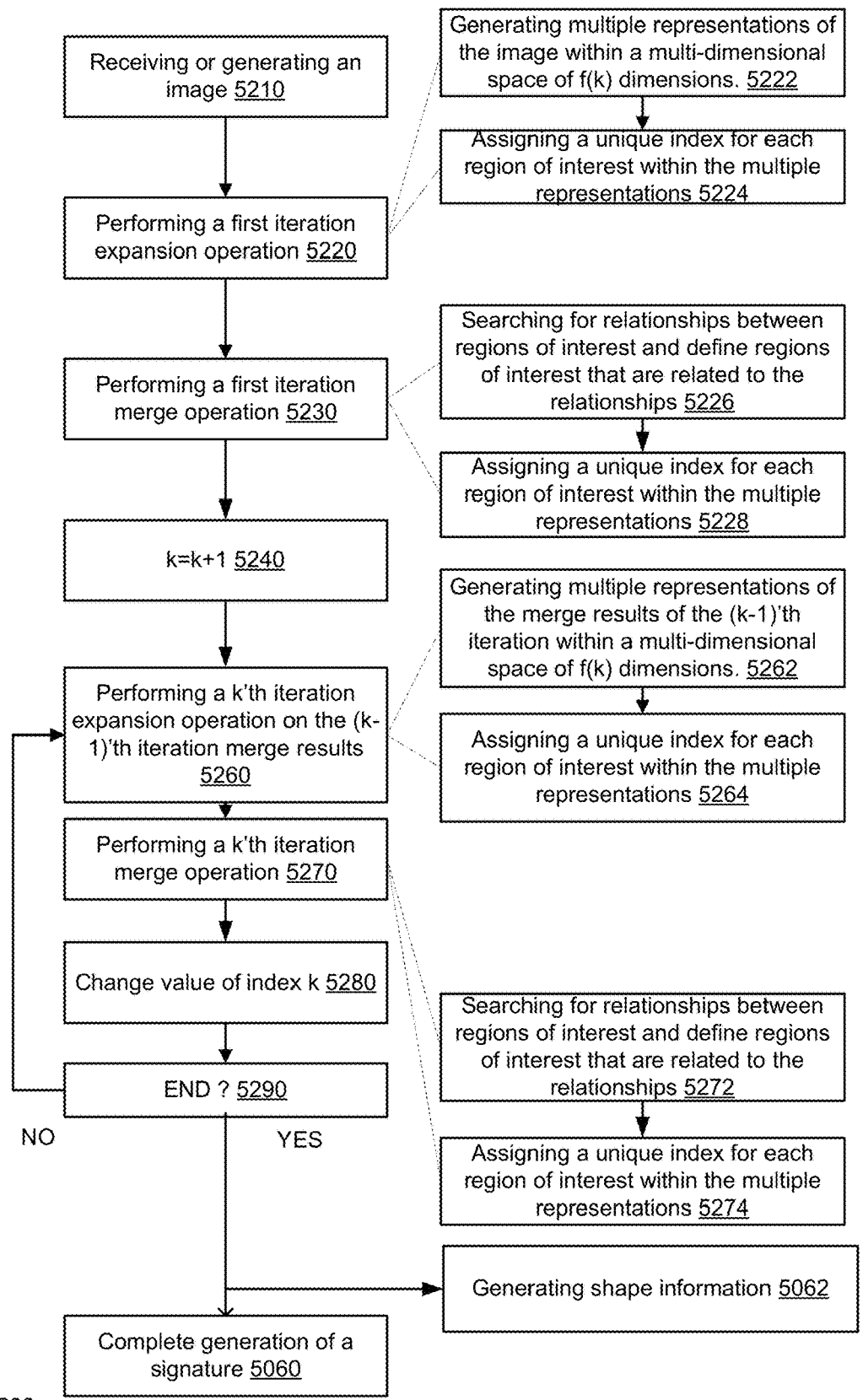
FIG. 1L illustrates an example of a method.

FIG. 1L illustrates method 5203 for generating a hybrid representation of an image.

Method 5200 may include the following sequence of steps:

Step 5210 of receiving or generating an image.

Step 5230 of performing a first iteration expansion operation (which is an expansion operation that is executed during a first iteration)

Step 5240 of performing a first iteration merge operation.

Step 5240 of amending index k (k is an iteration counter). In FIG. 1L in incremented by one—this is only an example of how the number of iterations are tracked.

Step 5260 of performing a k'th iteration expansion operation on the (k−1)'th iteration merge results.

Step 5270 of Performing a k'th iteration merge operation (on the k'th iteration expansion operation results.

Step 5280 of changing the value of index k.

Step 5290 of checking if all iteration ended (k reached its final value—for example K).

If no—there are still iterations to be executed—jumping from step 5290 to step 5260.

If yes—jumping to step 5060.

Step 5060 may include completing the generation of the signature. This may include, for example, selecting significant attributes, determining retrieval information (for example indexes) that point to the selected significant attributes.

Step 5062 may include generating shape information regarding shapes of media unit regions of interest. The signature and the shape information provide a hybrid representation of the media unit.

The combination of steps 5060 and 5062 amounts to a providing a hybrid representation, wherein the hybrid representation may include (a) shape information regarding shapes of the media unit regions of interest, and (b) a media unit signature that includes identifiers that identify the media unit regions of interest.

Step 5220 may include:

Step 5222 of generating multiple representations of the image within a multi-dimensional space of f(k) dimensions.

Step 5224 of assigning a unique index for each region of interest within the multiple representations. (for example, referring to FIG. 1F—indexes 1 and indexes 2 following first iteration expansion operations 6031 and 6032.

Step 5230 may include

Step 5226 of searching for relationships between regions of interest and define regions of interest that are related to the relationships. For example—union or intersection illustrated in FIG. 1F.

Step 5228 of assigning a unique index for each region of interest within the multiple representations. For example—referring to FIG. 1F—indexes 1, 2, 12 and 21.

Step 5260 may include:

Step 5262 of generating multiple representations of the merge results of the (k−1)'th iteration within a multi-dimensional space of f(k) dimensions. The expansion operation of step 5260 generates a k'th iteration multidimensional representation of the first image. The number of dimensions of this kth iteration multidimensional representation is denoted f(k).

Step 5264 of assigning a unique index for each region of interest within the multiple representations.

Step 5270 may include

Step 5272 of searching for relationships between regions of interest and define regions of interest that are related to the relationships.

Step 5274 of assigning a unique index for each region of interest within the multiple representations.

Figure 1M:
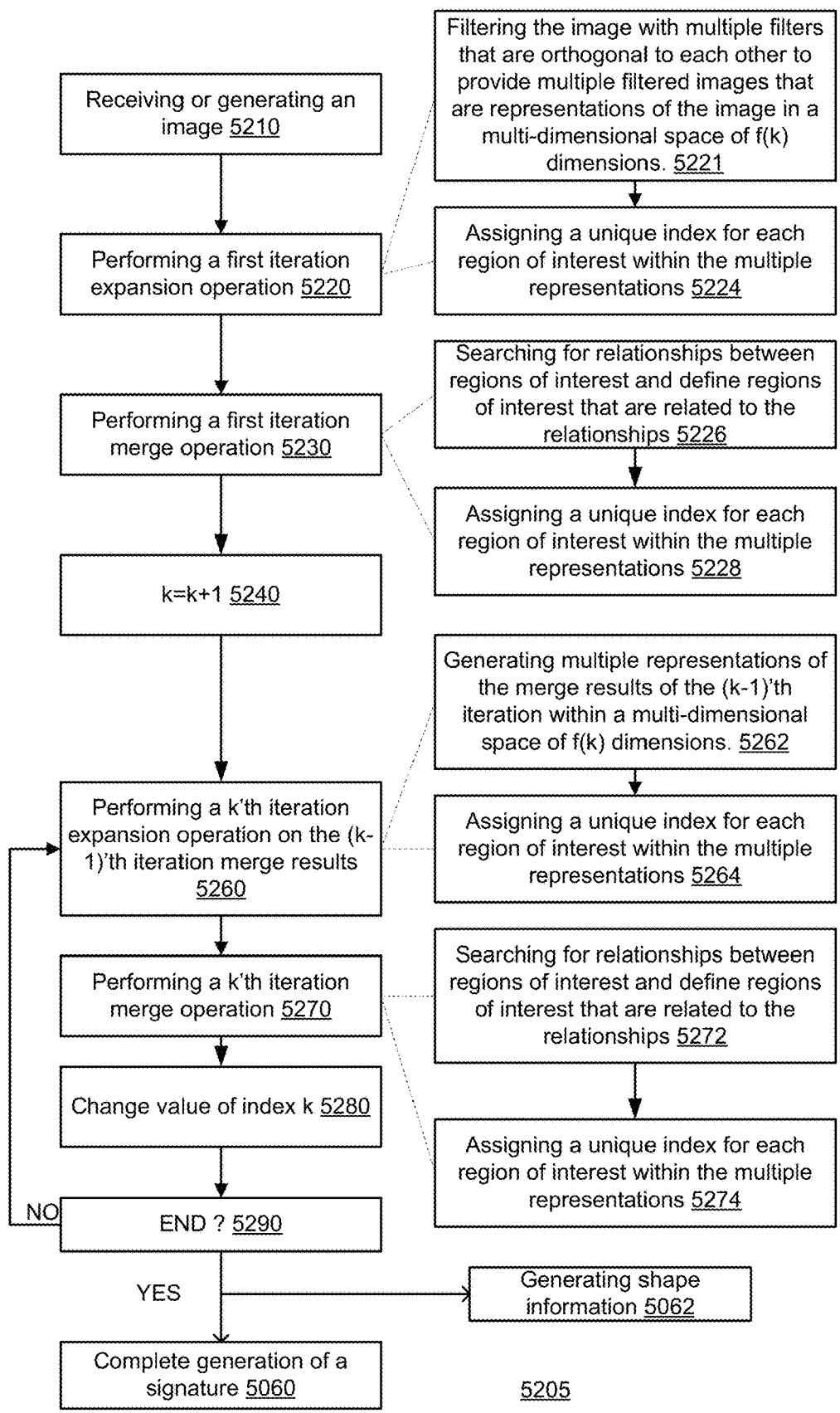
FIG. 1M illustrates an example of a method.

FIG. 1M illustrates method 5205 for generating a hybrid representation of an image.

Method 5200 may include the following sequence of steps:

Step 5210 of receiving or generating an image.

Step 5230 of performing a first iteration expansion operation (which is an expansion operation that is executed during a first iteration)

Step 5240 of performing a first iteration merge operation.

Step 5240 of amending index k (k is an iteration counter). In FIG. 1M in incremented by one—this is only an example of how the number of iterations are tracked.

Step 5260 of performing a k'th iteration expansion operation on the (k−1)'th iteration merge results.

Step 5270 of performing a k'th iteration merge operation (on the k'th iteration expansion operation results.

Step 5280 of changing the value of index k.

Step 5290 of checking if all iteration ended (k reached its final value—for example K).

If no—there are still iterations to be executed—jumping from step 5290 to step 5260.

If yes—jumping to steps 5060 and 5062.

Step 5060 may include completing the generation of the signature. This may include, for example, selecting significant attributes, determining retrieval information (for example indexes) that point to the selected significant attributes.

Step 5062 may include generating shape information regarding shapes of media unit regions of interest. The signature and the shape information provide a hybrid representation of the media unit.

The combination of steps 5060 and 5062 amounts to a providing a hybrid representation, wherein the hybrid representation may include (a) shape information regarding shapes of the media unit regions of interest, and (b) a media unit signature that includes identifiers that identify the media unit regions of interest.

Step 5220 may include:

Step 5221 of filtering the image with multiple filters that are orthogonal to each other to provide multiple filtered images that are representations of the image in a multi-dimensional space of f(1) dimensions. The expansion operation of step 5220 generates a first iteration multidimensional representation of the first image. The number of filters is denoted f(1).

Step 5224 of assigning a unique index for each region of interest within the multiple representations. (for example, referring to FIG. 1F—indexes 1 and indexes 2 following first iteration expansion operations 6031 and 6032.

Step 5230 may include

Step 5226 of searching for relationships between regions of interest and define regions of interest that are related to the relationships. For example—union or intersection illustrated in FIG. 1F.

Step 5228 of assigning a unique index for each region of interest within the multiple representations. For example—referring to FIG. 1F—indexes 1, 2, 12 and 21.

Step 5260 may include:

Step 5262 of generating multiple representations of the merge results of the (k−1)'th iteration within a multi-dimensional space of f(k) dimensions. The expansion operation of step 5260 generates a k'th iteration multidimensional representation of the first image. The number of dimensions of this kth iteration multidimensional representation is denoted f(k).

Step 5264 of assigning a unique index for each region of interest within the multiple representations.

Step 5270 may include

Step 5272 of searching for relationships between regions of interest and define regions of interest that are related to the relationships.

Step 5274 of assigning a unique index for each region of interest within the multiple representations.

The filters may be orthogonal may be non-orthogonal—for example be decorrelated. Using non-orthogonal filters may increase the number of filters—but this increment may be tolerable.

Object Detection Using Compressed Shape Information

Object detection may include comparing a signature of an input image to signatures of one or more cluster structures in order to find one or more cluster structures that include one or more matching signatures that match the signature of the input image.

The number of input images that are compared to the cluster structures may well exceed the number of signatures of the cluster structures. For example—thousands, tens of thousands, hundreds of thousands (and even more) of input signature may be compared to much less cluster structure signatures. The ratio between the number of input images to the aggregate number of signatures of all the cluster structures may exceed ten, one hundred, one thousand, and the like.

In order to save computational resources, the shape information of the input images may be compressed.

On the other hand—the shape information of signatures that belong to the cluster structures may be uncompressed—and of higher accuracy than those of the compressed shape information.

When the higher quality is not required—the shape information of the cluster signature may also be compressed.

Compression of the shape information of cluster signatures may be based on a priority of the cluster signature, a popularity of matches to the cluster signatures, and the like.

The shape information related to an input image that matches one or more of the cluster structures may be calculated based on shape information related to matching signatures.

For example—a shape information regarding a certain identifier within the signature of the input image may be determined based on shape information related to the certain identifiers within the matching signatures.

Any operation on the shape information related to the certain identifiers within the matching signatures may be applied in order to determine the (higher accuracy) shape information of a region of interest of the input image identified by the certain identifier.

For example—the shapes may be virtually overlaid on each other and the population per pixel may define the shape.

For example—only pixels that appear in at least a majority of the overlaid shaped should be regarded as belonging to the region of interest.

Other operations may include smoothing the overlaid shapes, selecting pixels that appear in all overlaid shapes.

The compressed shape information may be ignored of or be taken into account.

Figure 1N:
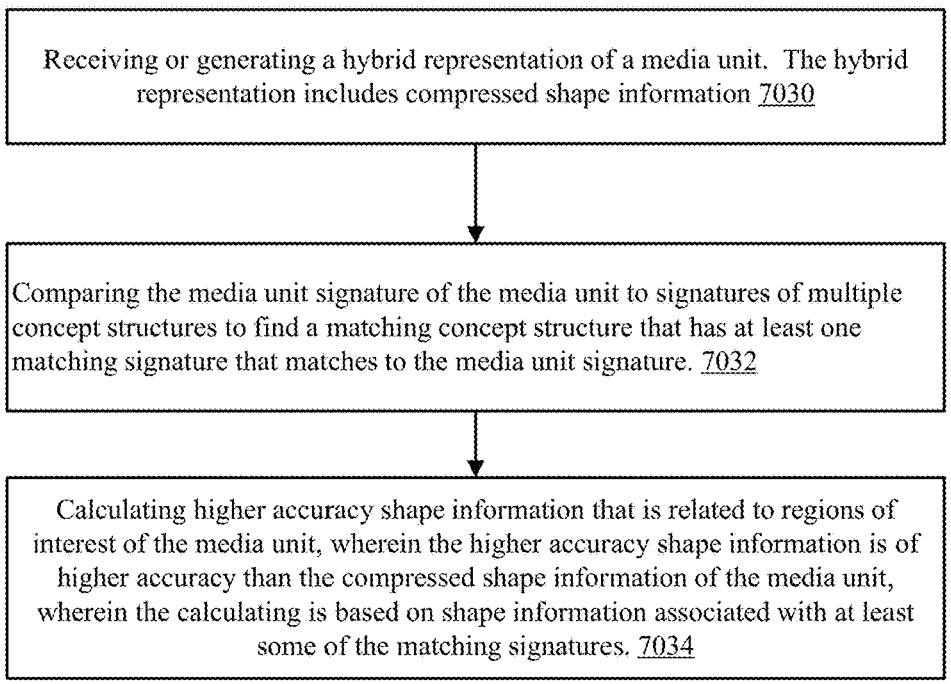
FIG. 1N illustrates an example of a matching process and a generation of a higher accuracy shape information.

FIG. 1N illustrates method 7003 of determining shape information of a region of interest of a media unit.

Method 7003 may include a sequence of steps 7030, 7032 and 7034.

Step 7030 may include receiving or generating a hybrid representation of a media unit. The hybrid representation includes compressed shape information.

Step 7032 may include comparing the media unit signature of the media unit to signatures of multiple concept structures to find a matching concept structure that has at least one matching signature that matches to the media unit signature.

Step 7034 may include calculating higher accuracy shape information that is related to regions of interest of the media unit, wherein the higher accuracy shape information is of higher accuracy than the compressed shape information of the media unit, wherein the calculating is based on shape information associated with at least some of the matching signatures.

Step 7034 may include at least one out of:

Determining shapes of the media unit regions of interest using the higher accuracy shape information.

For each media unit region of interest, virtually overlaying shapes of corresponding media units of interest of at least some of the matching signatures.

FIG. 1O illustrates a matching process and a generation of a higher accuracy shape information.

It is assumed that there are multiple (M) cluster structures 4974(1)-4974(M). Each cluster structure includes cluster signatures, metadata regarding the cluster signatures, and shape information regarding the regions of interest identified by identifiers of the cluster signatures.

For example—first cluster structure 4974(1) includes multiple (N1) signatures (referred to as cluster signatures CS) CS(1,1)-CS(1,N1) 4975(1,1)-4975(1,N1), metadata 4976(1), and shape information (Shapeinfo 4977(1)) regarding shapes of regions of interest associated with identifiers of the CSs.

Yet for another example—M'th cluster structure 4974(M) includes multiple (N2) signatures (referred to as cluster signatures CS) CS(M,1)-CS(M,N2) 4975(M,1)-4975(M,N2), metadata 4976(M), and shape information (Shapeinfo 4977(M)) regarding shapes of regions of interest associated with identifiers of the CSs.

The number of signatures per concept structure may change over time—for example due to cluster reduction attempts during which a CS is removed from the structure to provide a reduced cluster structure, the reduced structure is checked to determine that the reduced cluster signature may still identify objects that were associated with the (non-reduced) cluster signature—and if so the signature may be reduced from the cluster signature.

The signatures of each cluster structures are associated to each other, wherein the association may be based on similarity of signatures and/or based on association between metadata of the signatures.

Assuming that each cluster structure is associated with a unique object—then objects of a media unit may be identified by finding cluster structures that are associated with said objects. The finding of the matching cluster structures may include comparing a signature of the media unit to signatures of the cluster structures—and searching for one or more matching signature out of the cluster signatures.

In FIG. 1O—a media unit having a hybrid representation undergoes object detection. The hybrid representation includes media unit signature 4972 and compressed shape information 4973.

The media unit signature 4972 is compared to the signatures of the M cluster structures—from CS(1,1) 4975(1,1) till CS(M,N2) 4975(M,N2).

We assume that one or more cluster structures are matching cluster structures.

Once the matching cluster structures are found the method proceeds by generating shape information that is of higher accuracy then the compressed shape information.

The generation of the shape information is done per identifier.

For each j that ranges between 1 and J (J is the number of identifiers per the media unit signature 4972) the method may perform the steps of:

Find (step 4978(j)) the shape information of the j'th identifier of each matching signature—or of each signature of the matching cluster structure.

Generate (step 4979(j)) a higher accuracy shape information of the j'th identifier.

For example—assuming that the matching signatures include CS(1,1) 2975(1,1), CS(2,5) 2975(2,5), CS(7,3) 2975 (7,3) and CS(15,2) 2975(15,2), and that the j'th identifier is included in CS(1,1) 2975(1,1),CS(7,3) 2975(7,3) and CS(15,2) 2975(15,2)—then the shape information of the j'th identifier of the media unit is determined based on the shape information associated with CS(1,1) 2975(1,1),CS(7,3) 2975(7,3) and CS(15,2) 2975(15,2).

Figure 1P:
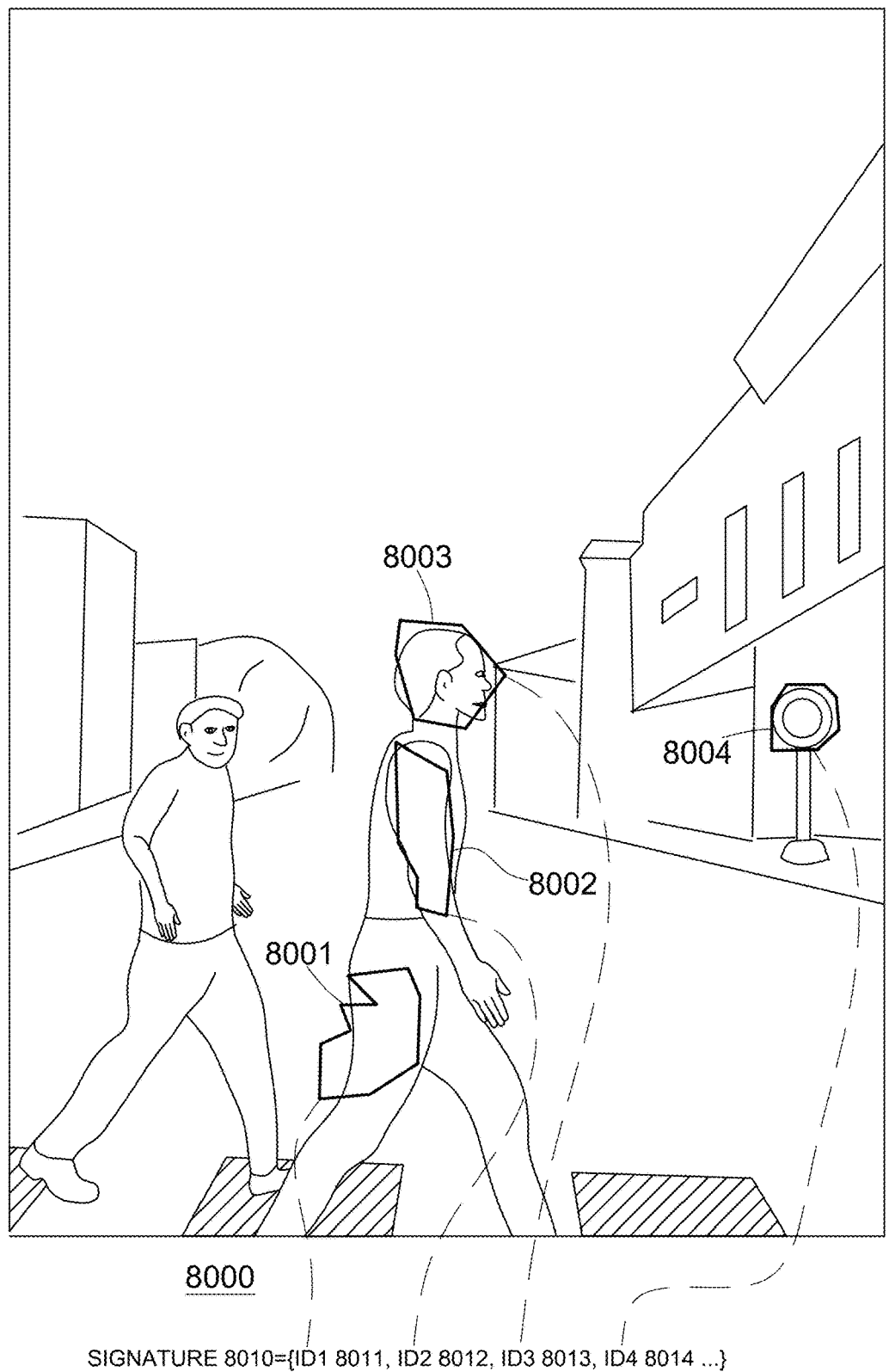
FIG. 1P illustrates an example of an image, approximated regions of interest, compressed shape information and image identifiers.

FIG. 1P illustrates an image 8000 that includes four regions of interest 8001, 8002, 8003 and 8004. The signature 8010 of image 8000 includes various identifiers including ID1 8011, ID2 8012, ID3 8013 and ID4 8014 that identify the four regions of interest 8001, 8002, 8003 and 8004.

The shapes of the four regions of interest 8001, 8002, 8003 and 8004 are four polygons. Accurate shape information regarding the shapes of these regions of interest may be generated during the generation of signature 8010.

Figure 1Q:
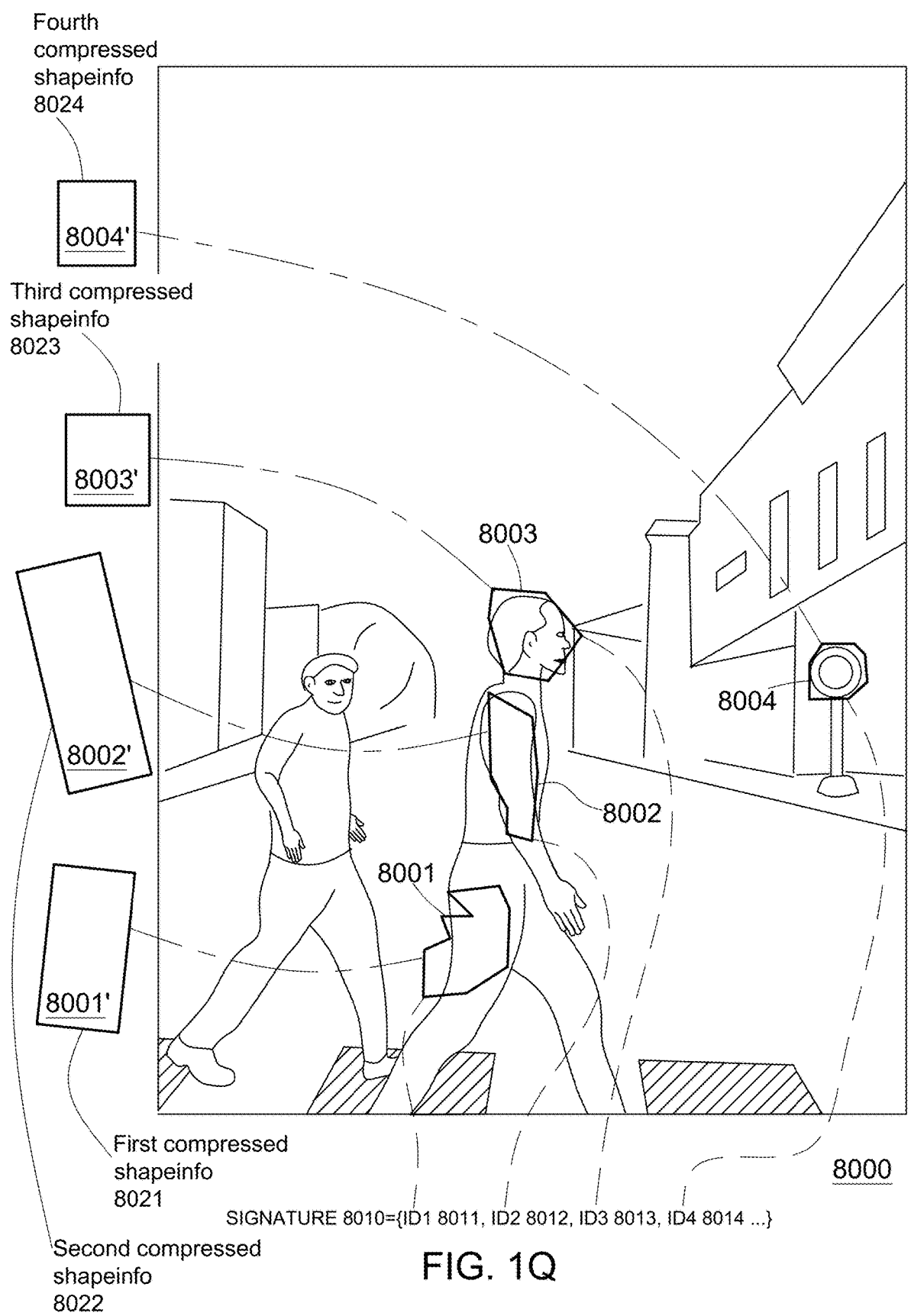
FIG. 1Q illustrates an example of an image, approximated regions of interest, compressed shape information and image identifiers.

FIG. 1Q illustrates the compressing of the shape information to represent a compressed shape information that reflects simpler approximations (8001', 8002', 8003' and 8004') of the regions of interest 8001, 8002, 8003 and 8004. In this example simpler may include less facets, fewer values of angles, and the like.

Figure 1R:
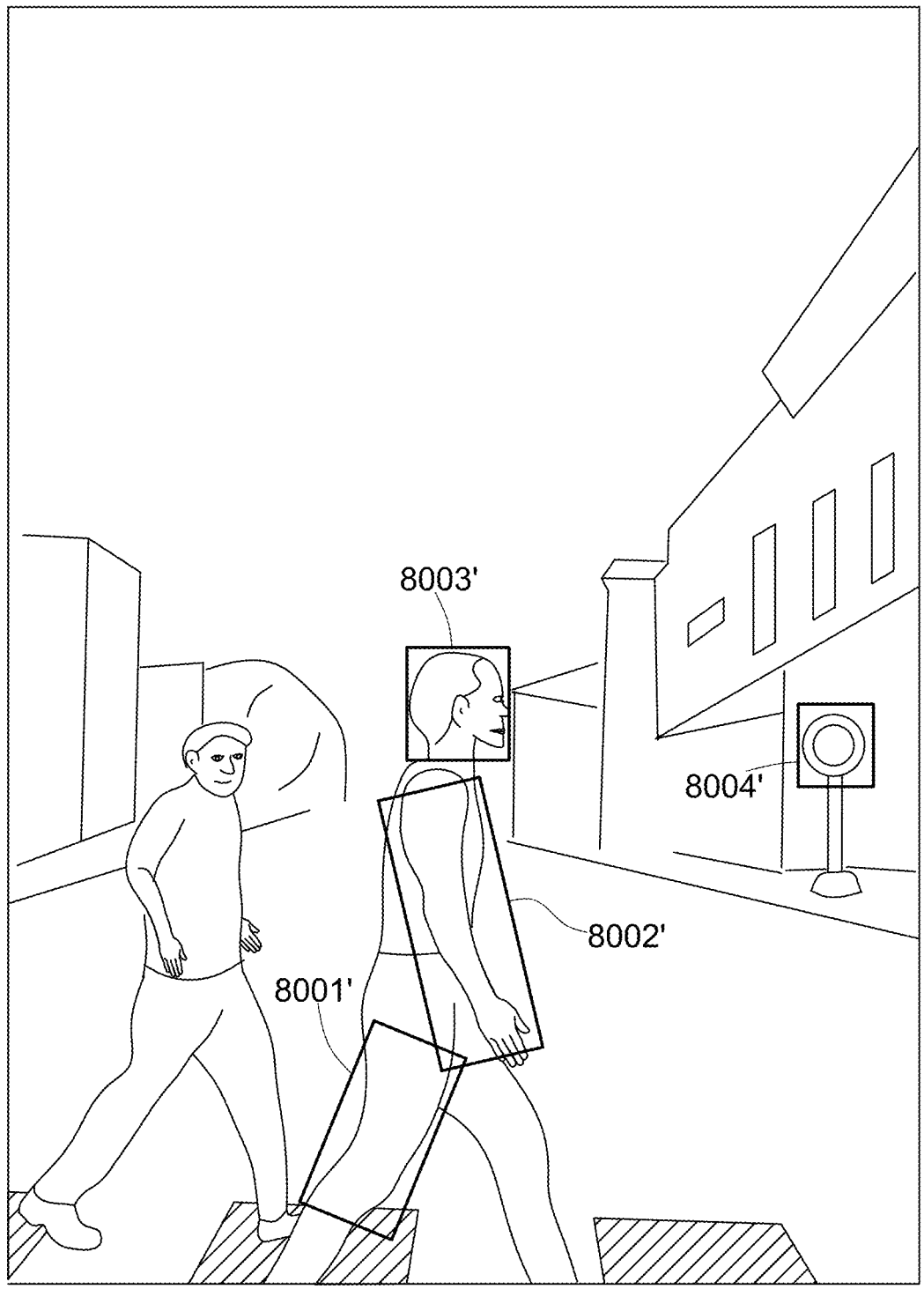
FIGS. 1R and 1S illustrate examples of methods.

The hybrid representation of the media unit, after compression represent an media unit with simplified regions of interest 8001', 8002', 8003' and 8004'—as shown in FIG. 1R.

Scale Based Bootstrap

Objects may appear in an image at different scales. Scale invariant object detection may improve the reliability and repeatability of the object detection and may also use fewer number of cluster structures—thus reduced memory resources and also lower computational resources required to maintain fewer cluster structures.

Figure 1S:
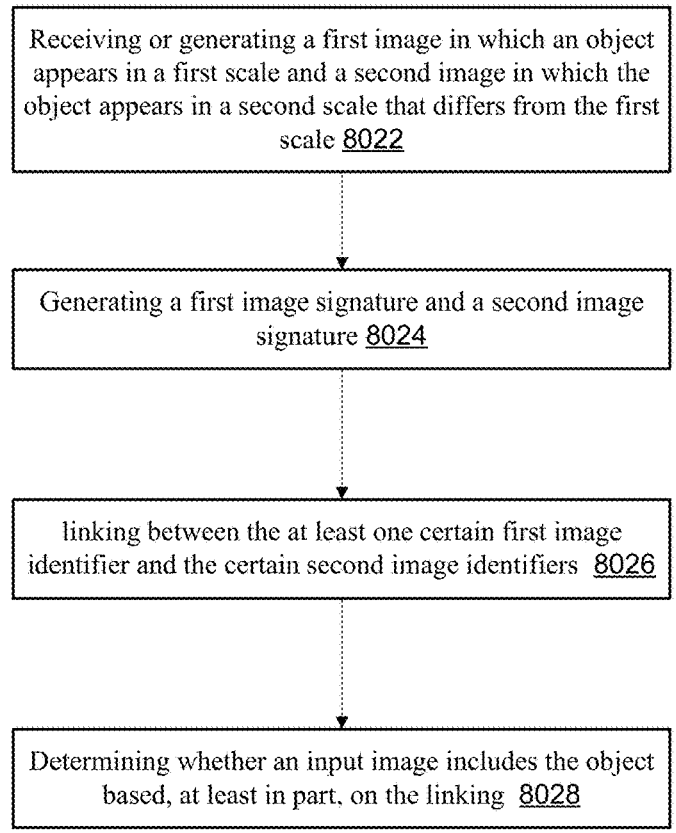

FIG. 1S illustrates method 8020 for scale invariant object detection.

Method 8020 may include a first sequence of steps that may include step 8022, 8024, 8026 and 8028.

Step 8022 may include receiving or generating a first image in which an object appears in a first scale and a second image in which the object appears in a second scale that differs from the first scale.

Step 8024 may include generating a first image signature and a second image signature.

The first image signature includes a first group of at least one certain first image identifier that identifies at least a part of the object. See, for example image 8000' of FIG. 2A. The person is identified by identifiers ID6 8016 and ID8 8018 that represent regions of interest 8006 and 8008.

The second image signature includes a second group of certain second image identifiers that identify different parts of the object.

See, for example image 8000 of FIG. 19. The person is identified by identifiers ID1 8011, ID2 8012, ID3 8013, and ID4 8014 that represent regions of interest 8001, 8002, 8003 and 8004.

The second group is larger than first group—as the second group has more members than the first group.

Step 8026 may include linking between the at least one certain first image identifier and the certain second image identifiers.

Step 8026 may include linking between the first image signature, the second image signature and the object.

Step 8026 may include adding the first signature and the second signature to a certain concept structure that is associated with the object. For example, referring to FIG. 10, the signatures of the first and second images may be included in a cluster concept out of 4974(1)-4974(M).

Step 8028 may include determining whether an input image includes the object based, at least in part, on the linking. The input image differs from the first and second images.

The determining may include determining that the input image includes the object when a signature of the input image includes the at least one certain first image identifier or the certain second image identifiers.

The determining may include determining that the input image includes the object when the signature of the input image includes only a part of the at least one certain first image identifier or only a part of the certain second image identifiers.

The linking may be performed for more than two images in which the object appears in more than two scales.

For example, see FIG. 2B in which a person appears at three different scales—at three different images.

In first image 8051 the person is included in a single region of interest 8061 and the signature 8051' of first image 8051 includes an identifier ID61 that identifies the single region of interest—identifies the person.

In second image 8052 the upper part of the person is included in region of interest 8068, the lower part of the person is included in region of interest 8069 and the signature 8052' of second image 8052 includes identifiers ID68 and ID69 that identify regions of interest 8068 and 8069 respectively.

In third image 8053 the eyes of the person are included in region of interest 8062, the mouth of the person is included in region of interest 8063, the head of the person appears in region of interest 8064, the neck and arms of the person appear in region of interest 8065, the middle part of the person appears in region of interest 8066, and the lower part of the person appears in region of interest 8067. Signature 8053' of third image 8053 includes identifiers ID62, ID63, ID64, ID65, ID55 and ID67 that identify regions of interest 8062-8067 respectively.

Method 8020 may link signatures 8051', 8052' and 8053' to each other. For example—these signatures may be included in the same cluster structure.

Method 8020 may link (i) ID61, (ii) signatures ID68 and ID69, and (ii) signature ID62, ID63, ID64, ID65, ID66 and ID67.

Figure 2C:
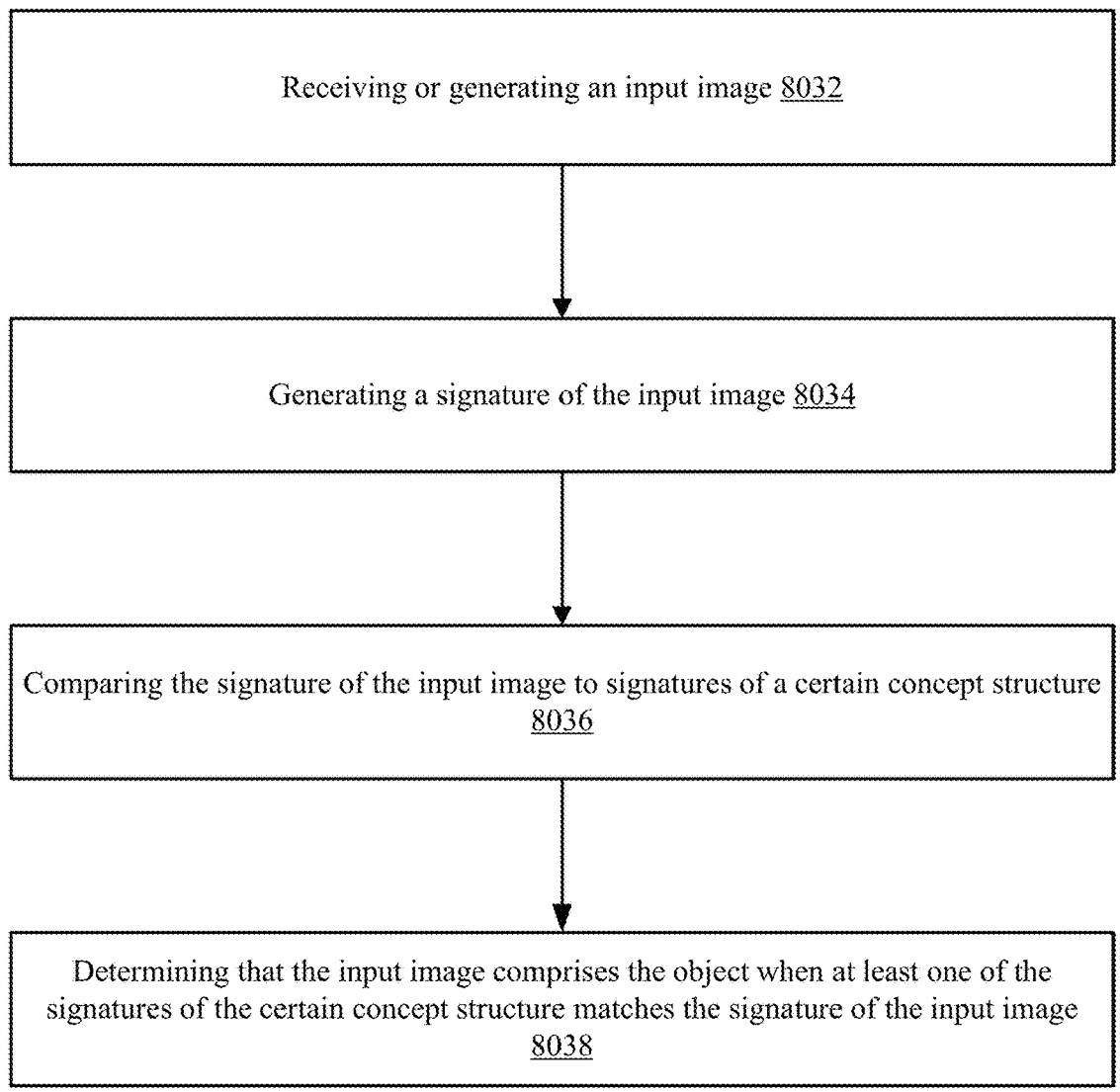
FIG. 2C illustrates an example of a method.

FIG. 2C illustrates method 8030 for object detection.

Method 8030 may include the steps of method 8020 or may be preceded by steps 8022, 8024 and 8026.

Method 8030 may include a sequence of steps 8032, 8034, 8036 and 8038.

Step 8032 may include receiving or generating an input image.

Step 8034 may include generating a signature of the input image.

Step 8036 may include comparing the signature of the input image to signatures of a certain concept structure. The certain concept structure may be generated by method 8020.

Step 8038 may include determining that the input image comprises the object when at least one of the signatures of the certain concept structure matches the signature of the input image.

Figure 2D:
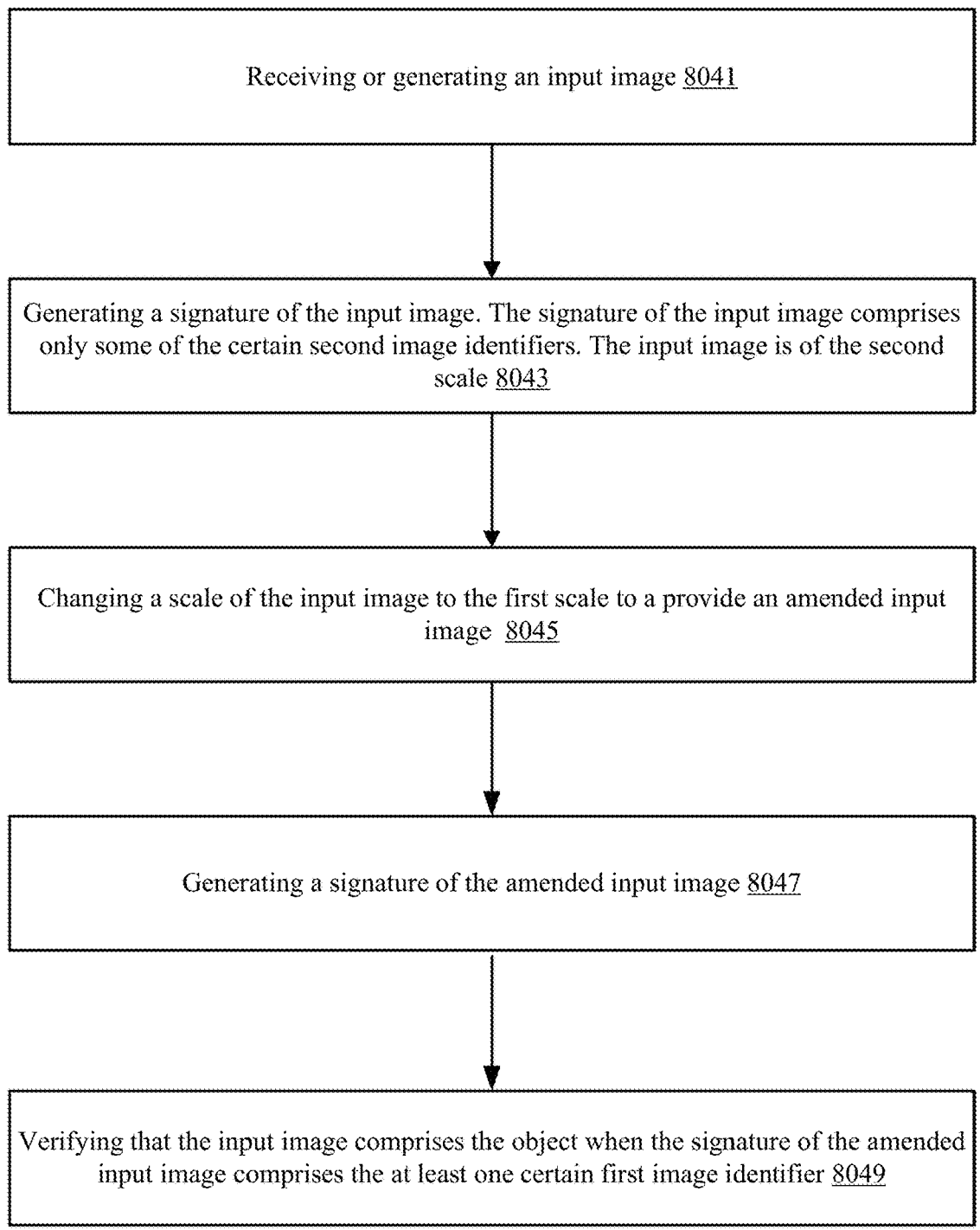
FIG. 2D illustrates an example of a method.

FIG. 2D illustrates method 8040 for object detection.

Method 8040 may include the steps of method 8020 or may be preceded by steps 8022, 8024 and 8026.

Method 8040 may include a sequence of steps 8041, 8043, 8045, 8047 and 8049.

Step 8041 may include receiving or generating an input image.

Step 8043 may include generating a signature of the input image, the signature of the input image comprises only some of the certain second image identifiers; wherein the input image of the second scale.

Step 8045 may include changing a scale of the input image to the first scale to a provide an amended input image.

Step 8047 may include generating a signature of the amended input image.

Step 8049 may include verifying that the input image comprises the object when the signature of the amended input image comprises the at least one certain first image identifier.

Figure 2E:
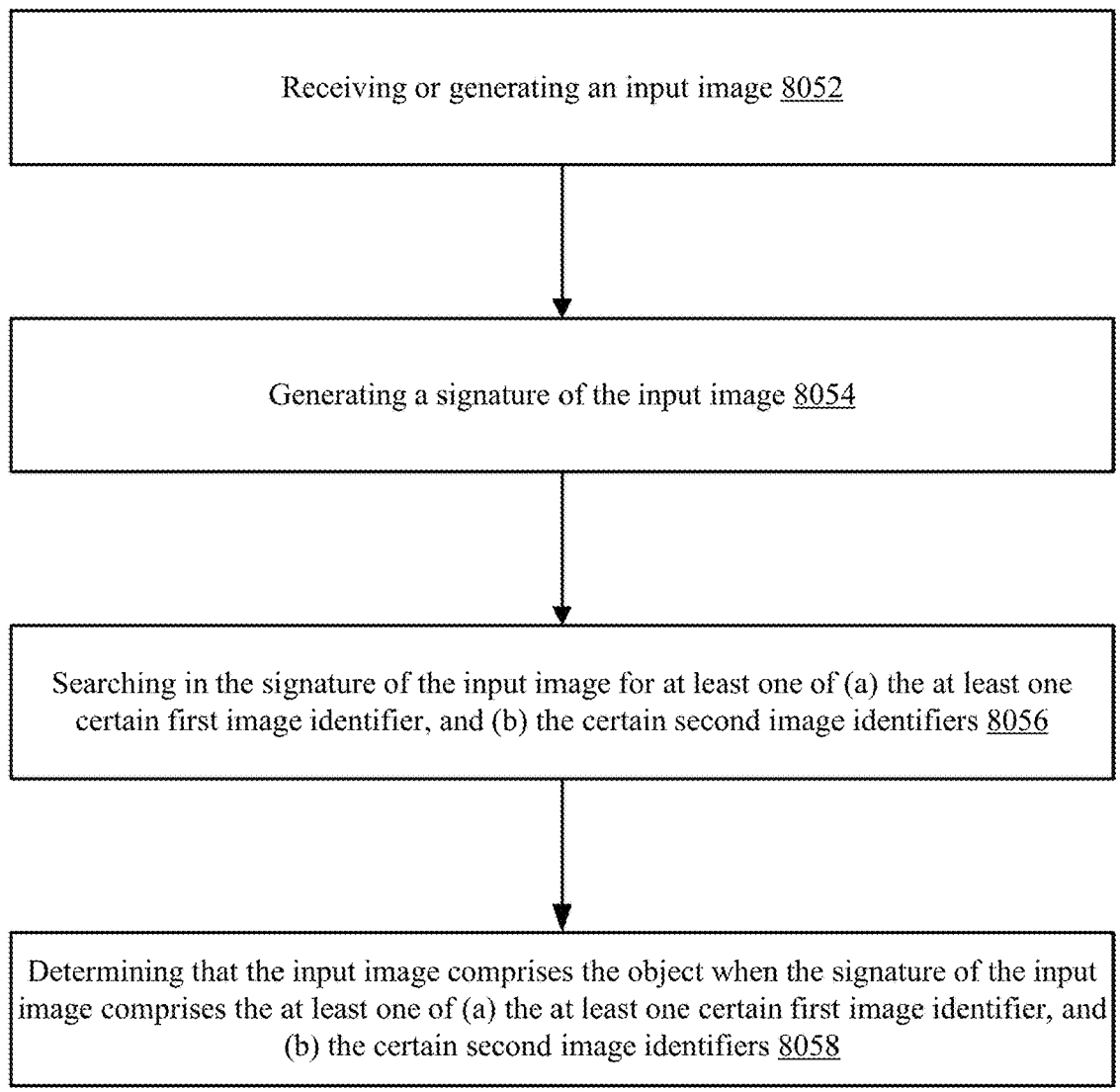
FIG. 2E illustrates an example of a method.

FIG. 2E illustrates method 8050 for object detection.

Method 8050 may include the steps of method 8020 or may be preceded by steps 8022, 8024 and 8026.

Method 8050 may include a sequence of steps 8052, 8054, 8056 and 8058.

Step 8052 may include receiving or generating an input image.

Step 8054 may include generating a signature of the input image.

Step 8056 may include searching in the signature of the input image for at least one of (a) the at least one certain first image identifier, and (b) the certain second image identifiers.

Step 8058 may include determining that the input image comprises the object when the signature of the input image comprises the at least one of (a) the at least one certain first image identifier, and (b) the certain second image identifiers.

It should be noted that step 8056 may include searching in the signature of the input image for at least one of (a) one or more certain first image identifier of the at least one certain first image identifier, and (b) at least one certain second image identifier of the certain second image identifiers.

It should be noted that step 8058 may include determining that the input image includes the object when the signature of the input image comprises the at least one of (a) one or more certain first image identifier of the at least one certain first image identifier, and (b) the at least one certain second image identifier.

Movement Based Bootstrapping

A single object may include multiple parts that are identified by different identifiers of a signature of the image. In cases such as unsupervised learning, it may be beneficial to link the multiple object parts to each other without receiving prior knowledge regarding their inclusion in the object.

Additionally or alternatively, the linking can be done in order to verify a previous linking between the multiple object parts.

Figure 2F:
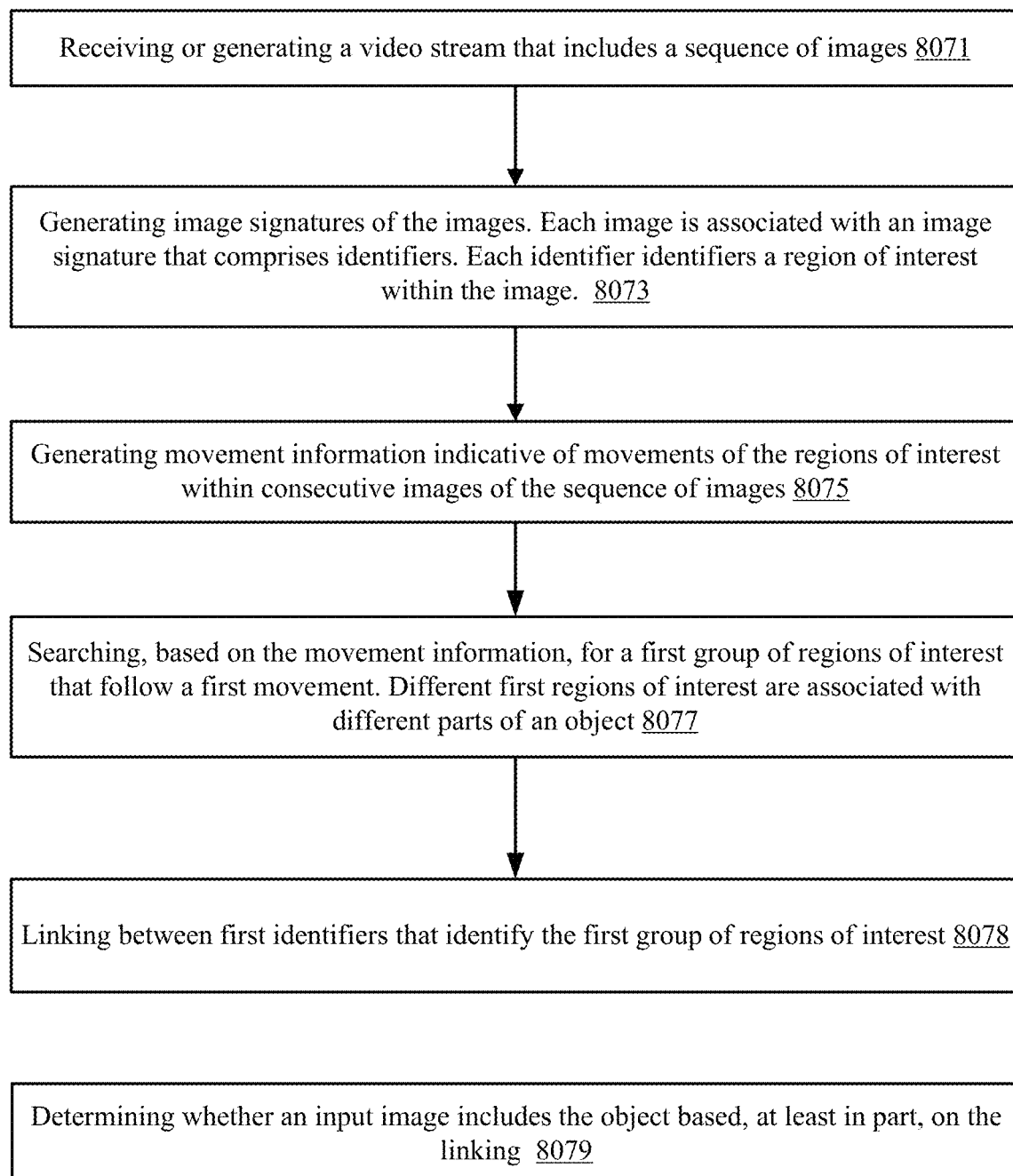
FIG. 2F illustrates an example of a method.

FIG. 2F illustrates method 8070 for object detection.

Method 8070 is for movement based object detection.

Method 8070 may include a sequence of steps 8071, 8073, 8075, 8077, 8078 and 8079.

Step 8071 may include receiving or generating a video stream that includes a sequence of images.

Step 8073 may include generating image signatures of the images. Each image is associated with an image signature that comprises identifiers. Each identifier identifiers a region of interest within the image.

Step 8075 may include generating movement information indicative of movements of the regions of interest within consecutive images of the sequence of images. Step 8075 may be preceded by or may include generating or receiving location information indicative of a location of each region of interest within each image. The generating of the movement information is based on the location information.

Step 8077 may include searching, based on the movement information, for a first group of regions of interest that follow a first movement. Different first regions of interest are associated with different parts of an object.

Step 8078 may include linking between first identifiers that identify the first group of regions of interest.

Step 8079 may include linking between first image signatures that include the first linked identifiers.

Step 8079 may include adding the first image signatures to a first concept structure, the first concept structure is associated with the first image.

Figure 2H:
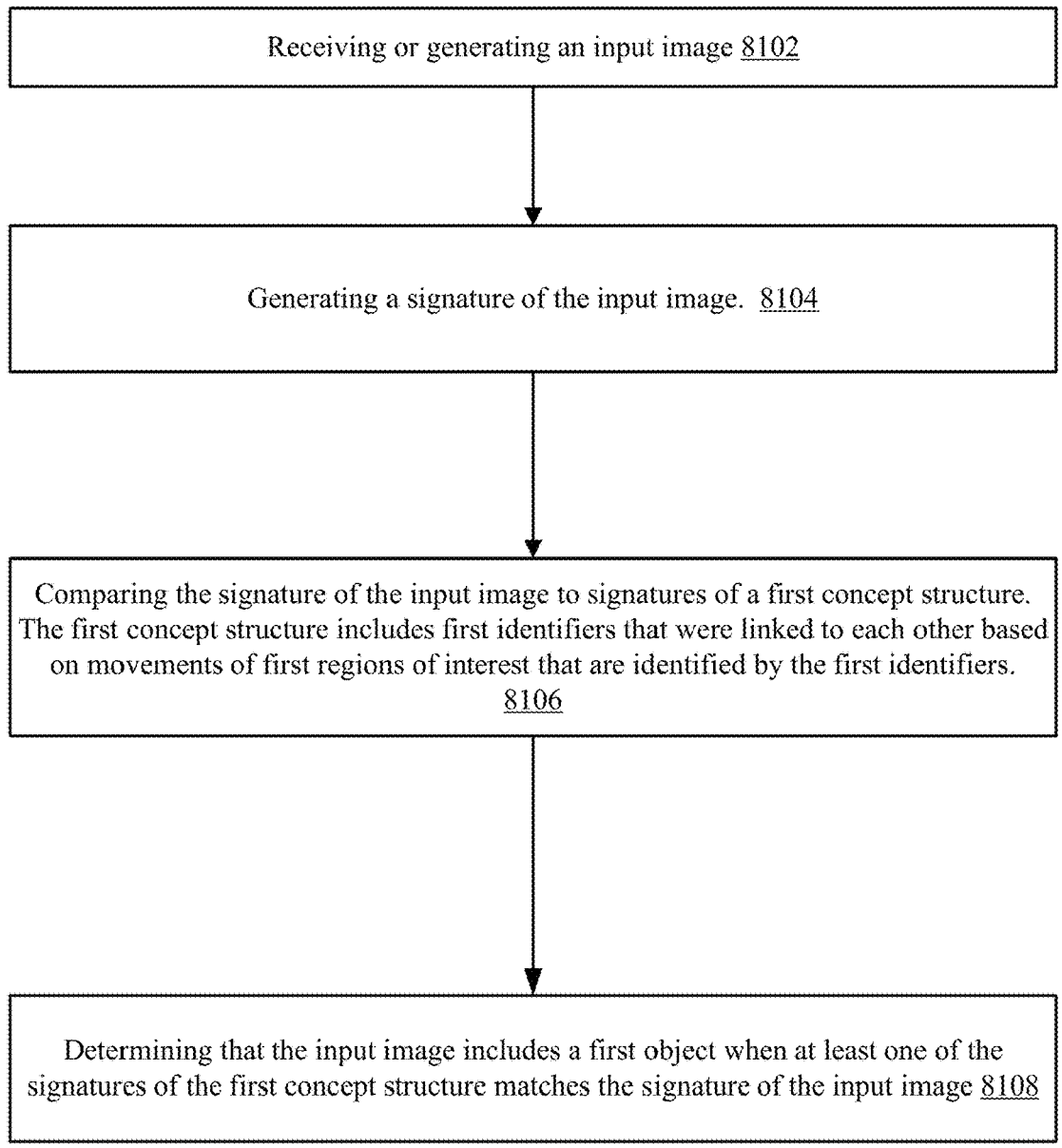
FIG. 2H illustrates an example of a method.
Figure 21:
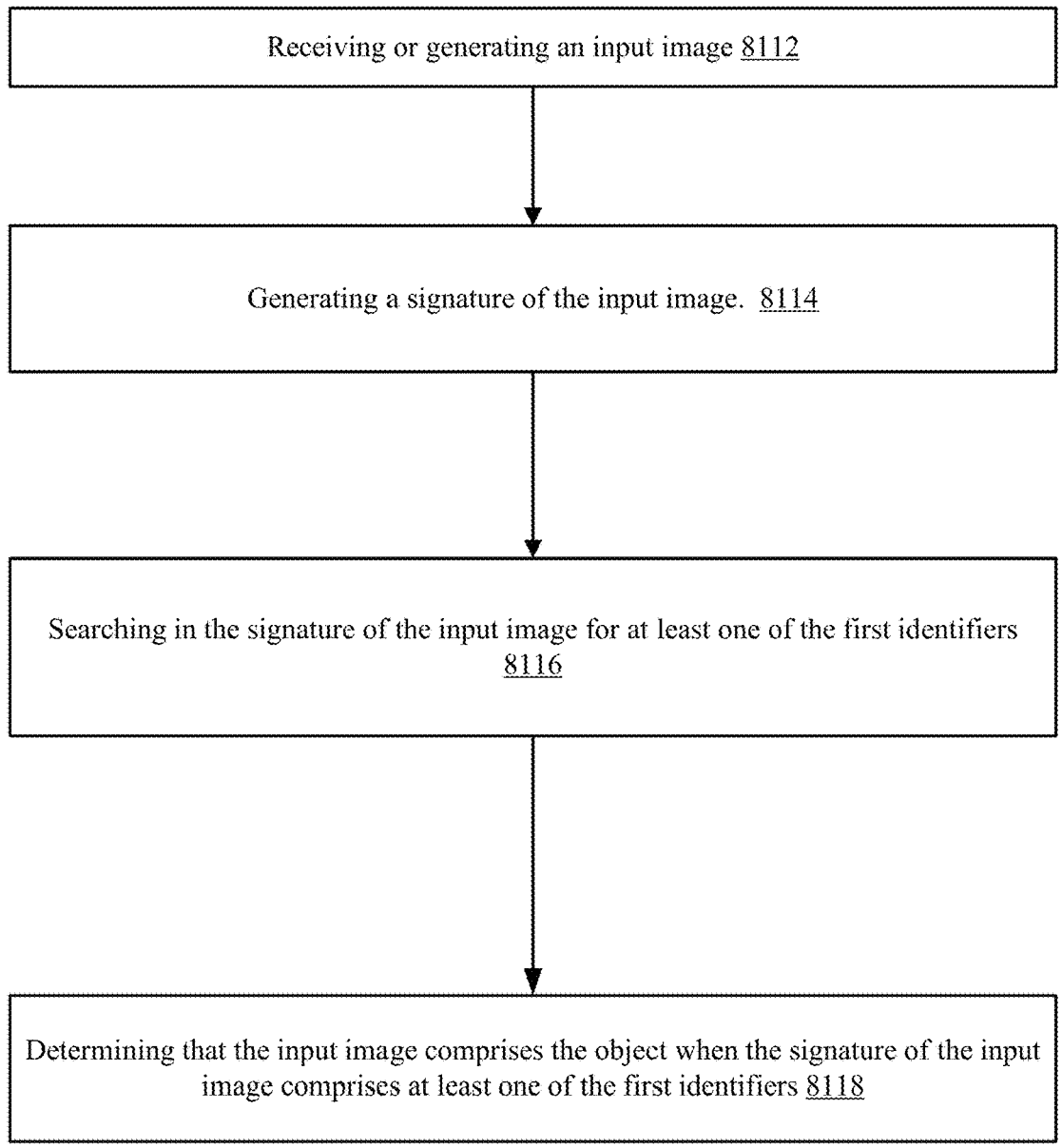

Step 8079 may be followed by determining whether an input image includes the object based, at least in part, on the linking An example of various steps of method 8070 is illustrated in FIG. 2H.

FIG. 2G illustrates three images 8091, 8092 and 8093 that were taken at different points in time.

First image 8091 illustrates a gate 8089' that is located in region of interest 8089 and a person that faces the gate. Various parts of the person are located within regions of interest 8081, 8082, 8083, 8084 and 8085.

The first image signature 8091' includes identifiers ID81, ID82, ID83, ID84, ID85 and ID89 that identify regions of interest 8081, 8082, 8083, 8084, 8085 and 8089 respectively.

The first image location information 8091" includes the locations L81, L82, L83, L84, L85 and L89 of regions of interest 8081, 8082, 8083, 8084, 8085 and 8089 respectively. A location of a region of interest may include a location of the center of the region of interest, the location of the borders of the region of interest or any location information that may define the location of the region of interest or a part of the region of interest.

Second image 8092 illustrates a gate that is located in region of interest 8089 and a person that faces the gate. Various parts of the person are located within regions of interest 8081, 8082, 8083, 8084 and 8085. Second image also includes a pole that is located within region of interest 8086. In the first image that the pole was concealed by the person.

The second image signature 8092' includes identifiers ID81, ID82, ID83, ID84, ID85, ID86, and ID89 that identify regions of interest 8081, 8082, 8083, 8084, 8085, 8086 and 8089 respectively.

The second image location information 8092" includes the locations L81, L82, L83, L84, L85, L86 and L89 of regions of interest 8081, 8082, 8083, 8084, 8085, 8086 and 8089 respectively.

Third image 8093 illustrates a gate that is located in region of interest 8089 and a person that faces the gate. Various parts of the person are located within regions of interest 8081, 8082, 8083, 8084 and 8085. Third image also includes a pole that is located within region of interest 8086, and a balloon that is located within region of interest 8087.

The third image signature 8093' includes identifiers ID81, ID82, ID83, ID84, ID85, ID86, ID87 and ID89 that identify regions of interest 8081, 8082, 8083, 8084, 8085, 8086, 8087 and 8089 respectively.

The third image location information 8093" includes the locations L81, L82, L83, L84, L85, L86, L87 and L89 of regions of interest 8081, 8082, 8083, 8084, 8085, 8086, 8086 and 8089 respectively.

The motion of the various regions of interest may be calculated by comparing the location information related to different images. The movement information may take into account the different in the acquisition time of the images.

The comparison shows that regions of interest 8081, 8082, 8083, 8084, 8085 move together and thus they should be linked to each other—and it may be assumed that they all belong to the same object.

FIG. 2H illustrates method 8100 for object detection.

Method 8100 may include the steps of method 8070 or may be preceded by steps 8071, 8073, 8075, 8077 and 8078.

Method 8100 may include the following sequence of steps:

Step 8102 of receiving or generating an input image.

Step 8104 of generating a signature of the input image.

Step 8106 of comparing the signature of the input image to signatures of a first concept structure. The first concept structure includes first identifiers that were linked to each other based on movements of first regions of interest that are identified by the first identifiers.

Step 8108 of determining that the input image includes a first object when at least one of the signatures of the first concept structure matches the signature of the input image.

FIG. 2I illustrates method 8110 for object detection.

Method 8110 may include the steps of method 8070 or may be preceded by steps 8071, 8073, 8075, 8077 and 8078.

Method 8110 may include the following sequence of steps:

Step 8112 of receiving or generating an input image.

Step 8114 of generating a signature of the input image.

Step 8116 of searching in the signature of the input image for at least one of the first identifiers.

Step 8118 of determining that the input image comprises the object when the signature of the input image comprises at least one of the first identifiers.

Object Detection that is Robust to Angle of Acquisition

Object detection may benefit from being robust to the angle of acquisition—to the angle between the optical axis of an image sensor and a certain part of the object. This allows the detection process to be more reliable, use fewer different clusters (may not require multiple clusters for identifying the same object from different images).

Figure 2J:
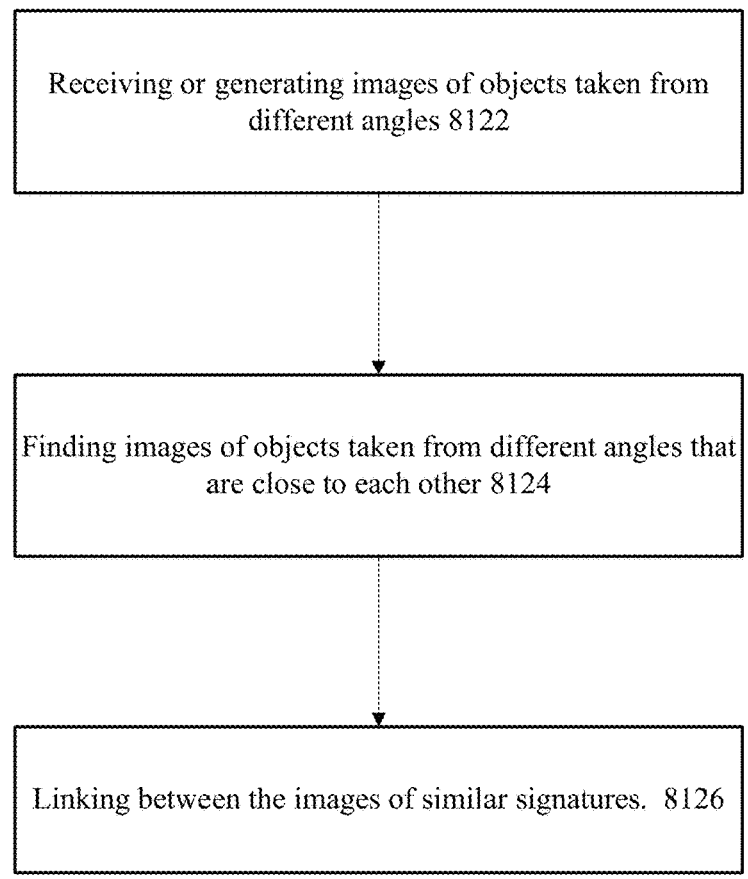
FIG. 2J illustrates an example of a method.

FIG. 2J illustrates method 8120 that includes the following steps:

Step 8122 of receiving or generating images of objects taken from different angles.

Step 8124 of finding images of objects taken from different angles that are close to each other. Close enough may be less than 1,5,10,15 and 20 degrees—but the closeness may be better reflected by the reception of substantially the same signature.

Step 8126 of linking between the images of similar signatures. This may include searching for local similarities. The similarities are local in the sense that they are calculated per a subset of signatures. For example—assuming that the similarity is determined per two images—then a first signature may be linked to a second signature that is similar to the first image. A third signature may be linked to the second image based on the similarity between the second and third signatures—and even regardless of the relationship between the first and third signatures.

Step 8126 may include generating a concept data structure that includes the similar signatures.

This so-called local or sliding window approach, in addition to the acquisition of enough images (that will statistically provide a large angular coverage) will enable to generate a concept structure that include signatures of an object taken at multiple directions.

Figure 2K:
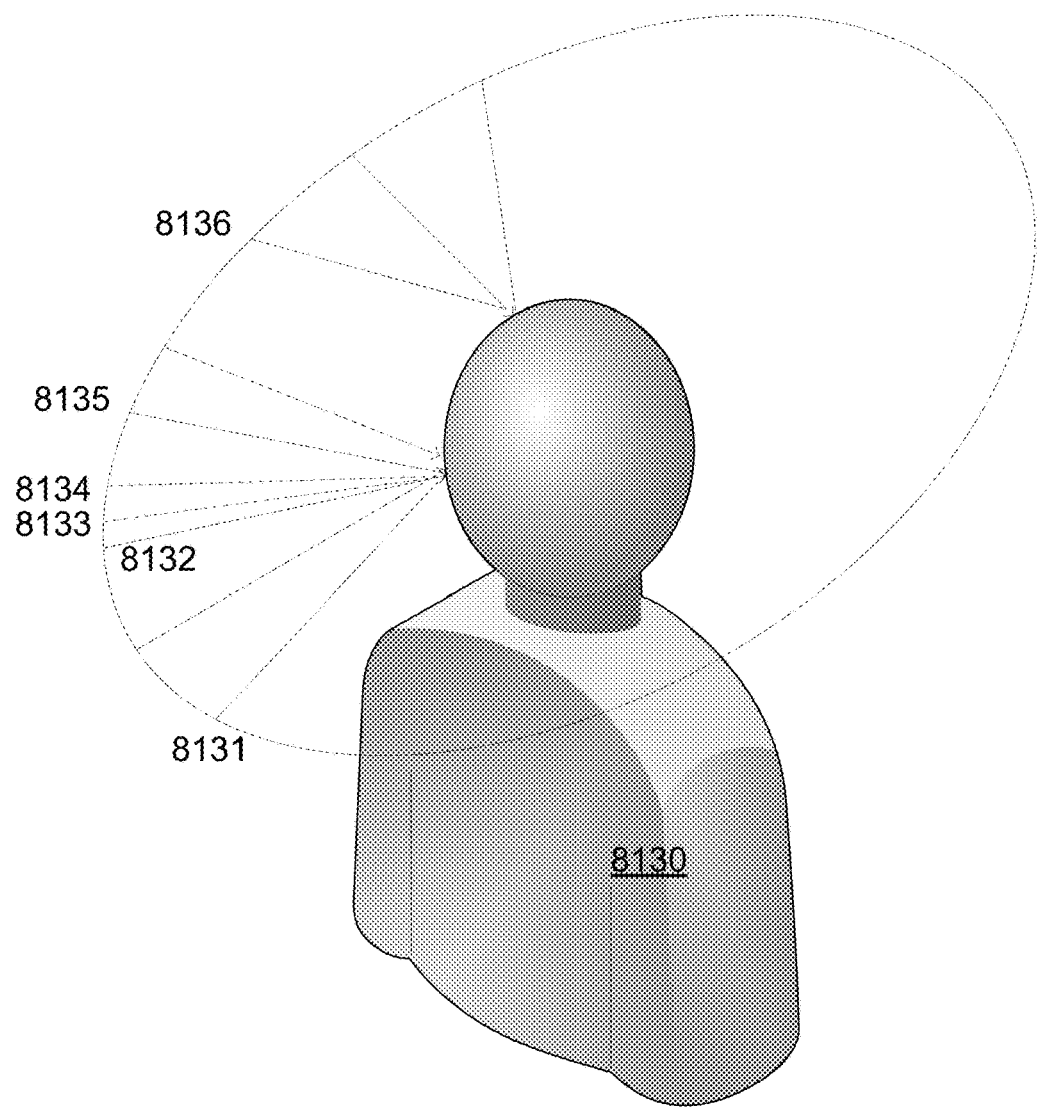
FIG. 2K illustrates an example of different images acquisition angles.

FIG. 2K illustrates a person 8130 that is imaged from different angles (8131, 8132, 8133, 8134, 8135 and 8136). While the signature of a front view of the person (obtained from angle 8131) differs from the signature of the side view of the person (obtained from angle 8136), the signature of images taken from multiple angles between angles 8141 and 8136 compensates for the difference—as the difference between images obtained from close angles are similar (local similarity) to each other.

Signature Tailored Matching Threshold

Object detection may be implemented by (a) receiving or generating concept structures that include signatures of media units and related metadata, (b) receiving a new media unit, generating a new media unit signature, and (c) comparing the new media unit signature to the concept signatures of the concept structures.

The comparison may include comparing new media unit signature identifiers (identifiers of objects that appear in the new media unit) to concept signature identifiers and determining, based on a signature matching criteria whether the new media unit signature matches a concept signature. If such a match is found then the new media unit is regarded as including the object associated with that concept structure.

It was found that by applying an adjustable signature matching criteria, the matching process may be highly effective and may adapt itself to the statistics of appearance of identifiers in different scenarios. For example—a match may be obtained when a relatively rear but highly distinguishing identifier appears in the new media unit signature and in a cluster signature, but a mismatch may be declared when multiple common and slightly distinguishing identifiers appear in the new media unit signature and in a cluster signature.

Figure 2L:
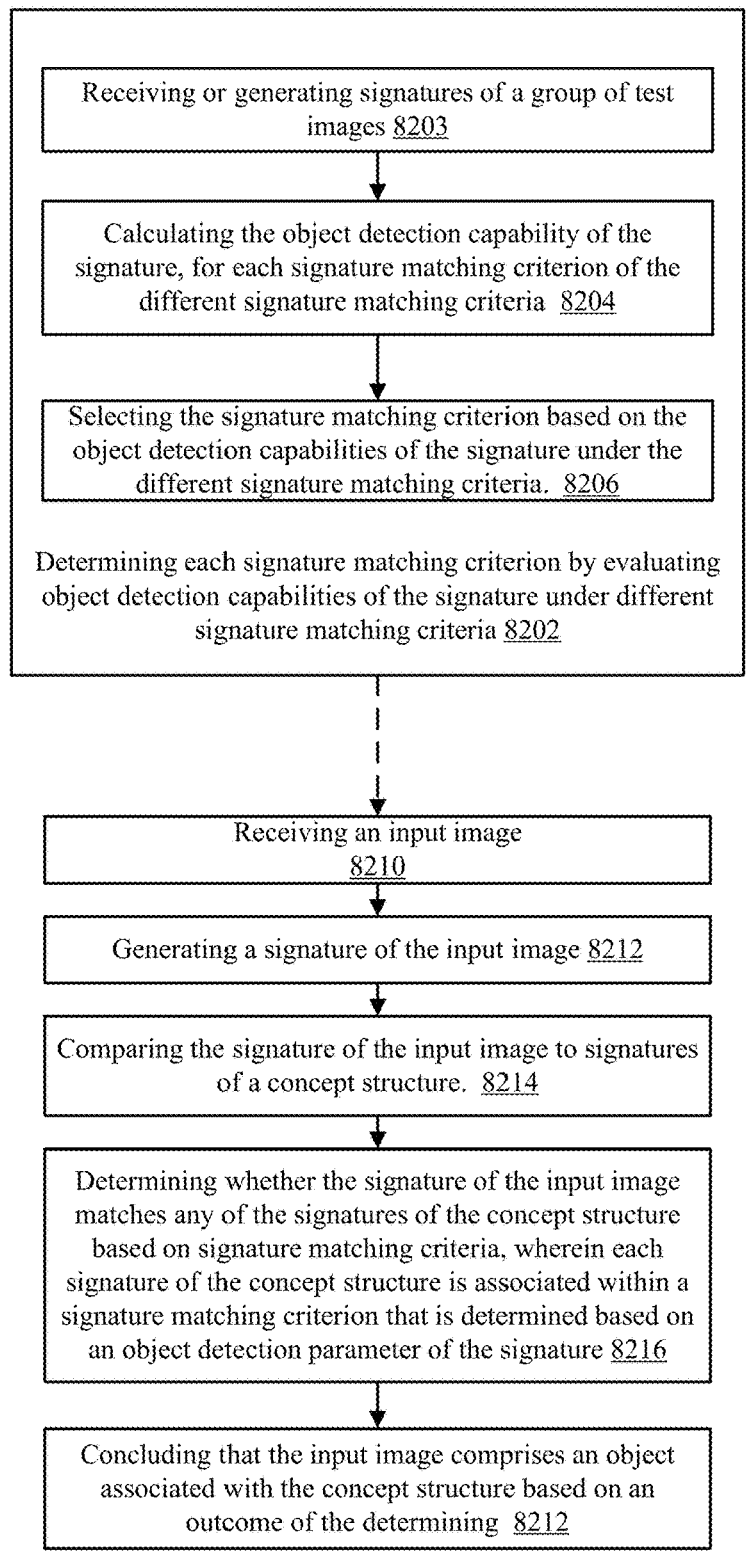
FIG. 2L illustrates an example of a method.

FIG. 2L illustrates method 8200 for object detection.

Method 8200 may include:

Step 8210 of receiving an input image.

Step 8212 of generating a signature of the input image.

Step 8214 of comparing the signature of the input image to signatures of a concept structure.

Step 8216 of determining whether the signature of the input image matches any of the signatures of the concept structure based on signature matching criteria, wherein each signature of the concept structure is associated within a signature matching criterion that is determined based on an object detection parameter of the signature.

Step 8218 of concluding that the input image comprises an object associated with the concept structure based on an outcome of the determining.

The signature matching criteria may be a minimal number of matching identifiers that indicate of a match. For example—assuming a signature that include few tens of identifiers, the minimal number may vary between a single identifier to all of the identifiers of the signature.

It should be noted that an input image may include multiple objects and that an signature of the input image may match multiple cluster structures. Method 8200 is applicable to all of the matching processes—and that the signature matching criteria may be set for each signature of each cluster structure.

Step 8210 may be preceded by step 8202 of determining each signature matching criterion by evaluating object detection capabilities of the signature under different signature matching criteria.

Step 8202 may include:

Step 8203 of receiving or generating signatures of a group of test images.

Step 8204 of calculating the object detection capability of the signature, for each signature matching criterion of the different signature matching criteria.

Step 8206 of selecting the signature matching criterion based on the object detection capabilities of the signature under the different signature matching criteria.

The object detection capability may reflect a percent of signatures of the group of test images that match the signature.

The selecting of the signature matching criterion comprises selecting the signature matching criterion that once applied results in a percent of signatures of the group of test images that match the signature that is closets to a predefined desired percent of signatures of the group of test images that match the signature.

The object detection capability may reflect a significant change in the percent of signatures of the group of test images that match the signature. For example—assuming, that the signature matching criteria is a minimal number of matching identifiers and that changing the value of the minimal numbers may change the percentage of matching test images. A substantial change in the percentage (for example a change of more than 10, 20, 30, 40 percent) may be indicative of the desired value. The desired value may be set before the substantial change, proximate to the substantial change, and the like.

Figure 10:
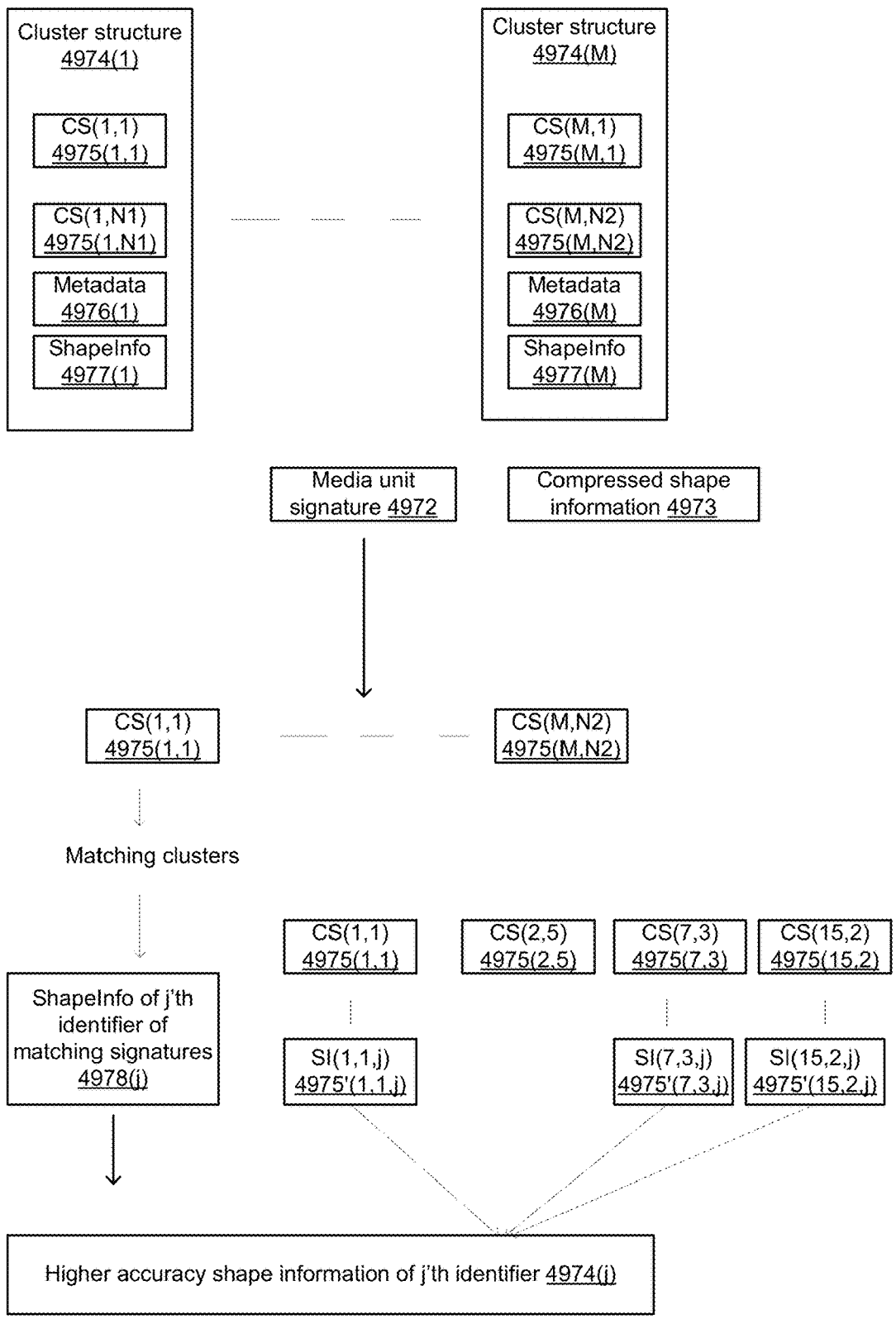

For example, referring to FIG. 10, cluster signatures CS(1,1), CS(2,5), CS(7,3) and CS(15,2) match unit signature 4972. Each of these matches may apply a unique signature matching criterion.

Figure 2M:
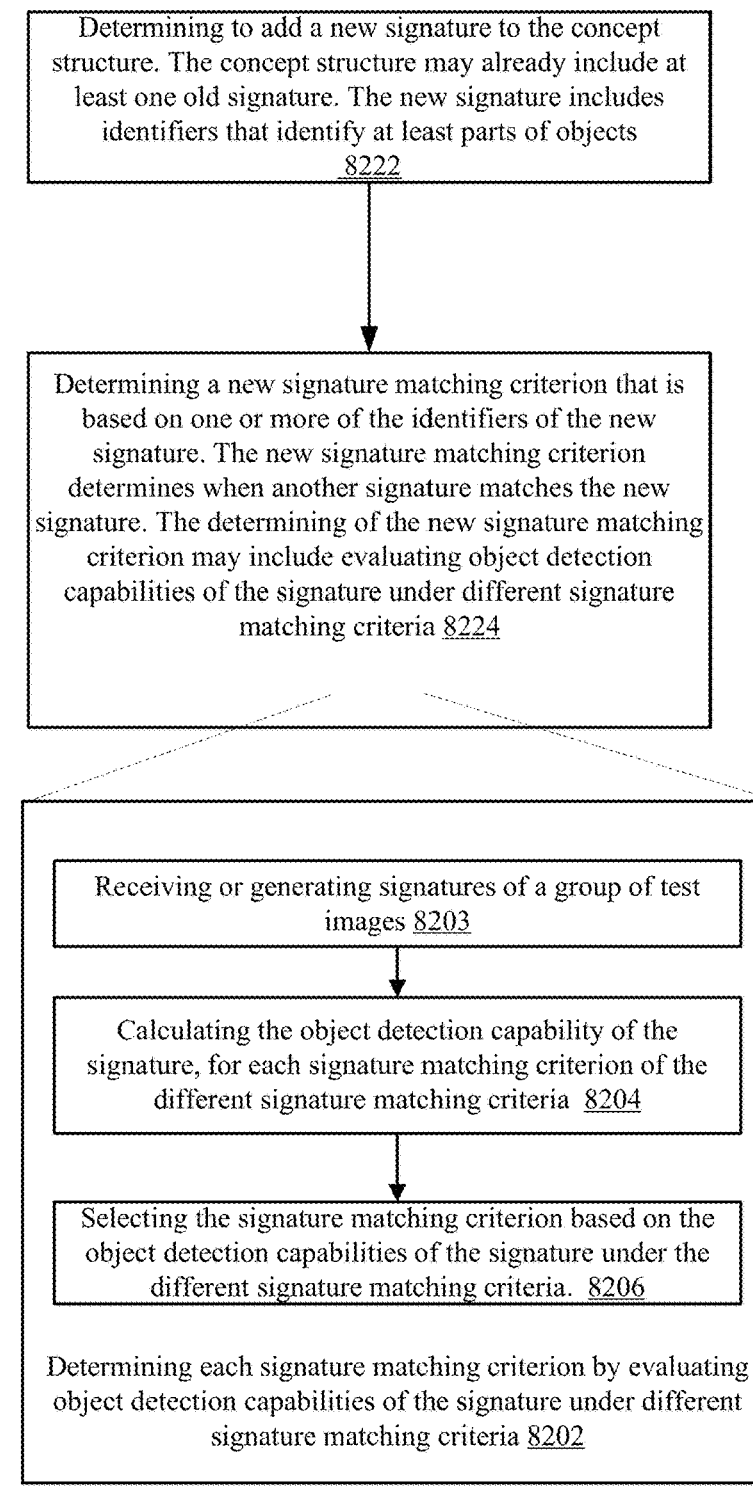
FIG. 2M illustrates an example of a method.

FIG. 2M illustrates method 8220 for object detection.

Method 8220 is for managing a concept structure.

Method 8220 may include:

Step 8222 of determining to add a new signature to the concept structure. The concept structure may already include at least one old signature. The new signature includes identifiers that identify at least parts of objects.

Step 8224 of determining a new signature matching criterion that is based on one or more of the identifiers of the new signature. The new signature matching criterion determines when another signature matches the new signature. The determining of the new signature matching criterion may include evaluating object detection capabilities of the signature under different signature matching criteria.

Step 8224 may include steps 8203, 8204 and 8206 (include din step 8206) of method 8200.

Examples of Systems

Figure 2N:
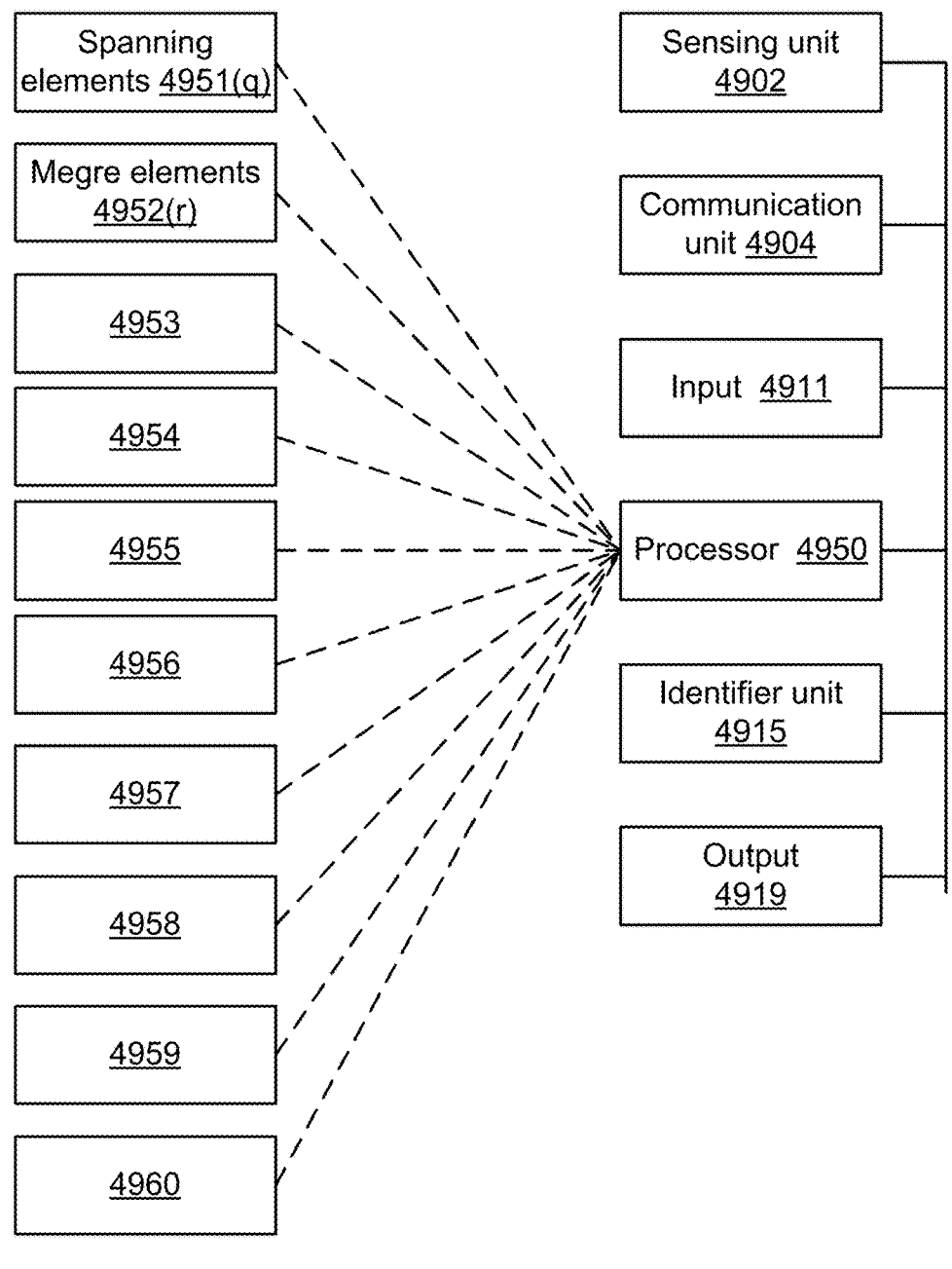
FIG. 2N illustrates an example of a system.

FIG. 2N illustrates an example of a system capable of executing one or more of the mentioned above methods.

The system include various components, elements and/or units.

A component element and/or unit may be a processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Alternatively, each component element and/or unit may implemented in hardware, firmware, or software that may be executed by a processing circuitry.

System 4900 may include sensing unit 4902, communication unit 4904, input 4911, processor 4950, and output 4919. The communication unit 4904 may include the input and/or the output.

Input and/or output may be any suitable communications component such as a network interface card, universal serial bus (USB) port, disk reader, modem or transceiver that may be operative to use protocols such as are known in the art to communicate either directly, or indirectly, with other elements of the system.

Processor 4950 may include at least some out of

Multiple spanning elements 4951($q$).

Multiple merge elements 4952($r$).

Object detector 4953.

Cluster manager 4954.

Controller 4955.

Selection unit 4956.

Object detection determination unit 4957.

Signature generator 4958.

Movement information unit 4959.

Identifier unit 4960.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for generating a hybrid representation of a media unit, the method comprises:
   receiving or generating the media unit;
   processing the media unit by performing multiple iterations, wherein for each iteration of at least some of the multiple iterations the processing comprises:
   (i) finding spanning elements that are relevant to the iteration and spanning elements that are irrelevant to the iteration; wherein a spanning element that is relevant for one of the at least some of the multiple iterations is irrelevant for another iteration of the at least some of the multiple iterations; wherein a finding of whether a spanning element of the spanning elements is relevant to an iteration comprises comparing a merge result of a previous iteration to a unique set associated with the spanning element;
   (ii) applying, by the spanning elements that are relevant to the iteration, dimension expansion process that are followed by a merge operation;
   (iii) entering the spanning elements that are irrelevant to the iteration into an idle mode;
   selecting, based on an output of the multiple iterations, media unit regions of interest that contributed to the output of the multiple iterations; and
   providing the hybrid representation, wherein the hybrid representation comprises shape information regarding shapes of the media unit regions of interest, and a media unit signature that comprises identifiers that identify the media unit regions of interest;
   wherein the shape information comprises polygons.

2. The method according to claim 1 wherein the selecting of the media regions of interest is executed per segment out of multiple segments of the media unit.

3. The method according to claim 1 wherein the polygons represent shapes that substantially bound the media unit regions of interest, wherein a number of edges per polygon of the polygons is based on a shape of a media unit region of interest represented by the polygon at least one of the polygons differs from a rectangle.

4. The method according to claim 1 wherein the providing of the hybrid representation of the media unit comprises compressing the shape information of the media unit to provide compressed shape information of the media unit.

5. The method according to claim 4 comprising: comparing the media unit signature of the media unit to signatures of multiple concept structures to find a matching concept structure that has at least one matching signature that matches to the media unit signature; and calculating higher accuracy shape information that is related to regions of interest of the media unit, wherein the higher accuracy shape information is of higher accuracy than the compressed shape information of the media unit, wherein the calculating is based on shape information associated with at least some of the matching signatures.

6. The method according to claim 5 comprising determining shapes of the media unit regions of interest using the higher accuracy shape information.

7. The method according to claim 5 wherein for each media unit region of interest, the calculating of the higher accuracy shape information comprises virtually overlaying shapes of corresponding media units of interest of at least some of the matching signatures.

8. The method according to claim 1 wherein the media unit is an image.

9. A non-transitory computer readable medium for generating a hybrid representation of a media unit, the non-transitory computer readable medium stores instructions for:
receiving or generating the media unit;
processing the media unit by performing multiple iterations, wherein for each iteration of at least some of the multiple iterations the processing comprises:
(i) finding spanning elements that are relevant to the iteration and spanning elements that are irrelevant to the iteration; wherein a spanning element that is relevant for one of the at least some of the multiple iterations is irrelevant for another iteration of the at least some of the multiple iterations; wherein a finding of whether a spanning element of the spanning elements is relevant to an iteration comprises comparing a merge result of a previous iteration to a unique set associated with the spanning element;
(ii) applying, by the spanning elements that are relevant to the iteration, dimension expansion process that are followed by a merge operation;
(iii) entering the spanning elements that are irrelevant to the iteration into an idle mode;
selecting, based on an output of the multiple iterations, media unit regions of interest that contributed to the output of the multiple iterations; and
providing the hybrid representation, wherein the hybrid representation comprises shape information regarding shapes of the media unit regions of interest, and a media unit signature that comprises identifiers that identify the media unit regions of interest;
wherein the shape information comprises polygons that represent shapes that substantially bound the media unit regions of interest, wherein a number of edges per polygon of the polygons is based on a shape of a media unit region of interest represented by the polygon.

10. The non-transitory computer readable medium according to claim 9 wherein the selecting of the media regions of interest is executed per segment out of multiple segments of the media unit.

11. The non-transitory computer readable medium according to claim 9 wherein at least one of the polygons differs from a rectangle.

12. The non-transitory computer readable medium according to claim 9 wherein the providing of the hybrid representation of the media unit comprises compressing the shape information of the media unit to provide compressed shape information of the media unit.

13. The non-transitory computer readable medium according to claim 12 that stores instructions for: comparing the media unit signature of the media unit to signatures of multiple concept structures to find a matching concept structure that has at least one matching signature that matches to the media unit signature; and calculating higher accuracy shape information that is related to regions of interest of the media unit, wherein the higher accuracy shape information is of higher accuracy than the compressed shape information of the media unit, wherein the calculating is based on shape information associated with at least some of the matching signatures.

14. The non-transitory computer readable medium according to claim 13 that stores instructions for determining shapes of the media unit regions of interest using the higher accuracy shape information.

15. The non-transitory computer readable medium according to claim 13 wherein for each media unit region of interest, the calculating of the higher accuracy shape information comprises virtually overlaying shapes of corresponding media units of interest of at least some of the matching signatures.

16. The non-transitory computer readable medium according to claim 9 wherein the media unit is an image.

17. A hybrid representation generator for generating a hybrid representation of a media unit, the hybrid representation generator comprises:
an input that is configured to receive or generate the media unit;
a processor that is configured to process the media unit by performing multiple iterations, wherein for each iteration of at least some of the multiple iterations the processing comprises:
(i) finding spanning elements that are relevant to the iteration and spanning elements that are irrelevant to the iteration; wherein a spanning element that is relevant for one of the at least some of the multiple iterations is irrelevant for another iteration of the at least some of the multiple iterations; wherein a finding of whether a spanning element of the spanning elements is relevant to an iteration comprises comparing a merge result of a previous iteration to a unique set associated with the spanning element;
(ii) applying, by the spanning elements that are relevant to the iteration, dimension expansion process that are followed by a merge operation;
(iii) entering the spanning elements that are irrelevant to the iteration into an idle mode;
a selection unit that is configured to select, based on an output of the multiple iterations, media unit regions of interest that contributed to the output of the multiple iterations; and
an output that is configured to provide the hybrid representation, wherein the hybrid representation comprises shape information regarding shapes of the media unit regions of interest, and a media unit signature that comprises identifiers that identify the media unit regions of interest; wherein the shape information comprises polygons.

18. The hybrid representation generator according to claim 17 wherein the selecting of the media regions of interest is executed per segment out of multiple segments of the media unit.

19. The hybrid representation generator according to claim 17 wherein the polygons represent shapes that substantially bound the media unit regions of interest, wherein a number of edges per polygon of the polygons is based on a shape of a media unit region of interest represented by the polygon; and at least one of the polygons differs from a rectangle.

20. The hybrid representation generator according to claim 17 that is configured to compress the shape information of the media unit to provide compressed shape information of the media unit.

21. The hybrid representation generator according to claim 20 that is configured to: compare the media unit signature of the media unit to signatures of multiple concept structures to find a matching concept structure that has at least one matching signature that matches to the media unit signature; and calculate higher accuracy shape information that is related to regions of interest of the media unit, wherein the higher accuracy shape information is of higher accuracy than the compressed shape information of the media unit, wherein the calculating is based on shape information associated with at least some of the matching signatures.

22. The hybrid representation generator according to claim 21 that is configured to determine shapes of the media unit regions of interest using the higher accuracy shape information.

23. The hybrid representation generator according to claim 21 that is configured to calculate, for each media unit region of interest, the higher accuracy shape information by virtually overlaying shapes of corresponding media units of interest of at least some of the matching signatures.

* * * * *